United States Patent
Chen et al.

(10) Patent No.: US 11,611,930 B2
(45) Date of Patent: Mar. 21, 2023

(54) ACCESS METHOD, DEVICE, AND SYSTEM

(71) Applicant: HUAWEI TECHNOLOGIES CO., LTD., Guangdong (CN)

(72) Inventors: Jing Chen, Shanghai (CN); Ruchuan Du, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 77 days.

(21) Appl. No.: 17/132,231

(22) Filed: Dec. 23, 2020

(65) Prior Publication Data

US 2021/0112491 A1    Apr. 15, 2021

Related U.S. Application Data

(63) Continuation of application No. PCT/CN2019/091106, filed on Jun. 13, 2019.

(30) Foreign Application Priority Data

Jun. 26, 2018    (CN) .......................... 201810673146.0

(51) Int. Cl.
H04W 48/16    (2009.01)
H04W 48/18    (2009.01)
H04L 47/12    (2022.01)

(52) U.S. Cl.
CPC ............. *H04W 48/16* (2013.01); *H04L 47/12* (2013.01); *H04W 48/18* (2013.01)

(58) Field of Classification Search
CPC ....... H04W 88/14; H04W 60/04; H04W 8/26; H04W 8/065; H04W 8/20; H04W 48/16; H04W 48/18
See application file for complete search history.

(56) References Cited

U.S. PATENT DOCUMENTS

2016/0165431 A1    6/2016    Chandramouli et al.
2021/0029752 A1*   1/2021    Ohlsson .................. H04W 8/08

FOREIGN PATENT DOCUMENTS

CN    101610504 A    12/2009
CN    102821440 A    12/2012
(Continued)

OTHER PUBLICATIONS

Ericsson,"[E201] Handling of mapped GUMMEI at idle mode mobility from SGS to EPS",3GPP TSG-RAN WG2 AH 1807 Tdoc R2-1810106,Montreal, Canada, Jul. 2-6, 2018,Total 3 Pages.
(Continued)

*Primary Examiner* — Jianye Wu
(74) *Attorney, Agent, or Firm* — Womble Bond Dickinson (US) LLP

(57) ABSTRACT

A method to reduce signaling interaction in an access process of a terminal includes: receiving, by a convergent network device, an access request message from a first access device on a first network, where the access request message carries a first globally unique temporary identity (GUTI) of a terminal, which is an old GUTI on the first network or a GUTI on the first network and obtained by mapping a second GUTI on a second network; determining, by the convergent network device, a first target context of the terminal on the first network based on the first GUTI and a device identifier corresponding to the convergent network device when serving as a mobility management device; and sending, by the convergent network device, an access response message to the first access device to indicate that the terminal has successfully accessed the first network.

17 Claims, 25 Drawing Sheets

(56) References Cited

FOREIGN PATENT DOCUMENTS

| | | | |
|---|---|---|---|
| CN | 103702368 A | 4/2014 | |
| CN | 104968017 A | 10/2015 | |
| CN | 105391682 A | 3/2016 | |
| CN | 106465080 A | 2/2017 | |
| WO | 2009152773 A1 | 12/2009 | |
| WO | 2014158275 A1 | 10/2014 | |
| WO | 2016140507 A1 | 9/2016 | |
| WO | 2017172265 A1 | 10/2017 | |
| WO | 2018085187 A1 | 5/2018 | |

OTHER PUBLICATIONS

Miao Jie et al.,"The Strategy Research on Convergent Pooling Technology with SGSNs and MMEs",Designing Techniques of Posts and Telecommunications,Nov. 2013,with an English abstract, total 5 pages.

Huawei, HiSilicon, S-NSSAI of VPLMN when HO from 4G to 5G, 3GPP TSG-SA WG2 Meeting #127bis , S2-186283, May 28 Jun. 1, 2018, Newport Beach, USA , 11 pages.

3GPP TS 23.501 V15.1.0 (Mar. 2018) ;3rd Generation Partnership Project;Technical Specification Group Services and System Aspects;System Architecture for the 5G System;Stage 2(Release 15),total 201 pages.

3GPP TS 23.501 V15.2.0 (Jun. 2018),3rd Generation Partnership Project;Technical Specification Group Services and System Aspects;System Architecture for the 5G System;Stage 2(Release 15),total 217 pages.

Nokia et al.,"Partitioning of Identifier space to ensure success of Context retrieval for EPS Interworking",3GPP TSG-SA WG2 Meeting #126 S2-182665,Montreal (Canada), Feb. 26-Mar. 2, 2018,Total 4 Pages.

Intel,"Clarification on the use of shared AMF Pointer value",SA WG2 Meeting #127 S2-183547,Apr. 16-20, 2018, Sanya, P.R. China,Total 3 Pages.

* cited by examiner

First globally unique identifier of a convergent network device

| 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|
| MCC+MNC | | | 0 | 0 | 0 | 0 | 0 | 0 | 0 | 0 | 0 | 0 | 0 | 0 | 1 | 0 | 0 | 0 | 0 | 0 | 1 | 1 | 1 | 0 |
| | | | Pool identifier: 0x1 | | | | | | | | | | | | | Idle bits | | First identifier: 0xE | | | | | | |

First GUAMI

| 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|
| MCC+MNC | | | 0 | 0 | 0 | 0 | 0 | 0 | 0 | 0 | 0 | 0 | 0 | 0 | 1 | 0 | 0 | 0 | 0 | 0 | 1 | 1 | 1 | 0 |
| | | | AMF region identifier: 0x0 | | | | | | | AMF set identifier: 0x1 | | | | | | | | AMF pointer identifier: 0xE | | | | | | |

Third GUMMEI

| 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|
| MCC+MNC | | | 0 | 0 | 0 | 0 | 0 | 0 | 0 | 0 | 0 | 0 | 0 | 0 | 1 | 0 | 0 | 1 | 1 | 1 | 0 | 0 | 0 | 0 |
| | | | MME group identifier: 0x1 | | | | | | | | | | | | | MME code: 0x38 | | | | | | | | |

First GUMMEI

| 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|
| MCC+MNC | | | 0 | 0 | 0 | 0 | 0 | 0 | 0 | 0 | 0 | 0 | 0 | 0 | 1 | 0 | 0 | 1 | 1 | 1 | 0 | 0 | 0 | 0 |
| | | | MME group identifier: 0x1 | | | | | | | | | | | | | MME code: 0x38 | | | | | | | | |

Third GUAMI

| 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|
| MCC+MNC | | | 0 | 0 | 0 | 0 | 0 | 0 | 0 | 0 | 0 | 0 | 0 | 0 | 1 | 0 | 0 | 0 | 0 | 0 | 1 | 1 | 1 | 0 |
| | | | AMF region identifier: 0x0 | | | | | | | AMF set identifier: 0x1 | | | | | | | | AMF pointer identifier: 0xE | | | | | | |

FIG. 10

First globally unique identifier of a convergent network device

| MCC+MNC | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 |
|---|---|---|---|---|---|---|---|---|---|---|---|---|---|---|---|---|---|---|---|---|---|---|---|---|
| | 0 | 0 | 0 | 0 | 0 | 0 | 0 | 0 | 0 | 0 | 0 | 0 | 0 | 0 | 0 | 1 | 0 | 0 | 0 | 0 | 1 | 1 | 1 | 0 |
| | | | | | | Pool identifier: 0x1 | | | | | | | | | | | | Idle bits | | First identifier: 0xE | | | | |

First GUAMI

| MCC+MNC | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 |
|---|---|---|---|---|---|---|---|---|---|---|---|---|---|---|---|---|---|---|---|---|---|---|---|---|
| | 0 | 0 | 0 | 0 | 0 | 0 | 0 | 0 | 0 | 0 | 0 | 0 | 0 | 0 | 0 | 1 | 0 | 0 | 0 | 0 | 1 | 1 | 1 | 0 |
| | AMF region identifier: 0x0 | | | | | | | | AMF set identifier: 0x1 | | | | | | | | | | AMF pointer identifier: 0xE | | | | | |

Third GUMMEI

| MCC+MNC | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 |
|---|---|---|---|---|---|---|---|---|---|---|---|---|---|---|---|---|---|---|---|---|---|---|---|---|
| | 0 | 0 | 0 | 0 | 0 | 0 | 0 | 0 | 0 | 0 | 0 | 0 | 0 | 0 | 0 | 1 | 0 | 0 | 1 | 1 | 1 | 0 | 0 | 0 |
| | MME group identifier: 0x1 | | | | | | | | | | | | | | | | MME code: 0x38 | | | | | | | |

Second globally unique identifier of the convergent network device

| MCC+MNC | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 |
|---|---|---|---|---|---|---|---|---|---|---|---|---|---|---|---|---|---|---|---|---|---|---|---|---|
| | 0 | 0 | 0 | 0 | 0 | 0 | 0 | 0 | 0 | 0 | 0 | 0 | 0 | 0 | 0 | 1 | 0 | 0 | 0 | 1 | 1 | 1 | 1 | 0 |
| | | | | | | Pool identifier: 0x1 | | | | | | | | | | | | Idle bits | | Second identifier: 0x1E | | | | |

First GUMMEI

| MCC+MNC | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 |
|---|---|---|---|---|---|---|---|---|---|---|---|---|---|---|---|---|---|---|---|---|---|---|---|---|
| | 0 | 0 | 0 | 0 | 0 | 0 | 0 | 0 | 0 | 0 | 0 | 0 | 0 | 0 | 0 | 1 | 0 | 1 | 1 | 1 | 1 | 0 | 0 | 0 |
| | MME group identifier: 0x1 | | | | | | | | | | | | | | | | MME code: 0x78 | | | | | | | |

Third GUAMI

| MCC+MNC | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 |
|---|---|---|---|---|---|---|---|---|---|---|---|---|---|---|---|---|---|---|---|---|---|---|---|---|
| | 0 | 0 | 0 | 0 | 0 | 0 | 0 | 0 | 0 | 0 | 0 | 0 | 0 | 0 | 0 | 1 | 0 | 0 | 0 | 1 | 1 | 1 | 1 | 0 |
| | AMF region identifier: 0x0 | | | | | | | | AMF set identifier: 0x1 | | | | | | | | | | AMF pointer identifier: 0x1E | | | | | |

FIG. 12

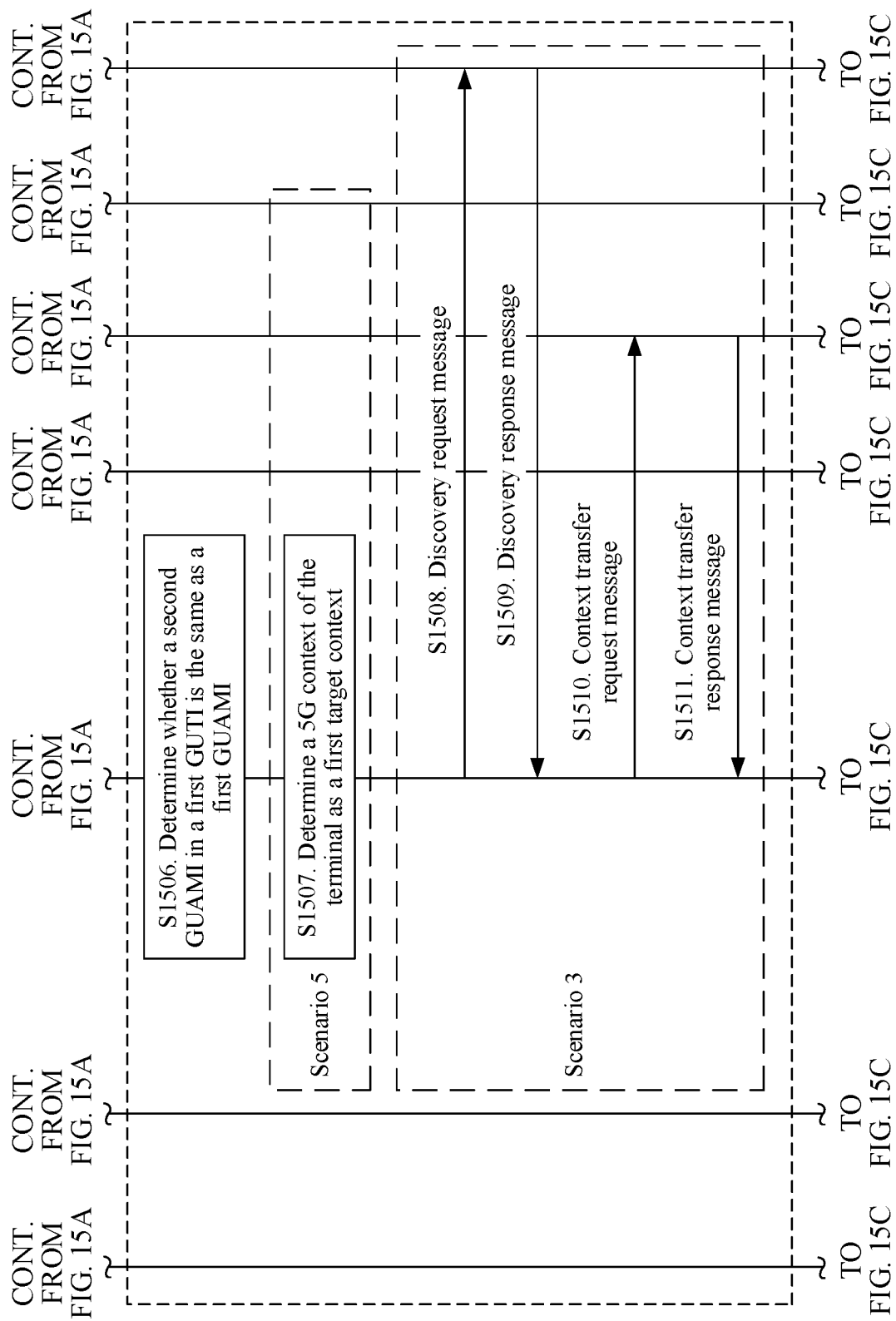

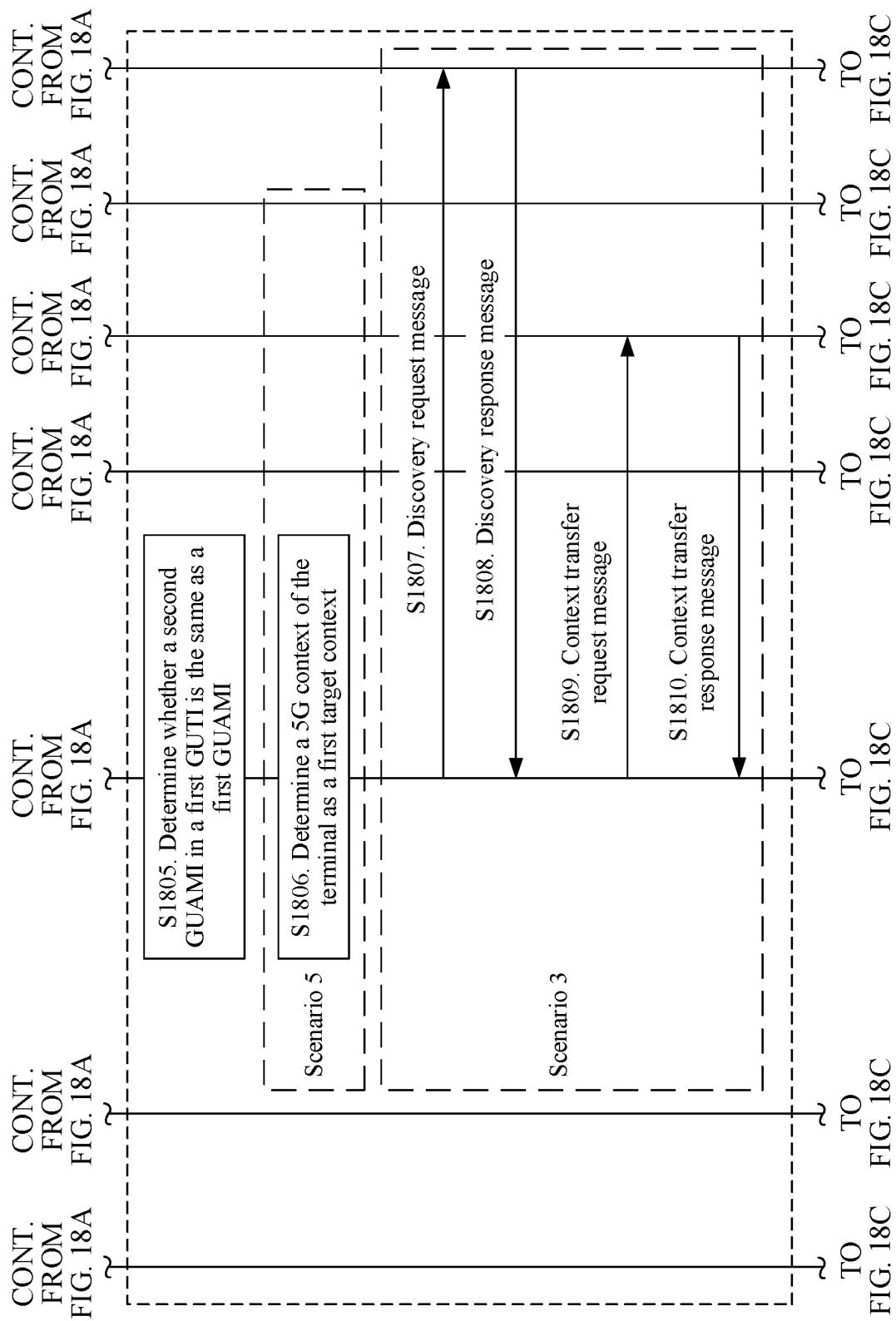

ACCESS METHOD, DEVICE, AND SYSTEM

CROSS-REFERENCE TO RELATED APPLICATIONS

This application is a continuation of International Application No. PCT/CN2019/091106, filed on Jun. 13, 2019, which claims priority to Chinese Patent Application No. 201810673146.0, filed on Jun. 26, 2018. The disclosures of the aforementioned applications are hereby incorporated by reference in their entireties.

TECHNICAL FIELD

This application relates to the field of communications technologies, and in particular, to an access method, a device, and a system.

BACKGROUND

Currently, the $3^{rd}$ generation partnership project (3GPP) technical specification (TS) 23.501 defines interoperability of a terminal between a 4th generation (4G) network and a 5th generation (5G) network. For example, the interoperability includes: The terminal re-accesses the 4G network after moving from the 5G network to the 4G network, or the terminal re-accesses the 5G network after moving from the 4G network to the 5G network.

To implement interworking between a 4G network and a 5G network, in a 4G network and 5G network interworking architecture currently discussed by the 3GPP standard group, an N26 interface is added between an access and mobility management function (AMF) network element on the 5G network and a mobility management entity (MME) on the 4G network, and communication between the MME and the AMF network element may be implemented by using the N26 interface.

However, when a terminal re-accesses a network by using the foregoing interworking architecture, a comparatively large amount of signaling interaction needs to be added. For example, when the terminal re-accesses the 4G network from the 5G network, the MME obtains address information of the AMF network element through signaling interaction, and obtains, from the AMF network element through signaling interaction based on the address information of the AMF network element, a 4G context obtained by converting a 5G context of the terminal; or when the terminal re-accesses the 5G network from the 4G network, the AMF network element obtains address information of the MME through signaling interaction, and obtains a 4G context of the terminal from the MME through signaling interaction based on the address information of the MME.

Therefore, how to reduce signaling interaction in an access process of a terminal to simplify an access procedure of the terminal is a problem that urgently needs to be resolved at present.

SUMMARY

Embodiments of this application provide an access method, a device, and a system, to reduce signaling interaction in an access process of a terminal, so as to simplify an access procedure of the terminal.

To achieve the foregoing objective, the following technical solutions are used in the embodiments of this application.

According to a first aspect, an access method is provided. A convergent network device receives an access request message from a first access device on a first network. The access request message carries a first globally unique temporary identity (GUTI) of a terminal. The first GUTI is an old GUTI on the first network or a GUTI that is on the first network and that is obtained by mapping a second GUTI. The second GUTI is an old GUTI on a second network. The convergent network device determines a first target context of the terminal on the first network based on the first GUTI and a device identifier corresponding to the convergent network device when the convergent network device serves as a mobility management device. The convergent network device sends an access response message to the first access device. The access response message is used to indicate that the terminal has successfully accessed the first network. According to this solution, after receiving the access request message from the first access device, the convergent network device may directly determine the first target context of the terminal on the first network based on the first GUTI and the device identifier corresponding to the convergent network device when the convergent network device serves as the mobility management device. This is different from a case in the current technology that a first target context of a terminal on a first network can be obtained only through signaling interaction. Therefore, signaling interaction in an access process of a terminal is reduced, thereby simplifying an access procedure of the terminal. In another aspect, because the convergent network device integrates a function of a first mobility management device on the first network and a function of a second mobility management device on the second network, a quantity of devices on a network is reduced, and a workload of network operations and maintenance is reduced. In addition, network address resources are reduced, thereby reducing complexity of network planning and deployment. Moreover, an occupation ratio of hardware resources may be flexibly adjusted based on a service volume of the first network and the second network, to share the hardware resources and improve resource utilization and a return on investment.

In an embodiment, the device identifier corresponding to the convergent network device when the convergent network device serves as the mobility management device is specifically a first identifier corresponding to the convergent network device when the convergent network device serves as the first mobility management device on the first network.

In an embodiment, the first network is a 4G network, and the first identifier is a first globally unique mobility management entity identifier (GUMMEI). Correspondingly, the determining, by the convergent network device, a first target context of the terminal on the first network based on the first GUTI and a device identifier corresponding to the convergent network device when the convergent network device serves as the mobility management device is specifically as follows: When a second GUMMEI in the first GUTI is the same as the first GUMMEI, the convergent network device determines the first target context based on a mobility management entity temporary mobile subscriber identity (M-TMSI) in the first GUTI. According to this solution, the convergent network device may determine the first target context.

In an embodiment, the determining, by the convergent network device, the first target context based on an M-TMSI in the first GUTI is performed as follows. When the convergent network device finds a 4G context of the terminal based on the M-TMSI in the first GUTI, the convergent network device determines the 4G context of the terminal as the first target context; or when the convergent network device finds a 5G context of the terminal based on the M-TMSI in the first GUTI, the convergent network device determines, a 4G context obtained by converting the 5G context of the terminal as the first target context. According to this solution, the convergent network device may determine the first target context.

In an embodiment, the first network is a 4G network, the first identifier is a first GUMMEI, the access request message further carries a type indication of the first GUTI, and the type indication is used to indicate that the first GUTI is an old GUTI on the first network. Correspondingly, the determining, by the convergent network device, a first target context of the terminal on the first network based on the first GUTI and a device identifier corresponding to the convergent network device when the convergent network device serves as the mobility management device is specifically as follows: When a second GUMMEI in the first GUTI is the same as the first GUMMEI, the convergent network device searches for a 4G context of the terminal based on an M-TMSI in the first GUTI, and determines the 4G context of the terminal as the first target context. According to this solution, the convergent network device may determine the first target context.

In an embodiment, the first network is a 5G network, the first identifier is a first globally unique access and mobility management function identifier GUAMI, the access request message further carries a type indication of the first GUTI, and the type indication is used to indicate that the first GUTI is an old GUTI on the first network. Correspondingly, the determining, by the convergent network device, a first target context of the terminal on the first network based on the first GUTI and a device identifier corresponding to the convergent network device when the convergent network device serves as the mobility management device is specifically as follows: When a second GUAMI in the first GUTI is the same as the first GUAMI, the convergent network device searches for a 5G context of the terminal based on a 5G-TMSI in the first GUTI, and determines the 5G context of the terminal as the first target context. According to this solution, the convergent network device may determine the first target context.

In an embodiment, the device identifier corresponding to the convergent network device when the convergent network device serves as the mobility management device is specifically a second identifier corresponding to the convergent network device when the convergent network device serves as the second mobility management device on the second network.

In an embodiment, the second network is a 5G network, the second identifier is a first GUAMI, the access request message further carries a type indication of the first GUTI, and the type indication is used to indicate that the first GUTI is a GUTI that is on the first network and that is obtained by mapping the second GUTI. Correspondingly, the determining, by the convergent network device, a first target context of the terminal on the first network based on the first GUTI and a device identifier corresponding to the convergent network device when the convergent network device serves as the mobility management device is performed as follows. The convergent network device maps the first GUTI back to the second GUTI based on the type indication. When a second GUAMI in the second GUTI is the same as the first GUAMI, the convergent network device searches for a 5G context of the terminal based on a 5G-TMSI in the second GUTI, and determines, a 4G context obtained by converting the 5G context of the terminal as the first target context. According to this solution, the convergent network device may determine the first target context.

In an embodiment, the second network is a 4G network, the second identifier is a first GUMMEI, the access request message further carries a type indication of the first GUTI, and the type indication is used to indicate that the first GUTI is a GUTI that is on the first network and that is obtained by mapping the second GUTI. Correspondingly, the determining, by the convergent network device, a first target context of the terminal on the first network based on the first GUTI and a device identifier corresponding to the convergent network device when the convergent network device serves as the mobility management device is performed as follows. The convergent network device maps the first GUTI back to the second GUTI based on the type indication. When a second GUMMEI in the second GUTI is the same as the first GUMMEI, the convergent network device searches for a 4G context of the terminal based on an M-TMSI in the second GUTI, and determines, a 5G context obtained by converting the 4G context of the terminal as the first target context. According to this solution, the convergent network device may determine the first target context.

In an embodiment, the device identifier corresponding to the convergent network device when the convergent network device serves as the mobility management device is specifically a first identifier corresponding to the convergent network device when the convergent network device serves as the first mobility management device on the first network, and a second identifier corresponding to the convergent network device when the convergent network device serves as the second mobility management device on the second network.

In an embodiment, the first network is a 4G network, the second network is a 5G network, the first identifier is a first GUMMEI, and the second identifier is a first GUAMI. Correspondingly, the determining, by the convergent network device, a first target context of the terminal on the first network based on the first GUTI and a device identifier corresponding to the convergent network device when the convergent network device serves as the mobility management device is performed as follows. When a second GUMMEI in the first GUTI is the same as the first GUMMEI, the convergent network device searches for a 4G context of the terminal based on an M-TMSI in the first GUTI, and determines the 4G context of the terminal as the first target context; or when a second GUMMEI in the first GUTI is different from the first GUMMEI, the convergent network device maps the first GUTI back to the second GUTI; and when a second GUAMI in the second GUTI is the same as the first GUAMI, the convergent network device searches for a 5G context of the terminal based on a 5G-TMSI in the second GUTI, and determines, a 4G context obtained by converting the 5G context of the terminal as the first target context. According to this solution, the convergent network device may determine the first target context.

In an embodiment, the convergent network device separately maps a first globally unique identifier of the convergent network device to one or more of a first GUMMEI and a first GUAMI according to a mapping rule. The first globally unique identifier of the convergent network device includes, from a most significant bit to a least significant bit, a mobile country code (MCC) and a mobile network code (MNC) that correspond to the convergent network device, a 16-bit identifier of a convergent network device pool to which the convergent network device belongs, two idle bits, and a 6-bit first identifier of the convergent network device in the convergent network device pool.

In an embodiment, the mapping rule includes: mapping the MCC in the first globally unique identifier to an MCC in the first GUAMI, and mapping the MNC in the first globally unique identifier to an MNC in the first GUAMI; mapping eight most significant bits in the identifier of the convergent network device pool to an AMF region identifier in the first GUAMI; mapping eight least significant bits in the identifier of the convergent network device pool and two idle bits in the identifier of the convergent network device pool to an AMF set identifier in the first GUAMI; mapping the first identifier of the convergent network device to an AMF pointer in the first GUAMI; mapping the MCC in the first globally unique identifier to an MCC in the first GUMMEI, and mapping the MNC in the first globally unique identifier to an MNC in the first GUMMEI; mapping the identifier of the convergent network device pool to an MME group identifier in the first GUMMEI; and mapping the two idle bits in the identifier of the convergent network device pool and the first identifier of the convergent network device to an MME code in the first GUMMEI.

Alternatively, in an embodiment, the mapping rule includes: mapping the MCC in the first globally unique identifier to an MCC in the first GUAMI, and mapping the MNC in the first globally unique identifier to an MNC in the first GUAMI; mapping eight most significant bits in the identifier of the convergent network device pool to an AMF region identifier in the first GUAMI; mapping eight least significant bits in the identifier of the convergent network device pool and two idle bits in the identifier of the convergent network device pool to an AMF set identifier in the first GUAMI; mapping the first identifier of the convergent network device to an AMF pointer in the first GUAMI; mapping the MCC in the first globally unique identifier to an MCC in the first GUMMEI, and mapping the MNC in the first globally unique identifier to an MNC in the first GUMMEI; mapping the identifier of the convergent network device pool to an MME group identifier in the first GUMMEI; mapping the two idle bits in the identifier of the convergent network device pool to two least significant bits in an MME code in the first GUMMEI; and mapping the first identifier of the convergent network device to six most significant bits in the MME code in the first GUMMEI.

In an embodiment, the convergent network device receives a context request message from a fourth mobility management entity on the 4G network. The context request message carries a third GUTI of the terminal, and is used to request a second target context of the terminal on the 4G network. When the convergent network device finds a 4G context of the terminal based on an M-TMSI in the third GUTI, the convergent network device determines the 4G context of the terminal as the second target context; or when the convergent network device finds a 5G context of the terminal based on an M-TMSI in the third GUTI, the convergent network device determines, a 4G context obtained by converting the 5G context of the terminal as the second target context. The convergent network device sends a context response message to the fourth mobility management entity. The context response message carries the second target context. According to this solution, the convergent network device may obtain the second target context of the terminal on the 4G network.

In an embodiment, the convergent network device sends a first message to the first access device. The first message carries the first GUMMEI and a third GUMMEI that is on the first network and that is obtained by mapping the first GUAMI. The convergent network device sends a second message to a second access device on the second network. The second message carries the first GUAMI and a third GUAMI that is on the second network and that is obtained by mapping the first GUMMEI. The first network is a 4G network, and the second network is a 5G network.

Alternatively, in an embodiment, the convergent network device sends a second message to the first access device. The second message carries the first GUAMI and a third GUAMI that is on the second network and that is obtained by mapping the first GUMMEI. The convergent network device sends a first message to a second access device on the second network. The first message carries the first GUMMEI and a third GUMMEI that is on the first network and that is obtained by mapping the first GUAMI. The first network is a 5G network, and the second network is a 4G network.

In an embodiment, the first message further carries a type of the first GUMMEI and a type of the third GUMMEI, and the second message further carries a type of the first GUAMI and a type of the third GUAMI. The type of the first GUMMEI is a native GUMMEI. The type of the third GUMMEI is a mapped GUMMEI. The type of the first GUAMI is a native GUAMI. The type of the third GUAMI is a mapped GUAMI.

In an embodiment, the convergent network device maps a first globally unique identifier of the convergent network device to the first GUMMEI according to a first mapping rule. The convergent network device maps a second globally unique identifier of the convergent network device to the first GUAMI according to a second mapping rule. The first globally unique identifier of the convergent network device includes, from a most significant bit to a least significant bit, an MCC and an MNC that correspond to the convergent network device, a 16-bit identifier of a convergent network device pool to which the convergent network device belongs, two idle bits, and a 6-bit first identifier of the convergent network device in the convergent network device pool. The second globally unique identifier of the convergent network device includes, from a most significant bit to a least significant bit, the MCC and the MNC that correspond to the convergent network device, the 16-bit identifier of the convergent network device pool to which the convergent network device belongs, two idle bits, and a 6-bit second identifier of the convergent network device in the convergent network device pool.

In an embodiment, the first mapping rule includes: mapping the MCC and the MNC in the first globally unique identifier of the convergent network device to an MCC and an MNC in the first GUMMEI, mapping the identifier of the convergent network device pool to an MME group identifier in the first GUMMEI, mapping two idle bits in the identifier of the convergent network device pool to two least significant bits in an MME code in the first GUMMEI, and mapping the first identifier of the convergent network device to six most significant bits in the MME code in the first GUMMEI; and the second mapping rule includes: mapping the MCC or the MNC in the second globally unique identifier of the convergent network device to an MCC or an MNC in the first GUAMI, mapping eight most significant bits in the identifier of the convergent network device pool to an AMF region identifier in the first GUAMI, mapping eight most significant bits in the identifier of the convergent network device pool and the two idle bits in the identifier of the convergent network device pool to an AMF set identifier in the first GUAMI, and mapping the second identifier of the convergent network device to an AMF pointer in the first GUAMI.

In an embodiment, the convergent network device receives a context request message from a fourth mobility management entity on the 4G network. The context request message carries a third GUTI of the terminal, and is used to request a second target context of the terminal on the 4G network. When a fourth GUMMEI in the third GUTI is the same as the first GUMMEI, the convergent network device searches for a 4G context of the terminal based on an M-TMSI in the third GUTI, and determines the 4G context of the terminal as the second target context; or when a fourth GUAMI in the third GUTI is the same as the first GUAMI, the convergent network device searches for a 5G context of the terminal based on an M-TMSI in the third GUTI, and determines, a 4G context obtained by converting the 5G context of the terminal as the second target context. The convergent network device sends a context response message to the fourth mobility management entity. The context response message carries the second target context. According to this solution, the convergent network device may obtain the second target context of the terminal on the 4G network.

According to a second aspect, a convergent network device receives a migration notification from an operations management device. The migration notification is used to indicate that a terminal on the convergent network device needs to be migrated. The convergent network device determines, based on first weight information of the convergent network device, second weight information corresponding to the convergent network device when the convergent network device serves as a first mobility management device on a first network and third weight information corresponding to the convergent network device when the convergent network device serves as a second mobility management device on a second network. The convergent network device sends the second weight information to a first access device on the first network, so that the first access device updates fourth weight information that is stored on the first access device and that corresponds to the convergent network device when the convergent network device serves as the first mobility management device on the first network. The convergent network device sends the third weight information to a second access device on the second network, so that the second access device updates fifth weight information that is stored on the second access device and that corresponds to the convergent network device when the convergent network device serves as the second mobility management device on the second network. According to this solution, terminal access may be implemented when a convergent network device in a convergent network device pool needs to be upgraded or load of convergent network devices in a convergent network device pool is unbalanced.

In an embodiment, the migration notification carries the first weight information of the convergent network device; or the access method provided in this embodiment of this application may further include: The convergent network device determines the first weight information of the convergent network device based on the migration notification. According to this solution, the convergent network device may learn of the first weight information of the convergent network device.

In an embodiment, the convergent network device sends service load information of the convergent network device to the operations management device. The service load information is used to determine that the terminal on the convergent network device needs to be migrated. According to this solution, the operations management device may determine that the terminal on the convergent network device needs to be migrated.

According to a third aspect, a convergent network device receives a migration notification from an operations management device. The migration notification is used to indicate that a terminal served by the convergent network device when the convergent network device serves as a mobility management device on a target network needs to be migrated. The convergent network device sends, to an access device on the target network, first weight information corresponding to the convergent network device when the convergent network device serves as the mobility management device on the target network. The access device updates second weight information that is stored on the access device and that corresponds to the convergent network device when the convergent network device serves as the mobility management device on the target network. According to this solution, terminal access may be implemented when a convergent network device in a convergent network device pool needs to be upgraded or load of convergent network devices in a convergent network device pool is unbalanced.

In an embodiment, the migration notification carries the first weight information; or the access method provided in this embodiment of this application may further include: The convergent network device determines the first weight information based on the migration notification. According to this solution, the convergent network device may learn of the first weight information corresponding to the convergent network device when the convergent network device serves as the mobility management device on the target network.

In an embodiment, the convergent network device sends, to the operations management device, service load information corresponding to the convergent network device when the convergent network device serves as the mobility management device on the target network. The service load information is used to determine that the terminal served by the convergent network device when the convergent network device serves as the mobility management device on the target network needs to be migrated. According to this solution, the operations management device may determine that the terminal served by the convergent network device when the convergent network device serves as the mobility management device on the target network needs to be migrated.

According to a fourth aspect, a mapping rule is provided. The mapping rule includes: mapping an MCC in a first globally unique identifier of a convergent network device to an MCC in a first GUAMI corresponding to the convergent network device when the convergent network device serves as a second mobility management device in 5G, and mapping an MNC in the first globally unique identifier to an MNC in the first GUAMI; mapping eight most significant bits in an identifier of the convergent network device pool to an AMF region identifier in the first GUAMI; mapping eight least significant bits in the identifier of the convergent network device pool and two idle bits in the identifier of the convergent network device pool to an AMF set identifier in the first GUAMI; mapping a first identifier of the convergent network device to an AMF pointer in the first GUAMI; mapping the MCC in the first globally unique identifier to an MCC in a first GUMMEI corresponding to the convergent network device when the convergent network device serves as a first mobility management device on the 4G network, and mapping the MNC in the first globally unique identifier to an MNC in the first GUMMEI; mapping the identifier of the convergent network device pool to an MME group identifier in the first GUMMEI; and mapping the two idle bits in the identifier of the convergent network device pool and the first identifier of the convergent network device to an MME code in the first GUMMEI.

In an embodiment, the mapping rule includes: mapping an MCC in a first globally unique identifier to an MCC in the first GUAMI, and mapping an MNC in the first globally unique identifier to an MNC in the first GUAMI; mapping eight most significant bits in an identifier of the convergent network device pool to an AMF region identifier in the first GUAMI; mapping eight least significant bits in the identifier of the convergent network device pool and two idle bits in the identifier of the convergent network device pool to an AMF set identifier in the first GUAMI; mapping a first identifier of the convergent network device to an AMF pointer in the first GUAMI; mapping the MCC in the first globally unique identifier to an MCC in the first GUMMEI, and mapping the MNC in the first globally unique identifier to an MNC in the first GUMMEI; mapping the identifier of the convergent network device pool to an MME group identifier in the first GUMMEI; mapping the two idle bits in the identifier of the convergent network device pool to two least significant bits in an MME code in the first GUMMEI; and mapping the first identifier of the convergent network device to six most significant bits in the MME code in the first GUMMEI.

According to a fifth aspect, a convergent network device is provided. The convergent network device has a function of implementing the method according to any one of the first aspect, the second aspect, or the third aspect. The function may be implemented by hardware, or may be implemented by hardware executing corresponding software. The hardware or software includes one or more modules corresponding to the function.

According to a sixth aspect, a convergent network device is provided, including a processor and a memory. The memory is configured to store a computer-executable instruction. When the convergent network device runs, the processor executes the computer-executable instruction stored in the memory, so that the convergent network device performs the access method according to any one of the first aspect, the second aspect, or the third aspect.

According to a seventh aspect, a convergent network device is provided, including a processor. The processor is configured to be coupled to a memory, and read an instruction in the memory and then perform, according to the instruction, the access method according to any one of the first aspect, the second aspect, or the third aspect.

According to an eighth aspect, a computer-readable storage medium is provided. The computer-readable storage medium stores an instruction. When the instruction runs on a computer, the computer is enabled to perform the access method according to any one of the first aspect, the second aspect, or the third aspect.

According to a ninth aspect, a computer program product including an instruction is provided. When the computer program product runs on a computer, the computer is enabled to perform the access method according to any one of the first aspect, the second aspect, or the third aspect.

According to a tenth aspect, a chip system is provided. The chip system includes a processor, configured to support a convergent network device in implementing a function in the first aspect, the second aspect, or the third aspect, for example, determining a first target context of the terminal on the first network based on the first GUTI and a device identifier corresponding to the convergent network device when the convergent network device serves as a mobility management device. In a possible design, the chip system further includes a memory. The memory is configured to store a program instruction and data that are necessary for the convergent network device. The chip system may include a chip, or may include a chip and another discrete device.

For a technical effect of any design manner in the fifth aspect to the tenth aspect, refer to technical effects of different design manners in the first aspect, the second aspect, or the third aspect. Details are not described herein again.

According to an eleventh aspect, an access system is provided. The access system includes a convergent network device and a first access device. The convergent network device is configured to receive an access request message from the first access device on a first network. The access request message carries a first globally unique temporary identity GUTI of a terminal. The first GUTI is an old GUTI on the first network or a GUTI that is on the first network and that is obtained by mapping a second GUTI. The second GUTI is an old GUTI on a second network. The convergent network device is further configured to determine a first target context of the terminal on the first network based on the first GUTI and a device identifier corresponding to the convergent network device when the convergent network device serves as a mobility management device. The convergent network device is further configured to send an access response message to the first access device. The access response message is used to indicate that the terminal has successfully accessed the first network. The first access device is further configured to receive the access response message from the convergent network device.

In an embodiment, the convergent network device is further configured to perform the operations performed by the convergent network device in the first aspect.

For a technical effect of any design manner in the eleventh aspect, refer to technical effects of different design manners in the first aspect. Details are not described herein again.

According to a twelfth aspect, an access system is provided. The access system includes a convergent network device and an operations management device. The operations management device is configured to send a migration notification to the convergent network device. The migration notification is used to indicate that a terminal on the convergent network device needs to be migrated. The convergent network device is configured to receive the migration notification from the operations management device, and determine, based on first weight information of the convergent network device, second weight information corresponding to the convergent network device when the convergent network device serves as a first mobility management device on a first network and third weight information corresponding to the convergent network device when the convergent network device serves as a second mobility management device on a second network. The convergent network device is further configured to send the second weight information to a first access device on the first network, so that the first access device updates fourth weight information that is stored on the first access device and that corresponds to the convergent network device when the convergent network device serves as the first mobility management device on the first network. The convergent network device is further configured to send the third weight information to a second access device on the second network, so that the second access device updates fifth weight information that is stored on the second access device and that corresponds to the convergent network device when the convergent network device serves as the second mobility management device on the second network.

In an embodiment, the convergent network device is further configured to perform the operations performed by the convergent network device in the second aspect.

For a technical effect of any design manner in the twelfth aspect, refer to technical effects of different design manners in the second aspect. Details are not described herein again.

According to a thirteenth aspect, an access system is provided. The access system includes a convergent network device and an operations management device. The operations management device is configured to send a migration notification to the convergent network device. The migration notification is used to indicate that a terminal served by the convergent network device when the convergent network device serves as a mobility management device on a target network needs to be migrated. The convergent network device is configured to receive the migration notification from the operations management device, and send, to an access device on the target network, first weight information corresponding to the convergent network device when the convergent network device serves as the mobility management device on the target network. The access device updates second weight information that is stored on the access device and that corresponds to the convergent network device when the convergent network device serves as the mobility management device on the target network.

In a possible design, the convergent network device is further configured to perform the operations performed by the convergent network device in the third aspect.

For a technical effect of any design manner in the thirteenth aspect, refer to technical effects of different design manners in the third aspect. Details are not described herein again.

BRIEF DESCRIPTION OF DRAWINGS

FIG. 10 is a schematic mapping diagram 3 according to an embodiment of this application;

FIG. 12 is a schematic mapping diagram 5 according to an embodiment of this application;

FIG. 15A, FIG. 15B and FIG. 15C are schematic flowchart 3 of an access method according to an embodiment of this application;

FIG. 18A, FIG. 18B and FIG. 18C are schematic flowchart 6 of an access method according to an embodiment of this application;

DESCRIPTION OF EMBODIMENTS

The following describes the technical solutions in the embodiments of this application with reference to the accompanying drawings in the embodiments of this application. In the descriptions of this application, unless otherwise specified, "I" indicates an "or" relationship between associated objects. For example, AB may indicate A or B. In this application, "and/or" describes only an association relationship for describing associated objects and indicate s that three relationships may exist. For example, A and/or B may indicate the following three cases: Only A exists, both A and B exist, and only B exists. A and B may be singular or plural. In addition, in the descriptions of this application, "a plurality of" means two or more than two. "At least one of the following" or a similar expression thereof indicates any combination of the following, and includes any combination of one or more of the following. For example, at least one of a, b, or c may indicate a, b, c, a and b, a and c, b and c, or a, b, and c, where a, b, and c may be singular or plural. In addition, to clearly describe the technical solutions in the embodiments of this application, terms such as "first" and "second" are used in the embodiments of this application to distinguish between same items or similar items that have a basically same function and usage. A person skilled in the art can understand that the terms such as "first" and "second" are not intended to limit a quantity or an execution sequence, and the terms such as "first" and "second" do not indicate a definite difference.

In addition, the network architecture and the service scenario described in the embodiments of this application are intended to describe the technical solutions in the embodiments of this application more clearly, and do not constitute a limitation on the technical solutions provided in the embodiments of this application. A person of ordinary skill in the art may know that: With the evolution of the network architecture and the emergence of new service scenarios, the technical solutions provided in the embodiments of this application are also applicable to similar technical problems.

Figure 1:
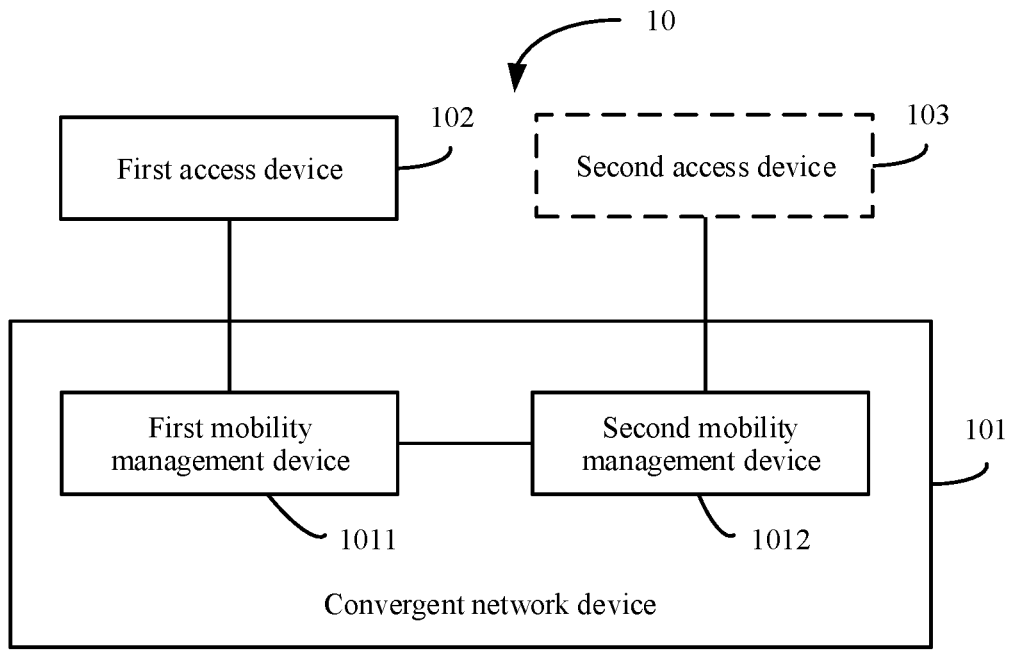
FIG. 1 is a schematic architectural diagram of an access system according to an embodiment of this application.

FIG. 1 shows an access system 10 according to an embodiment of this application. The access system 10 includes a convergent network device 101 and a first access device 102 on a first network. The convergent network device 101 integrates a function of a first mobility management device 1011 on the first network and a function of a second mobility management device 1012 on a second network, and may serve as the first mobility management device 1011 on the first network, or may serve as the second mobility management device 1012 on the second network. This is uniformly described herein, and details are not described in the following again.

The first access device 102 is configured to send an access request message to the convergent network device 101. The access request message carries a first globally unique temporary identity (GUTI) of a terminal. The first GUTI is an old GUTI on the first network or a GUTI that is on the first network and that is obtained by mapping a second GUTI. The second GUTI is an old GUTI on the second network.

The convergent network device 101 is configured to receive the access request message from the first access device 102, determine a first target context of the terminal on the first network based on the first GUTI and a device identifier corresponding to the convergent network device 101 when the convergent network device 101 serves as a mobility management device, and then send an access response message to the first access device 102. The access response message is used to indicate that the terminal has successfully accessed the first network.

The first access device 102 is further configured to receive the access response message from the convergent network device 101.

Optionally, in an embodiment of this application, the device identifier corresponding to the convergent network device 101 when the convergent network device 101 serves as the mobility management device may be a first identifier corresponding to the convergent network device 101 when the convergent network device 101 serves as the first mobility management device 1011, or a second identifier corresponding to the convergent network device 101 when the convergent network device 101 serves as the second mobility management device 1012, or a first identifier corresponding to the convergent network device 101 when the convergent network device 101 serves as the first mobility management device 1011 and a second identifier corresponding to the convergent network device 101 when the convergent network device 101 serves as the second mobility management device 1012, or the like. This is not specifically limited in this embodiment of this application.

Optionally, in an embodiment of this application, the convergent network device 101 may directly communicate with the first access device 102, or may communicate with the first access device 102 through forwarding by another device. This is not specifically limited in this embodiment of this application.

Based on the access system provided in this embodiment of this application, after receiving the access request message from the first access device, the convergent network device in the access system may directly determine the first target context of the terminal on the first network based on the first GUTI and the device identifier corresponding to the convergent network device when the convergent network device serves as the mobility management device. This is different from a case in the current technology that a first target context of a terminal on a first network can be obtained only through signaling interaction. Therefore, signaling interaction in an access process of a terminal is reduced, thereby simplifying an access procedure of the terminal. In another aspect, because the convergent network device integrates the function of the first mobility management device 1011 on the first network and the function of the second mobility management device 1012 on the second network, a quantity of devices on a network is reduced, and a workload of network operations and maintenance is reduced. In addition, network address resources are reduced, thereby reducing complexity of network planning and deployment. Moreover, an occupation ratio of hardware resources may be flexibly adjusted based on a service volume of the first network and the second network, to share the hardware resources and improve resource utilization and a return on investment.

In an embodiment, as shown in FIG. 1, the access system 10 may further include a second access device 103 on the second network.

When the first network is a 4G network and the second network is a 5G network:

The convergent network device 101 is configured to send a first message to the first access device 102. The first message carries a first globally unique MME identifier (GUMMEI) and a third GUMMEI that is on the first network and that is obtained by mapping a first globally unique AMF identifier (globally unique AMF identifier, GUAMI).

The first access device 102 is configured to receive the first message from the convergent network device 101. Optionally, the first access device 102 may further store the first GUMMEI and the third GUMMEI.

The convergent network device 101 is further configured to send a second message to the second access device 103. The second message carries the first GUAMI and a third GUAMI that is on the second network and that is obtained by mapping the first GUMMEI.

The second access device 103 is configured to receive the second message from the convergent network device 101. Optionally, the first access device 102 may further store the first GUAMI and the third GUAMI.

According to the foregoing solution, the second access device may obtain both the first GUAMI and the third GUAMI, and the first access device may obtain both the first GUMMEI and the third GUMMEI.

Alternatively, when the first network is a 5G network and the second network is a 4G network:

The convergent network device 101 is configured to send a second message to the first access device 102. The second message carries a first GUAMI and a third GUAMI that is on the second network and that is obtained by mapping a first GUMMEI.

The first access device 102 is configured to receive the second message from the convergent network device 101. Optionally, the first access device 102 may further store the first GUAMI and the third GUAMI.

The convergent network device 101 is further configured to send a first message to the second access device 103. The first message carries the first GUMMEI and a third GUMMEI that is on the first network and that is obtained by mapping the first GUAMI.

The second access device 103 is configured to receive the first message from the convergent network device 101. Optionally, the first access device 102 may further store the first GUMMEI and the third GUMMEI.

According to the foregoing solution, the first access device may obtain both the first GUAMI and the third GUAMI, and the second access device may obtain both the first GUMMEI and the third GUMMEI.

To sum up, according to the foregoing solution, access devices on different networks each may not only obtain an old mobility management device identifier on a local network, but also obtain a mobility management device identifier that is on the local network and that is obtained by mapping an old mobility management device identifier on another network, that is, a mapped mobility management device identifier. Further, the access device may subsequently select a corresponding mobility management device or convergent network device for access based on the old mobility management device identifier and the mapped mobility management device identifier.

Optionally, as described above, in an embodiment of this application, the first network may be a 4G network, and the second network may be a 5G network; or in this embodiment of this application, the first network may be a 5G network, and the second network may be a 4G network; or in this embodiment of this application, the first network and the second network may be other networks. This is not limited in this embodiment of this application.

Figure 2:
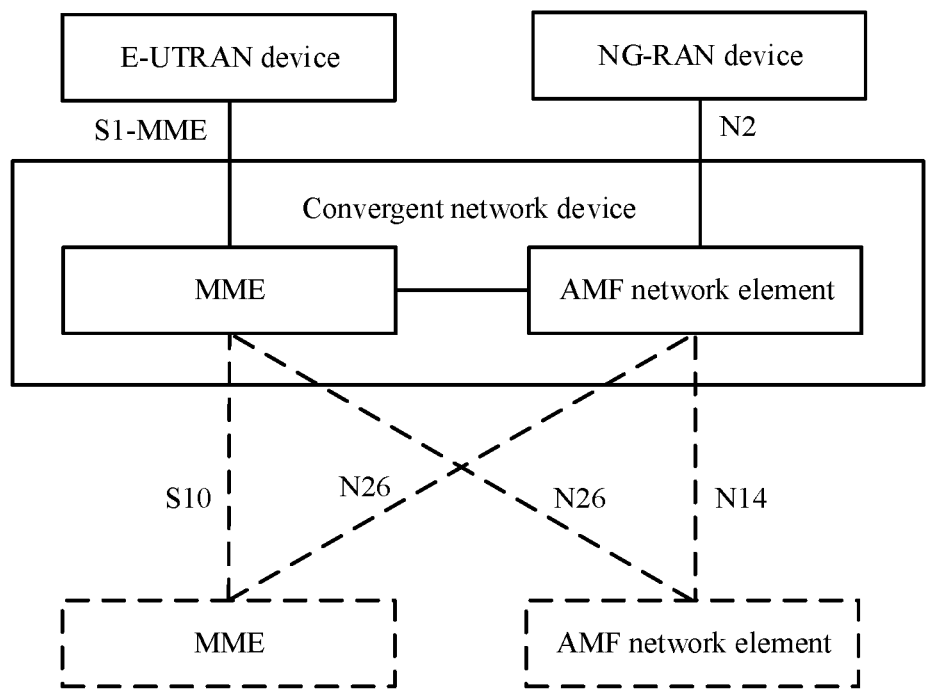
FIG. 2 is a schematic application diagram of an access system on a 4G network and a 5G network according to an embodiment of this application.

For example, in a scenario in which the first network is a 4G network and the second network is a 5G network, or the second network is a 4G network and the first network is a 5G network, as shown in FIG. 2, the convergent network device integrates a function of an MME in 4G and a function of an AMF network element on the 5G network. When the convergent network device serves as an MME, a corresponding access device is an evolved universal terrestrial radio access network (E-UTRAN) device on the 4G network; or when the convergent network device serves as an AMF network element, a corresponding access device is a next-generation radio access network (NG-RAN) device on the 5G network. In addition, as shown in FIG. 2, the access system may further include one or more of an MME and an AMF network element.

A "local address of a unified peer network element interface" is configured for the convergent network device. When the convergent network device serves as an AMF network element and communicates with an AMF network element, the local address is used as an N14 interface address. When the convergent network device serves as an AMF network element and communicates with an MME network element, the local address is used as an N26 interface address. When the convergent network device serves as an MME and communicates with an AMF network element, the local address is used as an N26 interface address. When the convergent network device serves as an MME and communicates with an MME, the local address is used as an S10 interface address.

A "local address of a unified wireless device interface" is configured for the convergent network device. When the convergent network device serves as an AMF network element and communicates with an NG-RAN device, the local address is used as an N2 interface address. When the convergent network device serves as an MME and communicates with an E-UTRAN device, the local address is used as an S1-MME interface address.

It should be noted that FIG. 2 is described merely by using an example in which the access system includes one convergent network device. Certainly, the access system may include one or more convergent network devices. This is not limited in this embodiment of this application.

It should be noted that FIG. 2 is described merely by using an example in which the convergent network device is connected to one E-UTRAN device when serving as an MME. Certainly, the convergent network device may be connected to one or more E-UTRAN devices when serving as an MME. This is not specifically limited in this embodiment of this application.

It should be noted that FIG. 2 is described merely by using an example in which the convergent network device is connected to one AMF network element or MME when serving as an MME. Certainly, the convergent network device may be connected to one or more MMEs when serving as an MME, or the convergent network device may be connected to one or more AMF network elements when serving as an MME. This is not specifically limited in this embodiment of this application.

It should be noted that FIG. 2 is described merely by using an example in which the convergent network device is connected to one NG-RAN device when serving as an AMF network element. Certainly, the convergent network device may be connected to one or more NG-RAN devices when serving as an AMF network element. This is not specifically limited in this embodiment of this application.

It should be noted that FIG. 2 is described merely by using an example in which the convergent network device is connected to one AMF network element or MME when serving as an AMF network element. Certainly, the convergent network device may be connected to one or more MMEs when serving as an AMF network element, or the convergent network device may be connected to one or more AMF network elements when serving as an AMF network element. This is not specifically limited in this embodiment of this application.

It should be noted that FIG. 2 is described merely by using an example in which the E-UTRAN device is connected to one convergent network device. Certainly, the E-UTRAN device may be further connected to another convergent network device or an MME. This is not specifically limited in this embodiment of this application.

It should be noted that FIG. 2 is described merely by using an example in which the NG-RAN device is connected to one convergent network device. Certainly, the NG-RAN device may be further connected to another convergent network device or an AMF network element. This is not specifically limited in this embodiment of this application.

Optionally, the terminal in an embodiment of this application may include various devices with a wireless communication function, for example, a handheld device, an in-vehicle device, a wearable device, a computing device, or another processing device connected to a wireless modem; or may include a subscriber unit, a cellular phone, a smartphone, a wireless data card, a personal digital assistant (PDA) computer, a tablet computer, a wireless modem (modem), a handheld (handheld) device, a laptop computer, a cordless phone or a wireless local loop (WLL) station, a machine type communication (MTC) terminal, user equipment (UE), a mobile station (MS), a terminal device, relay user equipment, or the like. For example, the relay user equipment may be a 5G residential gateway (RG). For ease of description, the devices mentioned above are collectively referred to as a terminal in this application.

Optionally, the access device (for example, the first access device or the second access device) in an embodiment of this application is a device that accesses a core network. For example, the access device may be a base station, a broadband network gateway (BNG), an aggregation switch, or a non-3rd generation partnership project (3GPP) access device. The base station may include stations in various forms, such as a macro base station, a micro base station (also referred to as a small cell), a relay station, an access point, and or the like.

Optionally, the convergent network device in FIG. 1 in an embodiment of this application may be implemented by one device, or may be implemented jointly by a plurality of devices, or may be a functional module in a device. This is not specifically limited in this embodiment of this application. It can be understood that the foregoing function may be a network element in a hardware device, or may be a software function running on dedicated hardware, or may be a virtualized function instantiated on a platform (for example, a cloud platform).

Figure 3:
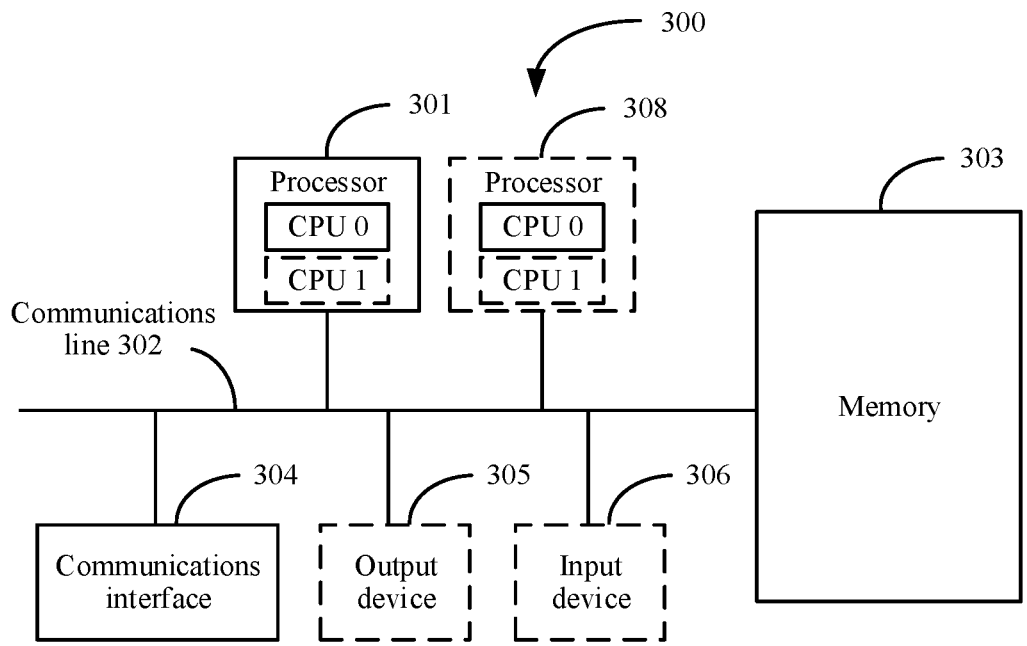
FIG. 3 is a schematic diagram of a hardware structure of a communications device according to an embodiment of this application.

For example, the convergent network device in FIG. 1 in an embodiment of this application may be implemented by a communications device in FIG. 3. FIG. 3 is a schematic diagram of a hardware structure of a communications device according to an embodiment of this application. The communications device 300 includes a processor 301, a communications line 302, a memory 303, and one or more communications interfaces (FIG. 3 is described merely by using one communications interface 304 as an example).

The processor 301 may be a general-purpose central processing unit (CPU), a microprocessor, an application-specific integrated circuit (ASIC), or one or more integrated circuits configured to control execution of programs of the solutions of this application.

The communications line 302 may include a channel that transmits information between the foregoing components.

The communications interface 304 is configured to communicate, by using any apparatus like a transceiver, with another device or a communications network, for example, Ethernet, a radio access network (RAN), or a wireless local area network (WLAN).

The memory 303 may be a read-only memory (ROM), another type of static storage device that can store static information and instructions, a random access memory (RAM), or another type of dynamic storage device that can store information and instructions; or may be an electrically erasable programmable read-only memory (electrically erasable programmable read-only memory, EEPROM), a compact disc read-only memory (CD-ROM) or another optical disk storage, an optical disc storage (including a compact optical disc, a laser disc, an optical disc, a digital versatile disc, a Blu-ray disc, or the like), a magnetic disk storage medium or another magnetic storage device, or any other medium that can be configured to carry or store expected program code in a form of an instruction or a data structure and that can be accessed by a computer. However, this does not constitute a limitation herein. The memory may exist independently and is connected to the processor by using the communications line 302. Alternatively, the memory may be integrated with the processor.

The memory 303 is configured to store a computer-executable instruction for executing the solutions of this application, and the processor 301 controls execution of the computer-executable instruction. The processor 301 is configured to execute the computer-executable instruction stored in the memory 303, so as to perform an access method provided in the following embodiments of this application.

Optionally, the computer-executable instruction in an embodiment of this application may also be referred to as application program code. This is not specifically limited in this embodiment of this application.

In an embodiment, the processor 301 may include one or more CPUs, for example, a CPU 0 and a CPU 1 in FIG. 3.

In an embodiment, the communications device 300 may include a plurality of processors, for example, a processor 301 and a processor 308 in FIG. 3. Each of the processors may be a single-CPU processor, or may be a multi-CPU processor. The processor herein may be one or more devices, a circuit, and/or a processing core configured to process data (for example, a computer program instruction).

In an embodiment, the communications device 300 may further include an output device 305 and an input device 306. The output device 305 communicates with the processor 301, and may display information in a plurality of manners. For example, the output device 305 may be a liquid crystal display (LCD), a light emitting diode (LED) display device, a cathode ray tube (CRT) display device, or a projector. The input device 306 communicates with the processor 301, and may receive user input in a plurality of manners. For example, the input device 306 may be a mouse, a keyboard, a touchscreen device, or a sensing device.

The communications device 300 may be a general-purpose device or a dedicated device. In a specific implementation, the communications device 300 may be a desktop computer, a portable computer, a network server, a palmtop computer (e.g., a PDA), a mobile phone, a tablet computer, a wireless terminal device, an embedded device, or a device with a structure similar to that in FIG. 3. A type of the communications device 300 is not limited in this embodiment of this application.

The following describes in detail the access method provided in the embodiments of this application with reference to FIG. 1 to FIG. 3.

It should be noted that names of messages between network elements in the following embodiments of this application, names of parameters in messages, or the like are merely examples, and there may be other names in a specific implementation. This is not specifically limited in the embodiments of this application.

For ease of understanding the solutions in the following embodiments, related brief descriptions are first provided as follows.

1. GUMMEI and 4G-GUTI on a 4G Network

Figure 4:
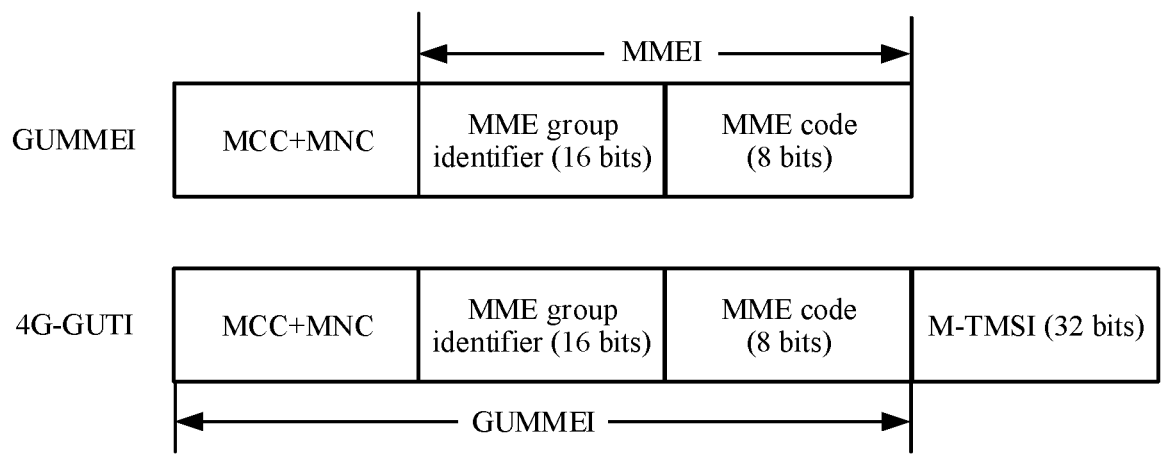
FIG. 4 is a schematic diagram of formats of a GUMMEI and a 4G-GUTI on an existing 4G network.

FIG. 4 shows formats of the GUMMEI and the 4G-GUTI on the 4G network. The GUMMEI includes a mobile country code (MCC) and a mobile network code (MNC) that correspond to an MME, a 16-bit MME group identifier (MME group ID), and an 8-bit MME code. The 4G-GUTI includes the GUMMEI and a 32-bit MME-temporary mobile subscriber identity (M-TMSI).

The MCC identifies a country to which an operator belongs. The MNC is a network identifier of the operator. The MME group ID indicates a group of MMEs that serve a same tracking area (TA) range, and the group of MMEs is also referred to as an MME pool. The MME code uniquely identifies the MME in the MME pool. The MME group ID and the MME code are jointly referred to as an MME identifier (MMEI), and the MME identifier is unique in a group of an MCC and an MNC.

2. GUAMI and 5G-GUTI on a 5G Network

Figures 5, 6:
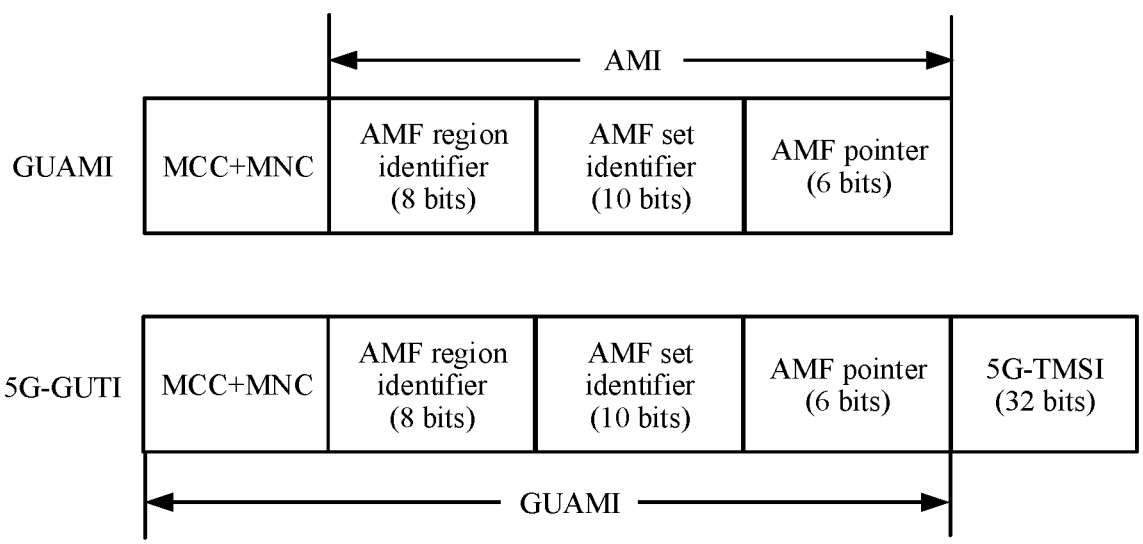
FIG. 5 is a schematic diagram of formats of a GUAMI and a 5G-GUTI on an existing 5G network.
FIG. 6 is a schematic diagram of a format of a globally unique identifier of a convergent network device according to an embodiment of this application.

FIG. 5 shows formats of the GUAMI and the 5G-GUTI on the 5G network. The GUAMI includes an MCC and an MNC that correspond to an AMF network element, an 8-bit AMF region identifier (ID), a 10-bit AMF set ID, and a 6-bit AMF pointer. The 5G-GUTI includes the GUAMI and a 32-bit 5G-TMSI.

The MCC identifies a country to which an operator belongs. The MNC is a network identifier of the operator. The AMF region ID and the AMF set ID jointly represent a group of AMF network elements that serve a same TA range, and the group of AMF network elements is also referred to as an AMF pool. The AMF region ID, the AMF set ID, and the AMF pointer are jointly referred to as an AMF identifier (AMI), and the AMF identifier is unique in a group of an MCC and an MNC. The AMF region ID is unique in a group of an MCC and an MNC. The AMF set ID is unique in the AMF region ID.

3. Globally Unique Identifier of a Convergent Network Device

One or more globally unique identifiers may be configured for one convergent network device. The following uses a first globally unique identifier of a convergent network device as an example for description. The first globally unique identifier of the convergent network device is any one of one or more globally unique identifiers of the convergent network device.

FIG. 6 shows a format of the first globally unique identifier of the convergent network device. The first globally unique identifier includes, from a most significant bit to a least significant bit, an MCC and an MNC that correspond to the convergent network device, a 16-bit identifier of a convergent network device pool to which the convergent network device belongs (referred to as a pool identifier in FIG. 5), two idle bits, and a 6-bit first identifier of the convergent network device in the convergent network device pool.

The MCC identifies a country to which an operator belongs. The MNC is a network identifier of the operator. The identifier of the convergent network device pool to which the convergent network device belongs represents a group of convergent network devices, and the group of convergent network devices serve one location region. The first identifier represents the convergent network device in the convergent network device pool. The idle bits are filled with fixed values.

When a plurality of globally unique identifiers may be configured for the convergent network device, for related formats of the plurality of globally unique identifiers of the convergent network device, refer to the format of the first globally unique identifier of the convergent network device. For example, a difference lies in that, in different globally unique identifiers of the convergent network device, one or more of MNCs, MCCs, identifiers of convergent network device pools to which the convergent network device belongs, and identifiers of the convergent network device in the convergent network device pools may be the same or different. For example, one convergent network device may belong to different convergent network device pools. This is not specifically limited in an embodiment of this application.

4. Manner of Mapping a Globally Unique Identifier of a Convergent Network Device to a GUMMEI and a GUAMI The following provides several manners of mapping a globally unique identifier of a convergent network device to a GUMMEI and a GUAMI as examples.

Manner 1: A convergent network device separately maps a first globally unique identifier of the convergent network device to a first GUMMEI and a first GUAMI according to a mapping rule 1.

Figure 7:
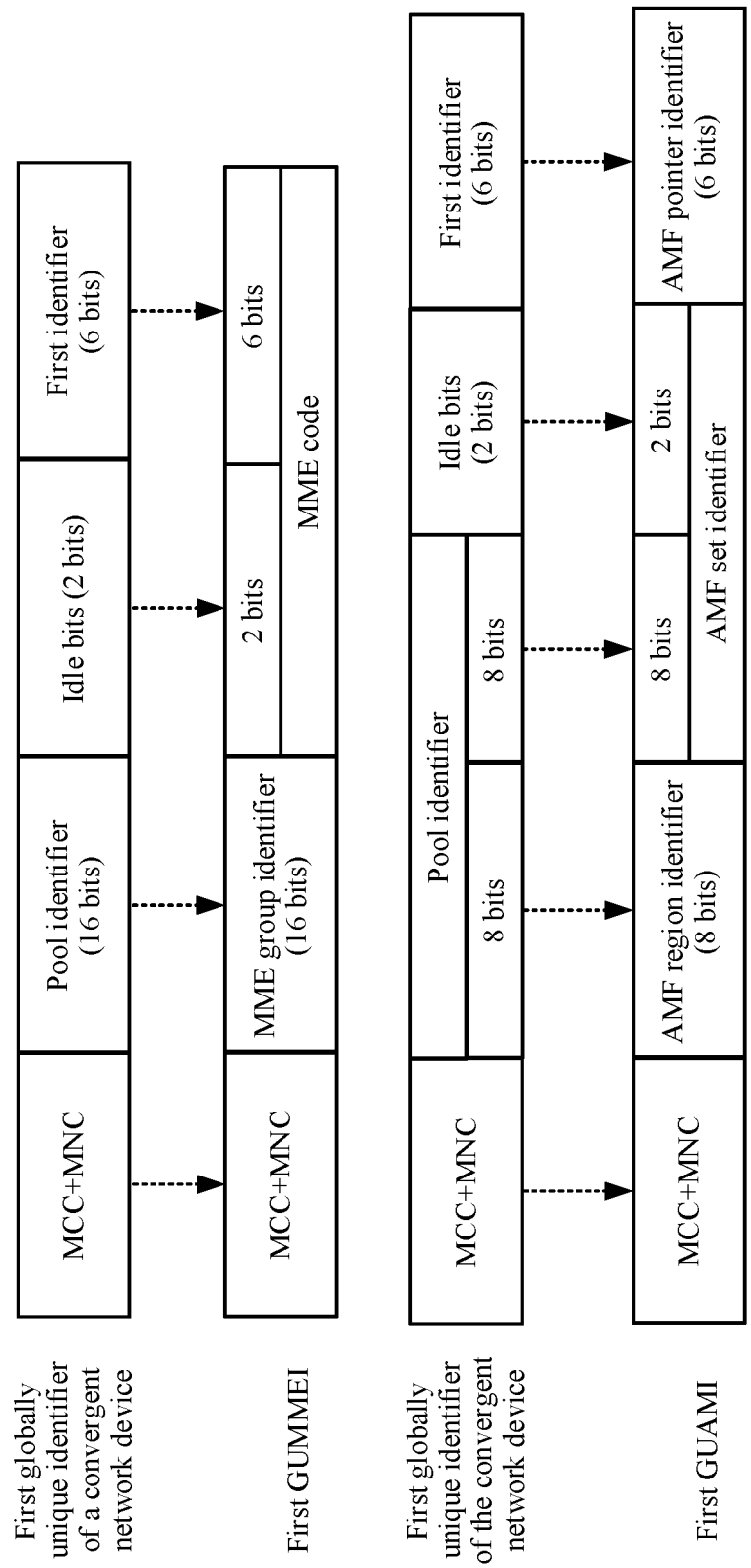
FIG. 7 is a schematic mapping diagram 1 according to an embodiment of this application.

In an embodiment, convergent network devices form a convergent network device pool, an identifier of an MME pool to which a convergent network device belongs and an identifier of an AMF pool to which the convergent network device belongs are uniformly planned, and a first GUMMEI and a first GUAMI that are obtained through mapping are the same. In this case, the mapping rule 1 may include: mapping an MCC in the first globally unique identifier to an MCC in the first GUMMEI, and mapping an MNC in the first globally unique identifier to an MNC in the first GUMMEI; mapping an identifier of the convergent network device pool to an MME group identifier in the first GUMMEI; mapping two idle bits in the identifier of the convergent network device pool and a first identifier of the convergent network device to an MME code in the first GUMMEI; mapping the MCC in the first globally unique identifier to an MCC in the first GUAMI, and mapping the MNC in the first globally unique identifier to an MNC in the first GUAMI; mapping eight most significant bits in the identifier of the convergent network device pool to an AMF region identifier in the first GUAMI; mapping eight least significant bits in the identifier of the convergent network device pool and the two idle bits in the identifier of the convergent network device pool to an AMF set identifier in the first GUAMI; and mapping the first identifier of the convergent network device to an AMF pointer in the first GUAMI. A mapping result is shown in FIG. 7. Details are not described herein.

Figure 8:
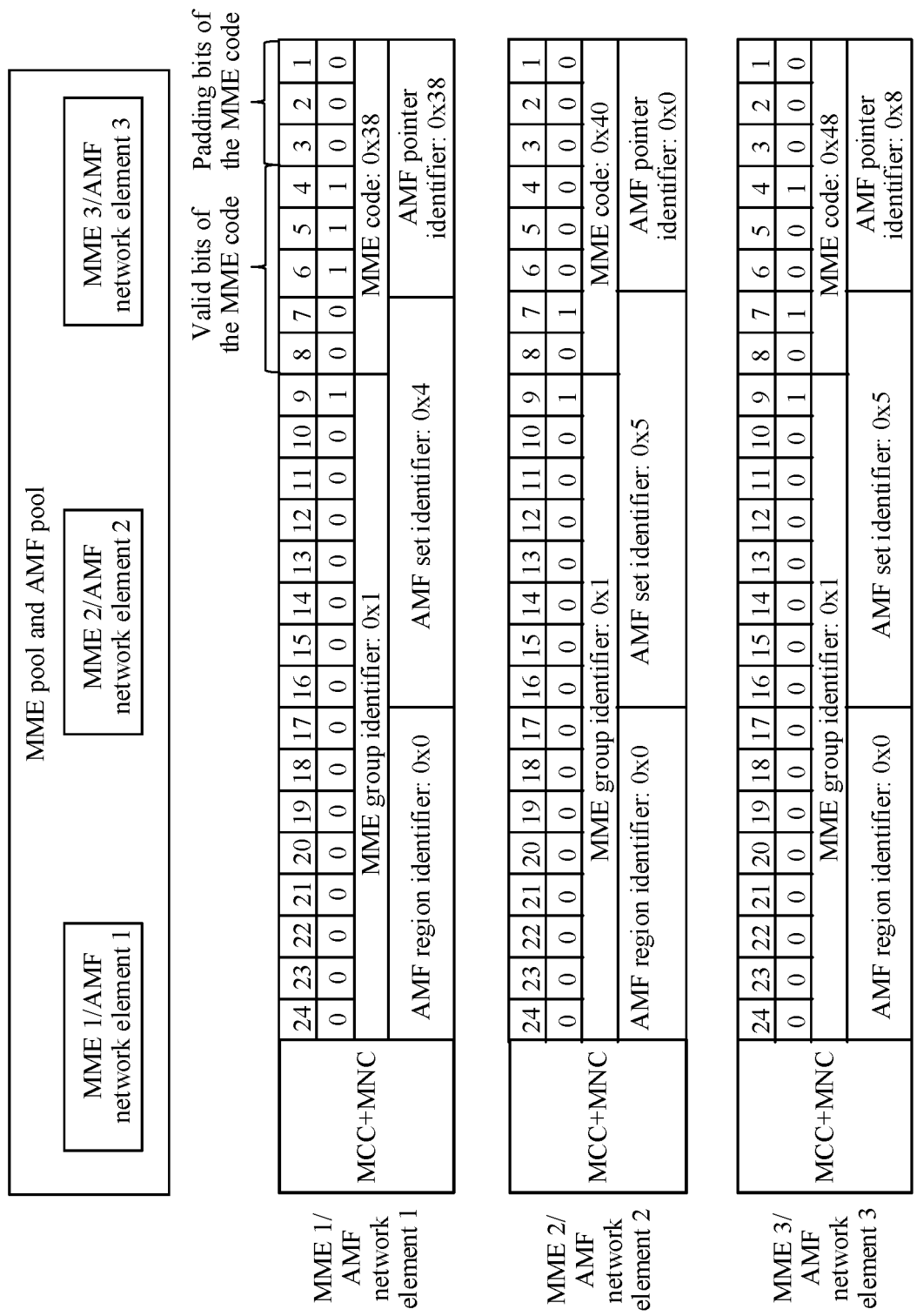
FIG. 8 is a schematic diagram of a GUMMEI corresponding to an MME and a GUAMI corresponding to an AMF network element after a live network is upgraded according to an embodiment of this application.

It should be noted that, in an embodiment of this application, the mapping manner shown in FIG. 7 is usually applicable to a scenario in which a convergent network device is newly planned and deployed. In this case, a globally unique identifier of the convergent network device may be uniformly planned, so that an identifier of an MME pool to which the convergent network device belongs and an identifier of an AMF pool to which the convergent network device belongs are also uniformly planned. However, in an actual environment of a live network, an MME has usually been deployed, and the MME needs to be upgraded to a convergent network device based on existing MME networking, to complete overlay network construction of a 5G network on a 4G network. In this scenario, because the MME already has a corresponding GUMMEI, a GUAMI corresponding to the convergent network device needs to be planned on this basis. In conventional MME networking, because an MME and an SGSN are converged, in an MME code, a most significant bit is usually used to identify an MME in an MME pool, and a least significant bit is filled with an idle byte. In this way, according to a mapping rule between a GUAMI and a GUMMEI that is defined in the current technology, convergent network devices in a same convergent network device pool are very likely to belong to different AMF pools when the convergent network devices serve as AMF network elements. For example, as shown in FIG. 8, it is assumed that an MME 1, an MME 2, and an MME 3 belong to a same MME pool, an MME code of the MME 1 is 0x38, an MME code of the MME 2 is 0x40, and an MME code of the MME 3 is 0x48. Herein, the MME 1 is upgraded to a convergent network device 1, the MME 2 is upgraded to a convergent network device 2, and the MME 3 is upgraded to a convergent network device 3. The convergent network device 1 further has a function of an AMF network element 1. The convergent network device 2 further has a function of an AMF network element 2. The convergent network device 3 further has a function of an AMF network element 1. In this case, as can be learned with reference to FIG. 8 and according to the mapping rule between a GUAMI and a GUMMEI that is defined in the current technology, an AMF set identifier in a GUAMI obtained by mapping a GUMMEI corresponding to the MME 1 is 0x4, an AMF set identifier in a GUAMI obtained by mapping a GUMMEI corresponding to the MME 2 is Oxy, and an AMF set identifier in a GUAMI obtained by mapping a GUMMEI corresponding to the MME 3 is Oxy. Apparently, the AMF network element 1, the AMF network element 2, and the AMF network element 3 belong to different AMF pools. In this case, if a GUMMEI that corresponds to an MME and that is obtained before a network upgrade is directly used as a globally unique identifier of a convergent network device, and a GUAMI is obtained through mapping according to the mapping rule 1, an NG-RAN device cannot learn that the AMF network element 1, the AMF network element 2, and the AMF network element 3 actually belong to one AMF pool, and therefore cannot effectively perform selection for service load sharing.

Figure 9:
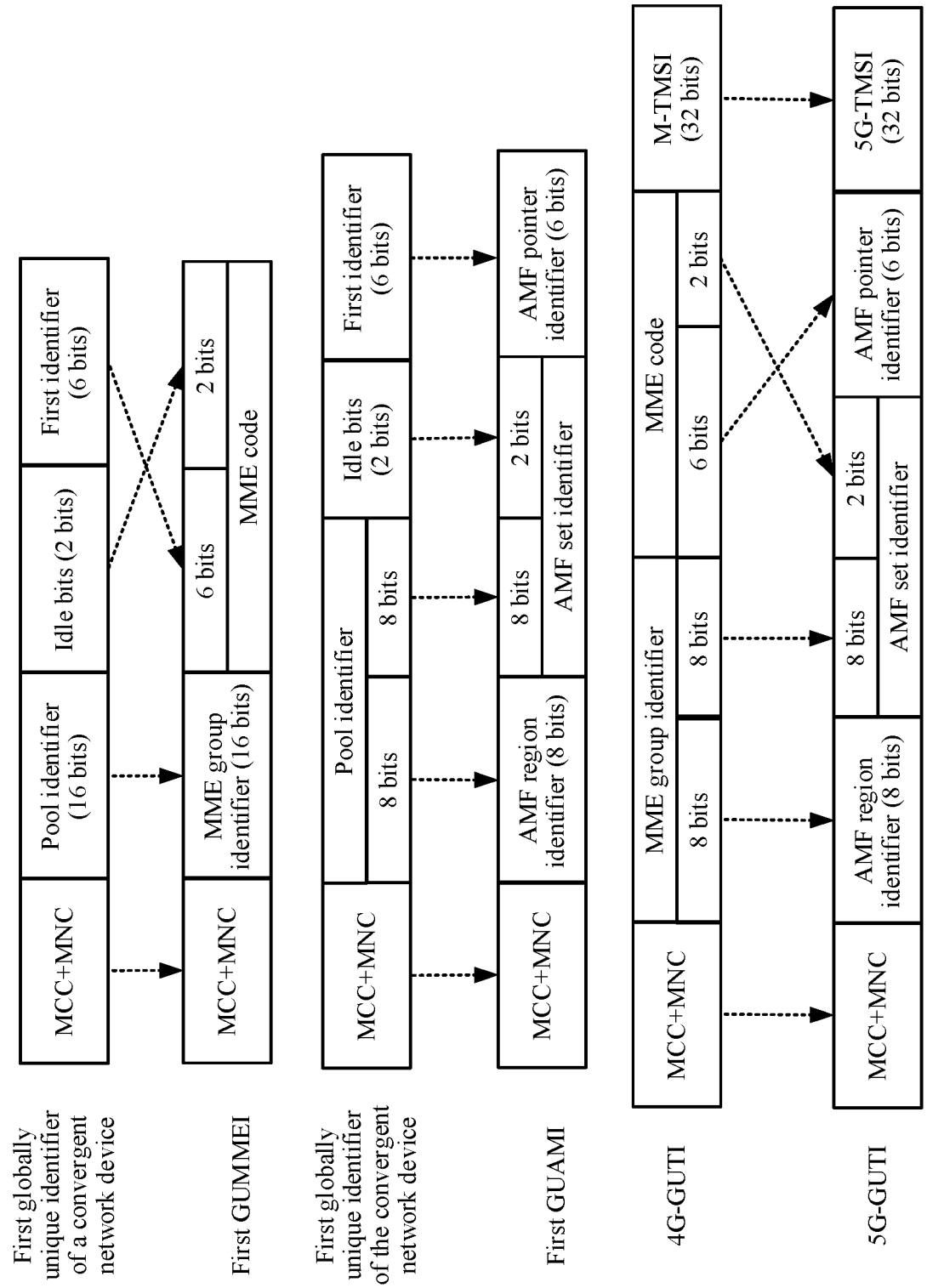
FIG. 9 is a schematic mapping diagram 2 according to an embodiment of this application.

Based on this, in an embodiment, convergent network devices form a convergent network device pool, and an identifier of an MME pool to which a convergent network device belongs and an identifier of an AMF pool to which the convergent network device belongs are uniformly planned, but a first GUMMEI and a first GUAMI that are obtained through mapping are different. In this case, the mapping rule 1 may include: mapping an MCC in the first globally unique identifier to an MCC in the first GUMMEI, and mapping an MNC in the first globally unique identifier to an MNC in the first GUMMEI; mapping an identifier of the convergent network device pool to an MME group identifier in the first GUMMEI; mapping two idle bits in the identifier of the convergent network device pool to two least significant bits in an MME code in the first GUMMEI; mapping a first identifier of the convergent network device to six most significant bits in the MME code in the first GUMMEI; mapping the MCC in the first globally unique identifier to an MCC in the first GUAMI, and mapping the MNC in the first globally unique identifier to an MNC in the first GUAMI; mapping eight most significant bits in the identifier of the convergent network device pool to an AMF region identifier in the first GUAMI; mapping eight least significant bits in the identifier of the convergent network device pool and the two idle bits in the identifier of the convergent network device pool to an AMF set identifier in the first GUAMI; and mapping the first identifier of the convergent network device to an AMF pointer in the first GUAMI. A mapping result is shown in FIG. 9, and a corresponding specific example is shown in FIG. 10. Details are not described herein.

In addition, FIG. 9 shows a corresponding manner of mapping between a 5G-GUTI and a 4G-GUTI. Specifically, an MCC in the 4G-GUTI is mapped to an MCC in the 5G-GUTI, and an MNC in the 4G-GUTI is mapped to an MNC in the 5G-GUTI; eight most significant bits in an MME group identifier in the 4G-GUTI are mapped to an AMF region identifier in the 5G-GUTI; eight least significant bits in the MME group identifier in the 4G-GUTI are mapped to eight most significant bits in an AMF set identifier in the 5G-GUTI; six most significant bits in an MME code in the 4G-GUTI are mapped to an AMF pointer in the 5G-GUTI; two least significant bits in the MME code in the 4G-GUTI are mapped to two least significant bits in the AMF set identifier in the 5G-GUTI; and an M-TMSI in the 4G-GUTI is mapped to a 5G-TMSI in the 5G-GUTI. According to the manner of mapping between the 5G-GUTI and the 4G-GUTI in FIG. 9, a third GUMMEI that is on a 4G network and that is obtained by mapping a first GUAMI, and a third GUAMI that is on a 5G network and that is obtained by mapping a first GUMMEI may be determined. A result is shown in FIG. 10. In this case, the first GUMMEI is the same as the third GUMMEI, and the first GUAMI is the same as the third GUAMI.

In an embodiment, the mapping manner shown in FIG. 9 is also applicable to a scenario in which a convergent network device is newly planned and deployed. This is not specifically limited in this embodiment of this application.

Optionally, in an embodiment of this application, according to the mapping rule 1, a 5G-TMSI allocated by a convergent network device to a terminal that performs access from a 5G network may be the same as or different from an M-TMSI allocated by the convergent network device to a terminal that performs access from a 4G network. This is not specifically limited in this embodiment of this application.

Manner 2: A convergent network device maps a first globally unique identifier of the convergent network device to a first GUMMEI according to a mapping rule 2, and maps a second globally unique identifier of the convergent network device to a first GUAMI according to a mapping rule 3.

Figure 11:
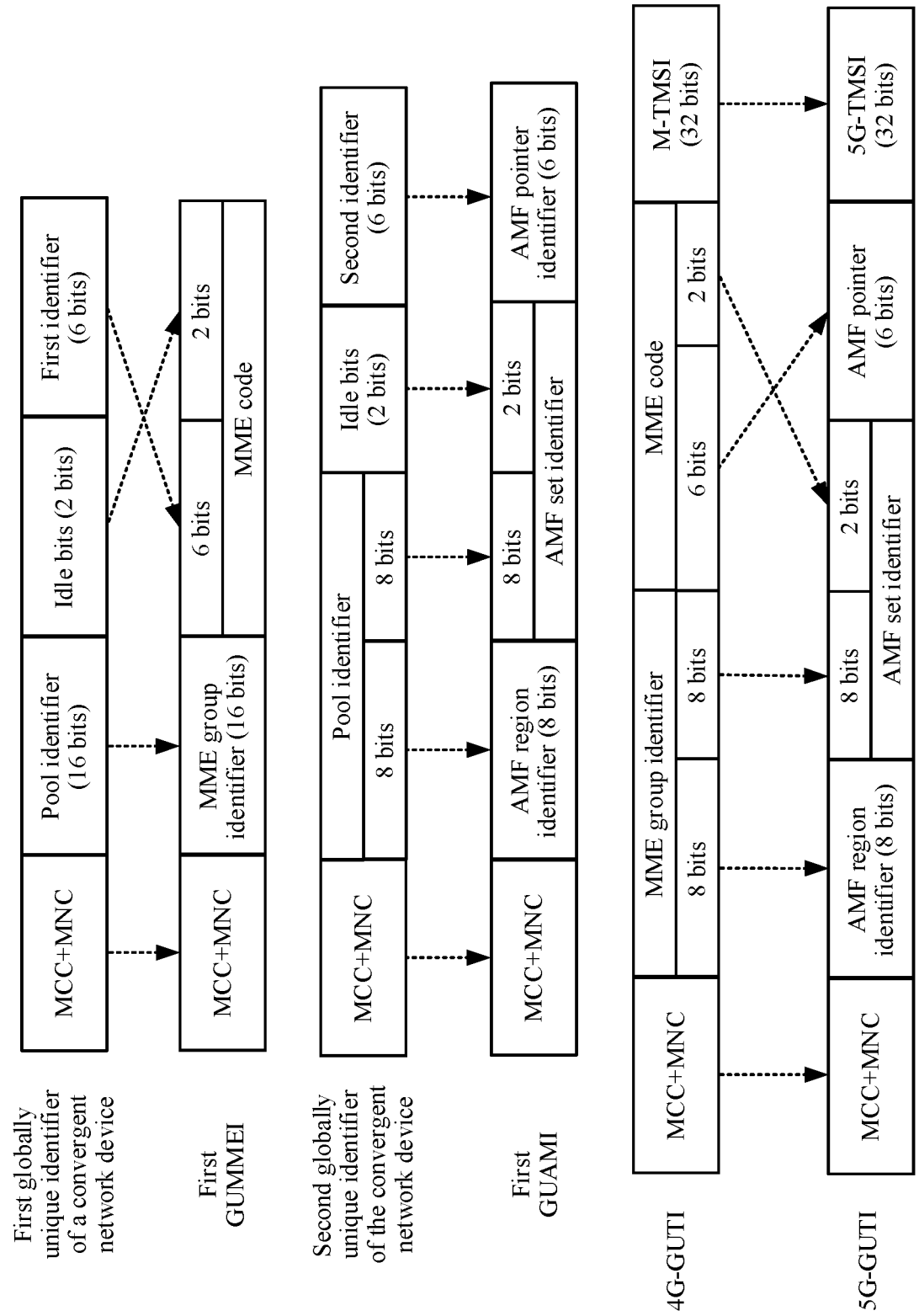
FIG. 11 is a schematic mapping diagram 4 according to an embodiment of this application.

Optionally, in an embodiment, an identifier of a convergent network device pool is uniformly planned, but the convergent network devices in the convergent network device pool have different identifiers. In this case, the mapping rule 2 may include: mapping an MCC and an MNC in the first globally unique identifier of the convergent network device to an MCC and an MNC in the first GUMMEI respectively, mapping the identifier of the convergent network device pool to an MME group identifier in the first GUMMEI, mapping two idle bits in the identifier of the convergent network device pool to two least significant bits in an MME code in the first GUMMEI, and mapping a first identifier of the convergent network device to six most significant bits in the MME code in the first GUMMEI; and the mapping rule 3 includes: mapping an MCC or an MNC in the second globally unique identifier of the convergent network device to an MCC or an MNC in the first GUAMI, mapping eight most significant bits in the identifier of the convergent network device pool to an AMF region identifier in the first GUAMI, mapping eight least significant bits in the identifier of the convergent network device pool and the two idle bits in the identifier of the convergent network device pool to an AMF set identifier in the first GUAMI, and mapping a second identifier of the convergent network device to an AMF pointer in the first GUAMI. A mapping result is shown in FIG. 11, and a corresponding example is shown in FIG. 12. Details are not described herein.

In addition, FIG. 11 shows a corresponding manner of mapping between a 5G-GUTI and a 4G-GUTI. Specifically, an MCC in the 4G-GUTI is mapped to an MCC in the 5G-GUTI, and an MNC in the 4G-GUTI is mapped to an MNC in the 5G-GUTI; eight most significant bits in an MME group identifier in the 4G-GUTI are mapped to an AMF region identifier in the 5G-GUTI; eight least significant bits in the MME group identifier in the 4G-GUTI are mapped to eight most significant bits in an AMF set identifier in the 5G-GUTI; six most significant bits in an MME code in the 4G-GUTI are mapped to an AMF pointer in the 5G-GUTI; two least significant bits in the MME code in the 4G-GUTI are mapped to two least significant bits in the AMF set identifier in the 5G-GUTI; and an M-TMSI in the 4G-GUTI is mapped to a 5G-TMSI in the 5G-GUTI. According to the manner of mapping between the 5G-GUTI and the 4G-GUTI in FIG. 11, a third GUMMEI that is on a 4G network and that is obtained by mapping a first GUAMI, and a third GUAMI that is on a 5G network and that is obtained by mapping a first GUMMEI may be determined. A result is shown in FIG. 12.

The following describes in detail the access method provided in the embodiments of this application with reference to the foregoing descriptions.

Optionally, in an example in which the first network in the access system shown in FIG. 1 is a 4G network and the second network in the access system is a 5G network, FIG.

13 shows an access method according to an embodiment of this application. The access method includes the following operations.

S1301. An E-UTRAN device sends an S1 setup request (S1 setup request) message to a convergent network device, so that the convergent network device receives the S1 setup request message from the E-UTRAN device.

The S1 setup request message is used to request to register with the convergent network device.

S1302. The convergent network device separately maps one or more globally unique identifiers of the convergent network device to corresponding GUMMEIs according to a mapping rule, to obtain a group of GUMMEIs.

The group of GUMMEIs includes one or more GUMMEIs. The one or more GUMMEIs include a first GUMMEI. The first GUMMEI is obtained by the convergent network device by mapping a first globally unique identifier of the convergent network device according to the mapping rule.

For related descriptions of a globally unique identifier of the convergent network device, refer to the foregoing brief descriptions. Details are not described herein again. In different globally unique identifiers of the convergent network device, one or more of MNCs, MCCs, identifiers of convergent network device pools to which the convergent network device belongs, and identifiers of the convergent network device in the convergent network device pools may be the same or different. Therefore, in this embodiment of this application, different GUMMEIs in the group of GUMMEIs obtained by mapping the one or more globally unique identifiers of the convergent network device may belong to one MME pool, that is, MCCs, MNCs, and MME group identifiers are all the same; or may belong to a plurality of MME pools, that is, one or more of MCCs, MNCs, or MME group IDs are different. This is not limited in this embodiment of this application.

Optionally, in an embodiment of this application, the convergent network device may separately map the one or more globally unique identifiers of the convergent network device to the corresponding GUMMEIs according to the mapping rule shown in FIG. 7 in the mapping rule 1 in the foregoing brief descriptions, to obtain the group of GUMMEIs. This is not specifically limited in this embodiment of this application.

It should be noted that, in an embodiment of this application, a GUMMEI obtained by mapping a globally unique identifier of the convergent network device is different from a GUMMEI of any other MME on a network, and is also different from a GUMMEI obtained by mapping a GUAMI of any AMF network element on the network. This is uniformly described herein, and details are not described in the following again.

S1303. The convergent network device sends an S1 setup response (S1 setup response) message to the E-UTRAN device, so that the E-UTRAN device receives the S1 setup response message from the convergent network device.

The S1 setup response message carries the group of GUMMEIs in operation S1302.

In an embodiment, the S1 setup response message may further carry weight information corresponding to the convergent network device when the convergent network device serves as an MME. The weight information may be determined based on weight information of the convergent network device. For example, the weight information of the convergent network device is mapped, based on a specific proportion, to the weight information corresponding to the convergent network device when the convergent network device serves as the MME. This is not specifically limited in this embodiment of this application.

It should be noted that, in this embodiment of this application, the weight information of the convergent network device represents a processing capability of the convergent network device compared with that of another convergent network device in a convergent network device pool to which the convergent network device belongs. Usually, a stronger processing capability indicates a higher weight of the convergent network device. This is uniformly described herein, and details are not described in the following again.

It should be noted that operations S1301 to S1303 are optional operations, and are described merely by using an example in which the E-UTRAN device interacts with one of convergent network devices connected to the E-UTRAN device to obtain a group of GUMMEIs corresponding to the convergent network device when the convergent network device serves as an MME. Certainly, the E-UTRAN device may be further connected to another convergent network device or an MME. For a manner of interacting with the another convergent network device to obtain a group of GUMMEIs corresponding to the convergent network device when the convergent network device serves as an MME, refer to operations S1301 to S1303. For a manner of interacting with the MME to obtain a GUMMEI corresponding to the MME, refer to the current technology. Details are not described herein. Further, after the E-UTRAN device obtains a GUMMEI fed back by one or more convergent network devices or MMEs connected to the E-UTRAN device, the E-UTRAN device may determine the following network topology relationship based on the GUMMEI fed back by the one or more convergent network devices or MMEs connected to the E-UTRAN device:

1. A quantity of MME pools to which the E-UTRAN device is connected, and an MCC, an MNC, and an MME group ID that correspond to each MME pool; and 2. A quantity of MMEs in each MME pool, and an MME code and a communication address of each MME.

S1304. A terminal sends an attach/tracking area update (TAU) request message to the E-UTRAN device, so that the E-UTRAN device receives the attach/TAU request message from the terminal.

For example, operation S1304 may occur in the following several scenarios.

Scenario 1: The terminal accesses the 4G network for the first time. A message body of the attach/TAU request message does not include an old GUTI. A message header does not include a GUMMEI in the old GUTI.

Scenario 2: The terminal has previously performed access from an old MME other than the convergent network device in FIG. 13. A message body of the attach/TAU request message includes a 4G-GUTI that is allocated by the old MME and that is used as an old GUTI. A message header includes a GUMMEI of the old MME.

Scenario 3: The terminal has previously performed access from an old AMF network element other than the convergent network device in FIG. 13. A message body of the attach/TAU request message includes a mapped 4G-GUTI that is obtained by mapping a 5G-GUTI allocated by the old AMF network element and that is used as an old GUTI, and also carries a type indication of the old GUTI to indicate that the old GUTI is obtained by mapping the 4G-GUTI, that is, the old GUTI is a mapped GUTI. A message header includes a mapped GUMMEI obtained by mapping a GUAMI of the old AMF network element.

Scenario 4: The terminal has previously performed access by using the convergent network device in FIG. 13 as an AMF network element. A message body of the attach/TAU request message includes a mapped 4G-GUTI that is obtained by mapping a 5G-GUTI allocated by the convergent network device and that is used as an old GUTI, and also carries a type indication of the old GUTI to indicate that the old GUTI is obtained by mapping the 4G-GUTI. A message header includes a mapped GUMMEI obtained by mapping a GUAMI of the old AMF network element. As can be learned from the descriptions of the mapping rule 1, the mapped GUMMEI is the same as a native GUMMEI that corresponds to the convergent network device when the convergent network device serves as an MME and that is sent by the convergent network device to the E-UTRAN device in operation S1302.

Scenario 5: The terminal has previously performed access by using the convergent network device in FIG. 13 as an MME. A message body of the attach/TAU request message includes a 4G-GUTI that is allocated by the convergent network device and that is used as an old GUTI. A message header includes a native GUMMEI corresponding to the convergent network device when the convergent network device serves as the MME.

In an embodiment of this application, after receiving the attach/TAU request message from the terminal, the E-UTRAN device may compare information in the message header of the attach/TAU request message with a previously stored GUMMEI of each MME connected to the E-UTRAN device, and determine whether an old MME or an old AMF network element corresponding to the terminal is connected to the E-UTRAN device.

Figure 13:
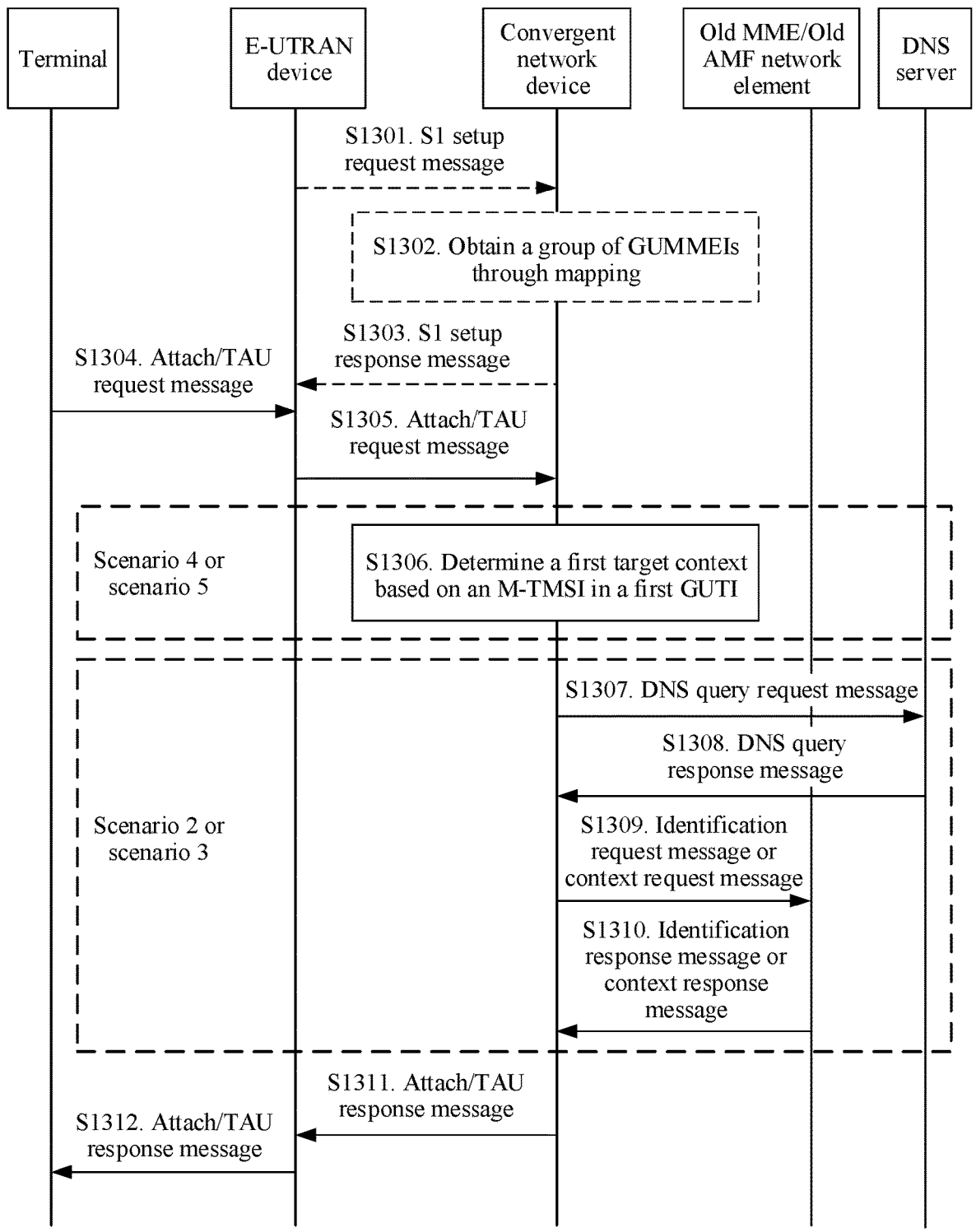
FIG. 13 is a schematic flowchart 1 of an access method according to an embodiment of this application.

When the E-UTRAN device determines that the old MME or the old AMF network element corresponding to the terminal is connected to the E-UTRAN device, and a function of the old MME or the old AMF network element is performed by the convergent network device in FIG. 13 (for example, in the scenario 4 or the scenario 5); or when the E-UTRAN device determines that the old MME or the old AMF network element corresponding to the terminal is not connected to the E-UTRAN device (for example, in some cases in the scenario 1 to the scenario 3), but the E-UTRAN device selects the convergent network device in FIG. 13 to serve the terminal, the access method provided in this embodiment of this application may further include operation S1305.

S1305. The E-UTRAN device sends an attach/TAU request message to the convergent network device, so that the convergent network device receives the attach/TAU request message from the E-UTRAN device.

It is assumed that a device identifier corresponding to the convergent network device when the convergent network device serves as an MME is a first GUMMEI, an old GUTI carried in a message body of the attach/TAU request message is denoted as a first GUTI, and a message header carries a second GUMMEI in the first GUTI. In this case, after the convergent network device receives the attach/TAU request message from the E-UTRAN device, the convergent network device performs operation S1306 or performs S1307 to S1310 based on content in the message header of the attach/TAU request message.

S1306. When the second GUMMEI in the first GUTI is the same as the first GUMMEI, the convergent network device determines a first target context based on an M-TMSI in the first GUTI. The first target context is a 4G context of the terminal.

In an embodiment of this application, if the second GUMMEI in the first GUTI is the same as the first GUMMEI, it indicates that the first GUTI is allocated by the convergent network device, that is, this may belong to the scenario 4 or the scenario 5. In this case, the convergent network device may determine the first target context based on the M-TMSI in the first GUTI. Specifically, when the convergent network device finds the 4G context of the terminal based on the M-TMSI in the first GUTI, the convergent network device determines the 4G context of the terminal as the first target context; or when the convergent network device finds a 5G context of the terminal based on the M-TMSI in the first GUTI, the convergent network device determines, a 4G context obtained by converting the 5G context of the terminal as the first target context.

S1307. When the second GUMMEI in the first GUTI is different from the first GUMMEI, the convergent network device sends a DNS query request message to a domain name system (DNS) server, so that the DNS server receives the DNS query request message from the convergent network device. The DNS query request message is used to request to query address information of the old MME or the old AMF network element.

In an embodiment of this application, if the second GUMMEI in the first GUTI is different from the first GUMMEI, it indicates that the first GUTI is not allocated by the convergent network device, that is, this may belong to the scenario 2 or the scenario 3. In the scenario 2, the DNS query request message is used to request to query address information of the old MME. In the scenario 3, the DNS query request message is used to request to query address information of the old AMF network element. When the convergent network device serves as the MME, whether the first GUTI is the old GUTI in the scenario 2 or the mapped GUTI in the scenario 3 may not be identified, and processing is uniformly performed based on the MME. Therefore, in this case, the convergent network device may directly construct an MME FQDN based on the second GUMMEI in the first GUTI, and add the MME FQDN to the DNS query request message to query the address information of the old MME or the old AMF network element. A format of the MME FQDN is as follows, and the MME FQDN includes information about the second GUMMEI:

mmec<MMEC>.mmegi<MMEGI>.mme.epc.mnc<MNC>.mcc<MCC>.3gppnetwork.org; and
query parameter: "x-3gpp-mme:x-s10".

S1308. The DNS server sends a DNS query response (DNS query response) message to the convergent network device, so that the convergent network device receives the DNS query response message from the DNS server.

In the scenario 2, the DNS query response message carries the address information of the old MME. In the scenario 3, the DNS query response message carries the address information of the old AMF network element.

S1309. The convergent network device sends an identification request message or a context request message to the old MME or the old AMF network element, so that the old MME or the old AMF network element receives the identification request message or the context request message from the convergent network device. The identification request message or the context request message is used to request a context of the terminal.

The identification request message in an embodiment of this application corresponds to the foregoing attach request message, and the context request message in this embodiment of this application corresponds to the foregoing TAU request message. This is uniformly described herein, and details are not described in the following again.

S1310. The old MME or the old AMF network element sends an identification response message or a context response message to the convergent network device, so that the convergent network device receives the identification response message or the context response message from the old MME or the old AMF network element. The identification response message or the context response message carries a 4G context or a 5G context of the terminal.

In the scenario 2, the identification response message or the context response message carries the 4G context of the terminal, and the convergent network device may determine the 4G context as a first target context. In the scenario 3, the identification response message or the context response message carries the 5G context of the terminal, and the convergent network device may determine, a 4G context obtained by converting the 5G context of the terminal as a first target context.

Further, in the scenario 1, after operation S1305; or in the scenarios 4 and 5, after operation S1306; or in the scenario 2 or 3, after operation S1310, the access method provided in this embodiment of this application may further include operations S1311 and S1312.

S1311. The convergent network device sends an attach/TAU response message to the E-UTRAN device, so that the E-UTRAN device receives the attach/TAU response message from the convergent network device. The attach/TAU response message carries a newly allocated 4G-GUTI. The newly allocated 4G-GUTI may be uniquely associated with a context of a terminal that performs access from the 4G network.

S1312. The E-UTRAN device sends an attach/TAU response message to the terminal, so that the terminal receives the attach/TAU response message from the E-UTRAN device.

According to the access method provided in an embodiment of this application, signaling interaction in an access process of a terminal can be reduced, thereby simplifying an access procedure of the terminal. For analysis of a related technical effect, refer to related descriptions of the access system. Details are not described herein again.

The actions of the convergent network device in operations S1301 to S1312 may be performed by the processor 301 in the communications device 300 shown in FIG. 3 by invoking the application program code stored in the memory 303. This is not limited in this embodiment of this application.

Figure 14A:
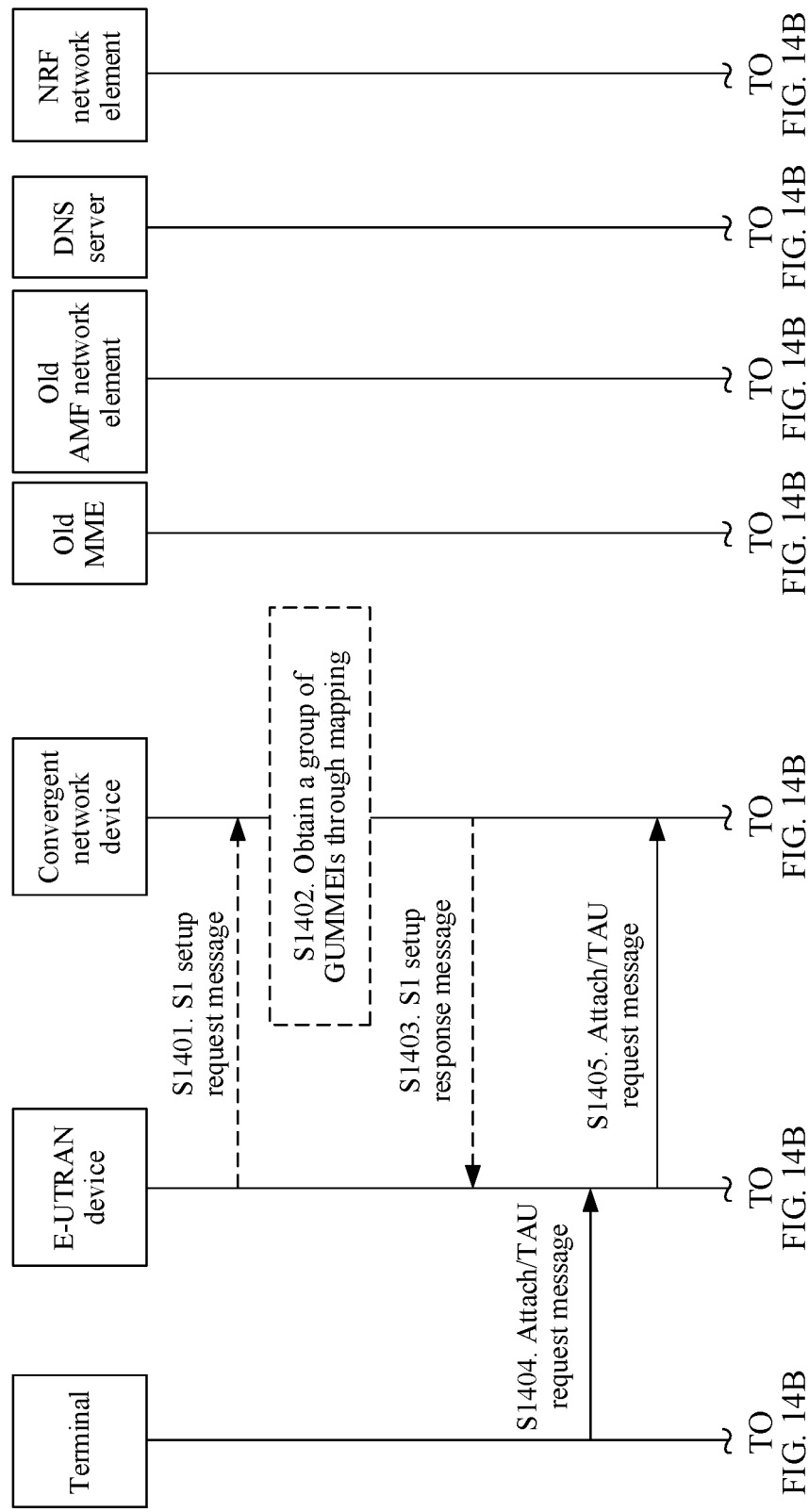
FIG. 14A, FIG. 14B and FIG. 14C are schematic flowchart 2 of an access method according to an embodiment of this application.
Figure 14B:
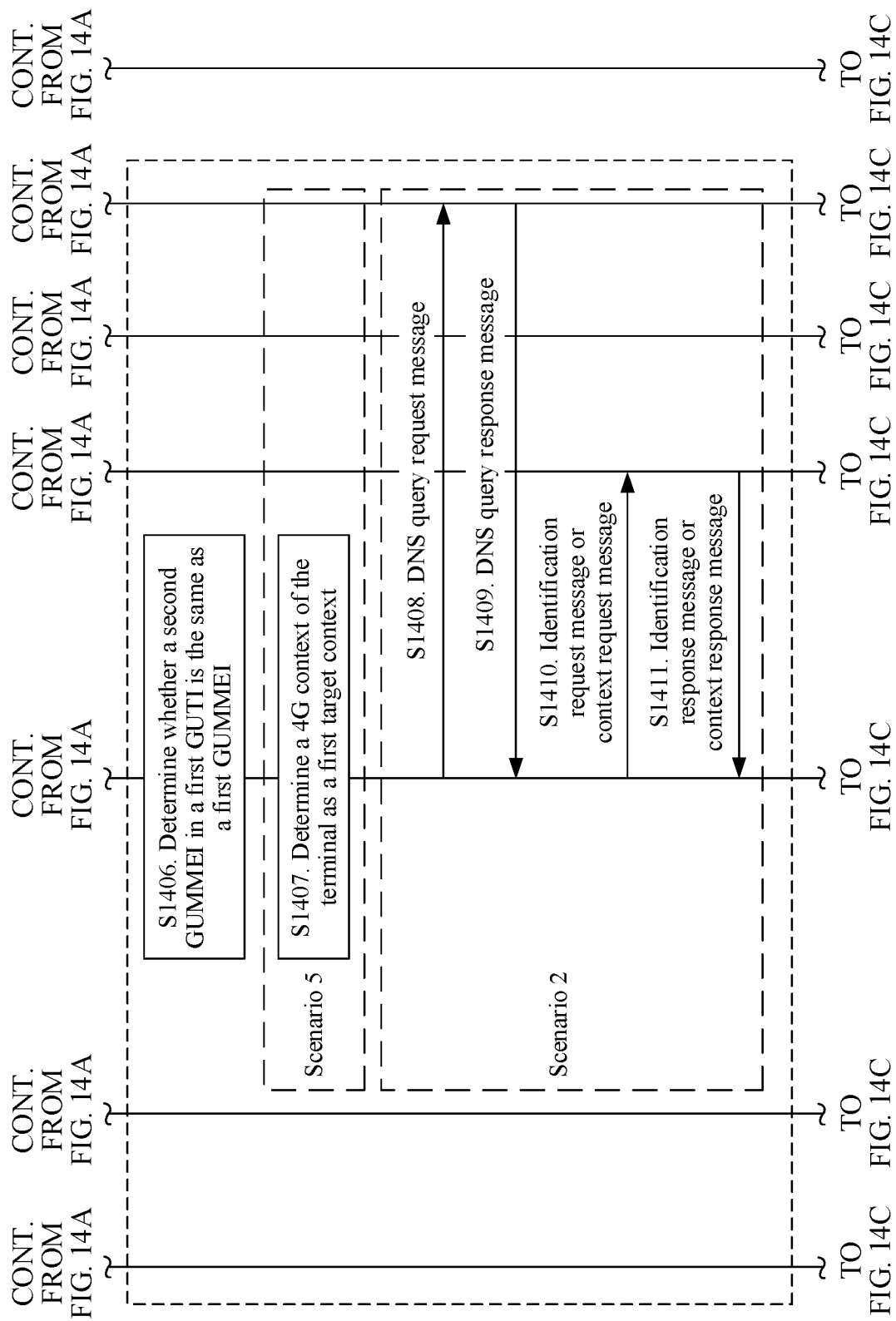
Figure 14C:
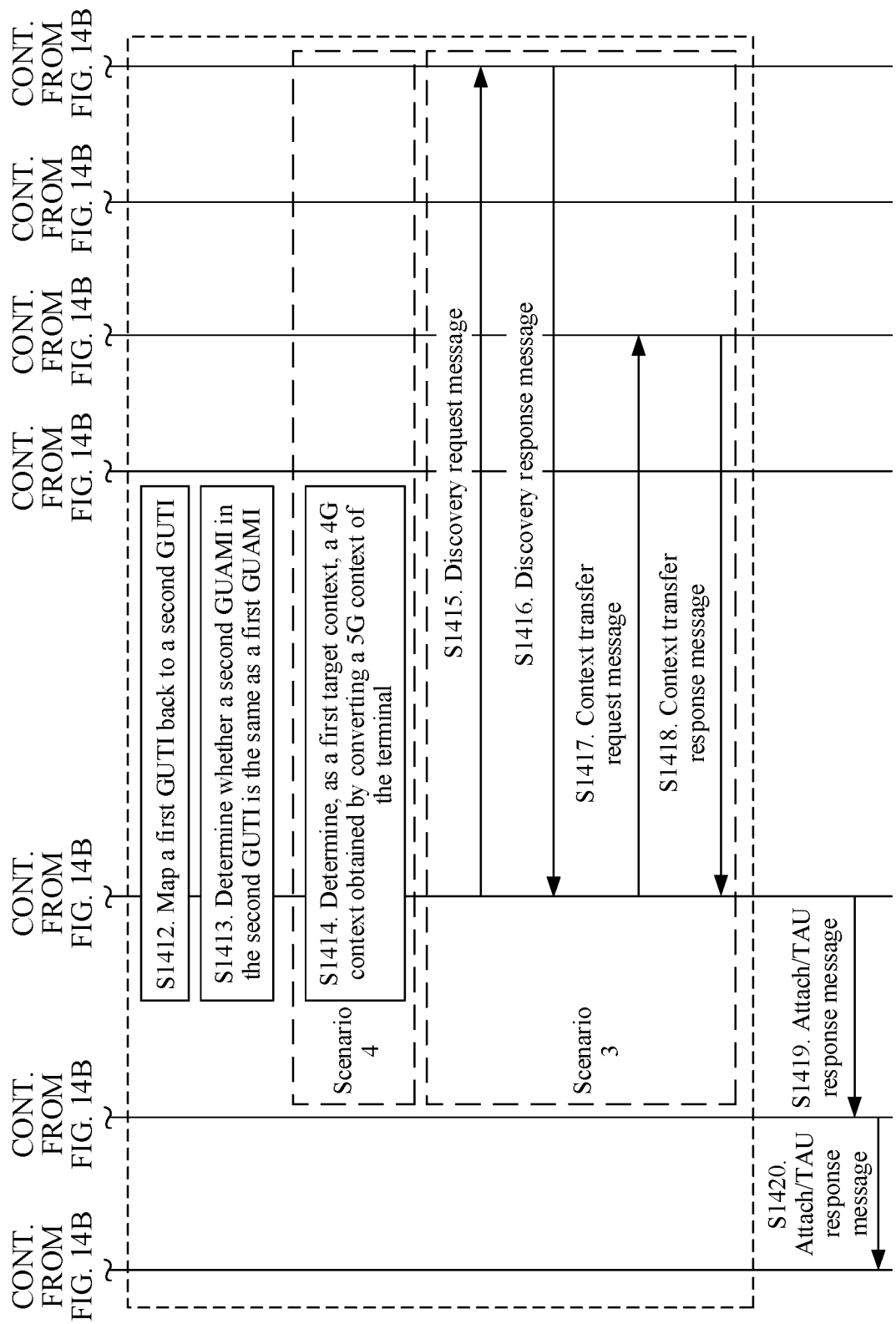

In an embodiment, in an example in which the first network in the access system shown in FIG. 1 is a 4G network and the second network in the access system is a 5G network, FIG. 14A, FIG. 14 B and FIG. 14C show another access method according to an embodiment of this application. The access method includes the following operations.

S1401 to S1403 are similar to operations S1301 to S1303. For example, a difference lies in that, in this embodiment of this application, the convergent network device may separately map the one or more globally unique identifiers of the convergent network device to the corresponding GUMMEIs according to the mapping rule shown in FIG. 7 or the mapping rule shown in FIG. 9 in the mapping rule 1 in the foregoing brief descriptions, to obtain the group of GUMMEIs. For other related descriptions, refer to the embodiment shown in FIG. 13. Details are not described herein again.

S1404 and S1405 are the same as operations S1304 and S1305. For related descriptions, refer to the embodiment shown in FIG. 13. Details are not described herein again.

It is assumed that a device identifier corresponding to the convergent network device when the convergent network device serves as an MME is a first GUMMEI, a device identifier corresponding to the convergent network device when the convergent network device serves as an AMF network element is a first GUAMI, an old GUTI carried in a message body of the attach/TAU request message is denoted as a first GUTI, and a message header carries a second GUMMEI in the first GUTI. In this case, after the convergent network device receives the attach/TAU request message from the E-UTRAN device, the convergent network device performs operations S1406 to S1411 or performs S1412 to S1418 based on content in the message header of the attach/TAU request message.

S1406. When the first GUTI is an old GUTI on the 4G network, the convergent network device determines whether the second GUMMEI in the first GUTI is the same as the first GUMMEI.

When the second GUMMEI is the same as the first GUMMEI, this may correspond to the scenario 5. In this case, operation S1407 may be performed.

When the second GUMMEI is different from the first GUMMEI, this may correspond to the scenario 2. In this case, operations S1408 to S1411 may be performed.

S1407. The convergent network device searches for a 4G context of the terminal based on an M-TMSI in the first GUTI, and determines the 4G context of the terminal as a first target context.

S1408 to S1411 are similar to operations S1307 to S1310. For example, a difference lies in that the old MME or the old AMF network element in the embodiment shown in FIG. 13 is replaced with an old MME.

S1412. When the first GUTI is a mapped GUTI obtained by mapping an old GUTI (denoted as a second GUTI) on the 5G network, the convergent network device maps the first GUTI back to the second GUTI.

S1413. The convergent network device determines whether a second GUAMI in the second GUTI is the same as the first GUAMI.

When the second GUAMI in the second GUTI is the same as the first GUAMI, this may correspond to the scenario 4. In this case, operation S1414 may be performed.

When the second GUAMI in the second GUTI is different from the first GUAMI, this may correspond to the scenario 3. In this case, operations S1415 to S1418 may be performed.

S1414. The convergent network device searches for a 5G context of the terminal based on a 5G-TMSI in the first GUTI, and determines, a 4G context obtained by converting the 5G context of the terminal as a first target context.

S1415. The convergent network device sends a discovery request (discovery request) message to a network repository function (network repository function, NRF) network element, so that the NRF network element receives the discovery request message from the convergent network device.

The discovery request message carries the second GUAMI in the second GUTI, and is used to request to query address information of an old AMF network element.

S1416. The NRF network element sends a discovery response (discovery response) message to the convergent network device, so that the convergent network device receives the discovery response message from the NRF network element.

The discovery response message carries the address information of the old AMF network element.

S1417 and S1418 are similar to operations 1309 and S1310. For example, a difference lies in that the old MME or the old AMF network element in the embodiment shown in FIG. 13 is replaced with an old AMF network element, the identification request message or the context request message in operations 1309 and S1310 is replaced with a context transfer request message, and the identification response message or the context response message in operations 1309 and S1310 is replaced with a context transfer response message. In this case, the convergent network device may determine, as a first target context, a 4G context obtained by converting a 5G context of the terminal.

Further, in the scenario 1, after operation S1405; or in the scenario 2, after operation S1411; or in the scenario 3, after operation S1418; or in the scenario 4, after operation S1414; or in the scenario 5, after operation S1407, the access method provided in this embodiment of this application may further include operations S1419 and S1420.

S1419 and S1420 are the same as operations S1311 and S1312. For related descriptions, refer to the embodiment shown in FIG. 13. Details are not described herein again.

According to the access method provided in an embodiment of this application, signaling interaction in an access process of a terminal can be reduced, thereby simplifying an access procedure of the terminal. For analysis of a related technical effect, refer to related descriptions of the access system. Details are not described herein again.

The actions of the convergent network device in operations S1401 to S1420 may be performed by the processor 301 in the communications device 300 shown in FIG. 3 by invoking the application program code stored in the memory 303. This is not limited in this embodiment of this application.

Figure 15A:
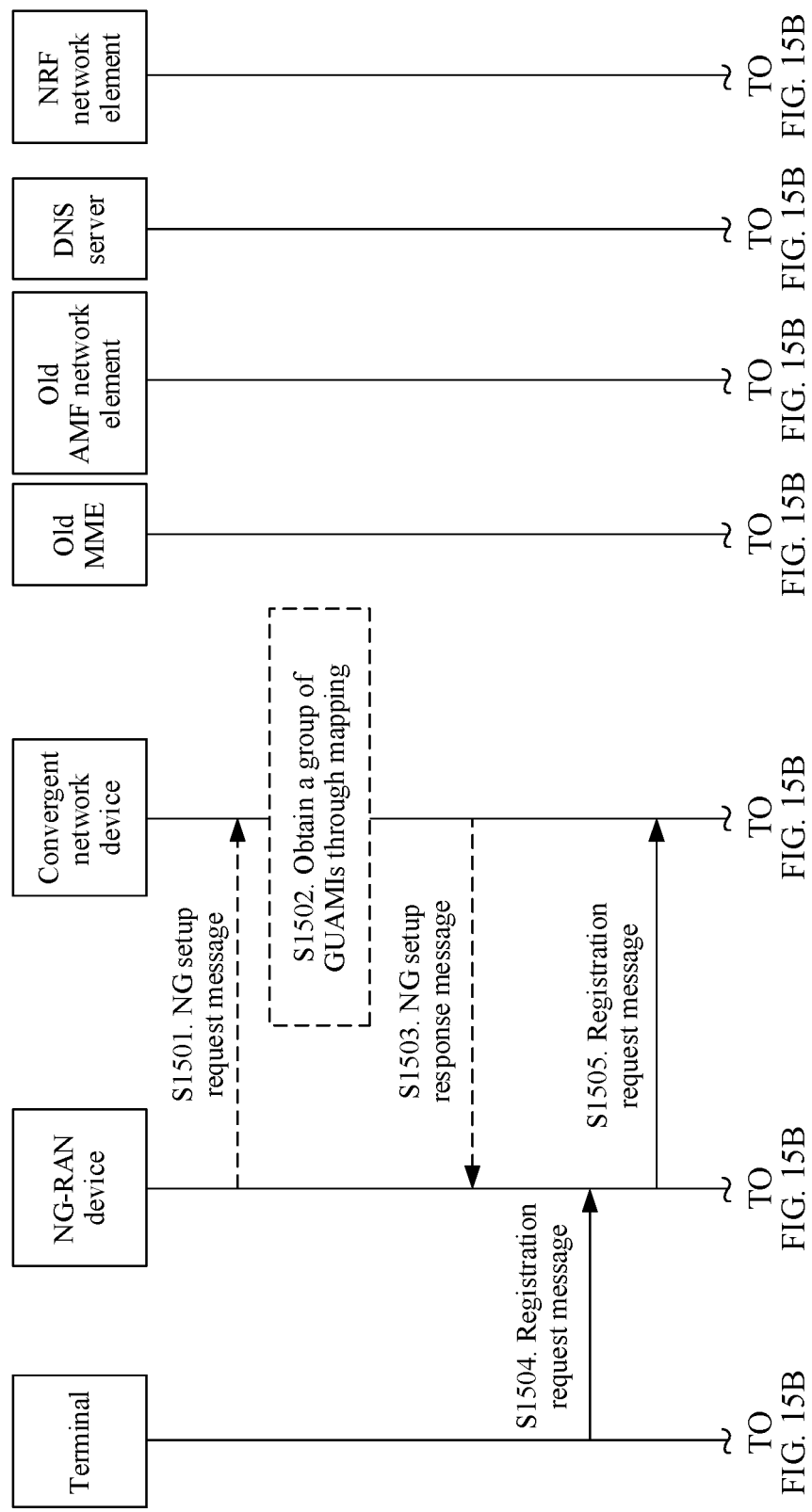
Figure 15C:
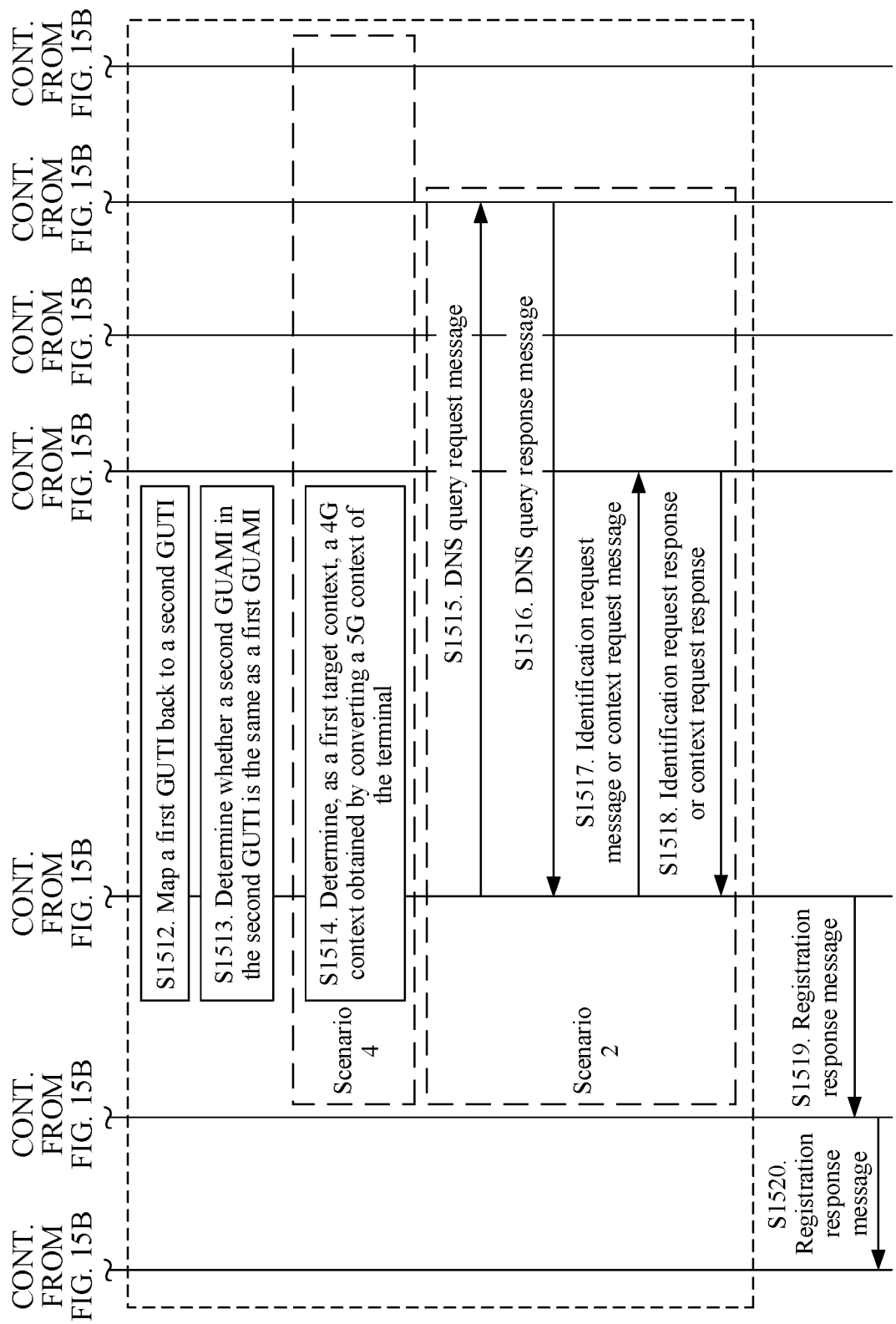

In an embodiment, in an example in which the first network in the access system shown in FIG. 1 is a 5G network and the second network in the access system is a 4G network, FIG. 15A, FIG. 15B and FIG. 15C show another access method according to an embodiment of this application. The access method includes the following operations.

S1501. An NG-RAN device sends an NG setup request (NG setup request) message to a convergent network device, so that the convergent network device receives the NG setup request message from the NG-RAN device.

The NG setup request message is used to request to register with the convergent network device.

S1502. The convergent network device separately maps one or more globally unique identifiers of the convergent network device to corresponding GUAMIs according to a mapping rule, to obtain a group of GUAMIs.

The group of GUAMIs includes one or more GUAMIs. The one or more GUAMIs include a first GUAMI. The first GUAMI is obtained by the convergent network device by mapping a first globally unique identifier of the convergent network device according to the mapping rule.

For related descriptions of a globally unique identifier of the convergent network device, refer to the foregoing brief descriptions. Details are not described herein again. In different globally unique identifiers of the convergent network device, one or more of MNCs, MCCs, identifiers of convergent network device pools to which the convergent network device belongs, and identifiers of the convergent network device in the convergent network device pools may be the same or different. Therefore, in this embodiment of this application, different GUAMIs in the group of GUAMIs obtained by mapping the one or more globally unique identifiers of the convergent network device may belong to one AMF pool, that is, MCCs, MNCs, AMF region IDs, and AMF set IDs are all the same; or may belong to a plurality of AMF pools, that is, one or more of MCCs, MNCs, AMF region IDs, and AMF set IDs are different. This is not specifically limited in this embodiment of this application.

Optionally, in an embodiment of this application, the convergent network device may separately map the one or more globally unique identifiers of the convergent network device to the corresponding GUAMIs according to the mapping rule 1 in the foregoing brief descriptions, to obtain the group of GUAMIs. This is not specifically limited in this embodiment of this application.

It should be noted that, in an embodiment of this application, a GUAMI obtained by mapping a globally unique identifier of the convergent network device is different from a GUAMI of any other AMF network element on a network, and is also different from a GUAMI obtained by mapping a GUMMEI of any other MME on the network. This is uniformly described herein, and details are not described in the following again.

S1503. The convergent network device sends an NG setup request (NG setup response) message to the NG-RAN device, so that the NG-RAN device receives the NG setup response message from the convergent network device.

The NG setup response message carries the group of GUAMIs in operation S1502.

In an embodiment, the NG setup response message may further carry weight information corresponding to the convergent network device when the convergent network device serves as an AMF network element. The weight information may be determined based on weight information of the convergent network device. For example, the weight information of the convergent network device is mapped, based on a specific proportion, to the weight information corresponding to the convergent network device when the convergent network device serves as the AMF network element. This is not specifically limited in this embodiment of this application.

It should be noted that, in an embodiment of this application, the weight information of the convergent network device represents a processing capability of the convergent network device compared with that of another convergent network device in a convergent network device pool to which the convergent network device belongs. Usually, a stronger processing capability indicates a higher weight of the convergent network device. This is uniformly described herein, and details are not described in the following again.

It should be noted that operations S1501 to S1503 are optional operations, and are described merely by using an example in which the NG-RAN device interacts with one of convergent network devices connected to the NG-RAN device to obtain a group of GUAMIs corresponding to the convergent network device when the convergent network device serves as an AMF network element. Certainly, the NG-RAN device may be further connected to another convergent network device or an AMF network element. For a manner of interacting with the another convergent network device to obtain a group of GUAMIs corresponding to the convergent network device when the convergent network device serves as an AMF network element, refer to operations S1501 to S1503. For a manner of interacting with the AMF network element to obtain a GUAMI corresponding to the AMF network element, refer to the current technology. Details are not described herein. Further, after the NG-RAN device obtains a GUAMI fed back by one or more convergent network devices or AMF network elements connected to the NG-RAN device, the NG-RAN device may determine the following network topology relationship based on the GUAMI fed back by the one or more convergent network devices or AMF network elements connected to the NG-RAN device:

1. A quantity of AMF pools to which the NG-RAN device is connected, and an MCC, an MNC, an AMF region ID, and an AMF set ID that correspond to each AMF pool; and 2. A quantity of AMF network elements in each AMF pool, and an AMF pointer and a communication address of each AMF network element.

S1504. A terminal sends a registration request message to the NG-RAN device, so that the NG-RAN device receives the registration request message from the terminal.

For example, operation S1504 may occur in the following several scenarios.

Scenario 1: The terminal accesses the 5G network for the first time. A message body of the registration request message does not include an old GUTI. A message header does not include a GUAMI in the old GUTI.

Scenario 2: The terminal has previously performed access from an old MME other than the convergent network device in FIG. 15A, FIG. 15B and FIG. 15C. A message body of the registration request message includes a mapped 5G-GUTI that is obtained by mapping a 4G-GUTI allocated by the old MME and that is used as an old GUTI, and also carries a type indication of the old GUTI to indicate that the old GUTI is obtained by mapping the 4G-GUTI. A message header includes a GUAMI obtained by mapping a GUMMEI of the old MME.

Scenario 3: The terminal has previously performed access from an old AMF network element other than the convergent network device in FIG. 15A, FIG. 15B and FIG. 15C. A message body of the registration request message includes a 5G-GUTI that is allocated by the old AMF network element and that is used as an old GUTI. A message header includes a GUAMI of the old AMF network element.

Scenario 4: The terminal has previously performed access by using the convergent network device in FIG. 15A, FIG. 15B and FIG. 15C as an MME. A message body of the registration request message includes a mapped 5G-GUTI that is obtained by mapping a 4G-GUTI allocated by the convergent network device and that is used as an old GUTI, and also carries a type indication of the old GUTI to indicate that the old GUTI is obtained by mapping the 4G-GUTI. A message header includes a mapped GUAMI obtained by mapping a GUMMEI of the old MME. The mapped GUAMI is the same as a native GUAMI that corresponds to the convergent network device when the convergent network device serves as an AMF network element and that is sent to the NG-RAN device in operation S1502.

Scenario 5: The terminal has previously performed access by using the convergent network device in FIG. 15A, FIG. 15B and FIG. 15C as an AMF network element. A message body of the registration request message includes a 5G-GUTI that is allocated by the convergent network device and that is used as an old GUTI. A message header includes a native GUAMI corresponding to the convergent network device when the convergent network device serves as the AMF network element.

In an embodiment of this application, after receiving the registration request message from the terminal, the NG-RAN device may compare information in the message header of the registration request message with a previously stored GUAMI of each AMF network element connected to the NG-RAN device, and determine whether an old MME or an old AMF network element corresponding to the terminal is connected to the NG-RAN device.

When the NG-RAN device determines that the old MME or the old AMF network element corresponding to the terminal is connected to the NG-RAN device, and a function of the old MME or the old AMF network element is performed by the convergent network device in FIG. 15A, FIG. 15B and FIG. 15C (for example, in the scenario 4 or the scenario 5); or when the NG-RAN device determines that the old MME or the old AMF network element corresponding to the terminal is not connected to the NG-RAN device (for example, in some cases in the scenario 1 to the scenario 3), but the NG-RAN device selects the convergent network device in FIG. 15A, FIG. 15B and FIG. 15C to serve the terminal, the access method provided in this embodiment of this application may further include operation S1505.

S1505. The NG-RAN device sends a registration request message to the convergent network device, so that the convergent network device receives the registration request message from the NG-RAN device.

It is assumed that a device identifier corresponding to the convergent network device when the convergent network device serves as an MME is a first GUMMEI, a device identifier corresponding to the convergent network device when the convergent network device serves as an AMF network element is a first GUAMI, an old GUTI carried in a message body of the registration request message is denoted as a first GUTI, and a message header carries a second GUAMI in the first GUTI. In this case, after the convergent network device receives the registration request message from the NG-RAN device, the convergent network device performs operations S1506 to S1511 or performs S1512 to S1518 based on content in the message header of the registration request message.

S1506. When the first GUTI is an old GUTI on the 5G network, the convergent network device determines whether the second GUAMI in the first GUTI is the same as the first GUAMI.

When the second GUAMI is the same as the first GUAMI, this may correspond to the scenario 5. In this case, operation S1507 may be performed.

When the second GUAMI is different from the first GUAMI, this may correspond to the scenario 3. In this case, operations S1508 to S1511 may be performed.

S1507. The convergent network device searches for a 5G context of the terminal based on a 5G-TMSI in the first GUTI, and determines the 5G context of the terminal as a first target context.

S1508 to S1511 are similar to operations S1415 to S1418. For example, a difference lies in that the identification request message or the context request message in operations S1415 to S1418 is replaced with a context transfer request message, and the identification response message or the context response message in operations S1415 to S1418 is replaced with a context transfer response message. For other related descriptions, refer to the embodiment shown in FIG. 14A, FIG. 14 B and FIG. 14C. Details are not described herein again.

S1512. When the first GUTI is a mapped GUTI obtained by mapping an old GUTI (denoted as a second GUTI) on the 4G network, the convergent network device maps the first GUTI back to the second GUTI.

S1513. The convergent network device determines whether a second GUMMEI in the second GUTI is the same as the first GUMMEI.

When the second GUMMEI in the second GUTI is the same as the first GUMMEI, this may correspond to the scenario 4. In this case, operation S1514 may be performed.

When the second GUMMEI in the second GUTI is different from the first GUMMEI, this may correspond to the scenario 2. In this case, operations S1515 to S1518 may be performed.

S1514. The convergent network device searches for a 4G context of the terminal based on an M-TMSI in the first GUTI, and determines, a 5G context obtained by converting the 4G context of the terminal as a first target context.

S1515 to S1518 are the same as operations S1408 to S1411. For related descriptions, refer to the embodiment shown in FIG. 14A, FIG. 14 B and FIG. 14C. Details are not described herein again.

Further, in the scenario 1, after operation S1505; or in the scenario 2, after operation S1518; or in the scenario 3, after operation S1511; or in the scenario 4, after operation S1514; or in the scenario 5, after operation S1507, the access method provided in this embodiment of this application may further include operations S1519 and S1520.

S1519. The convergent network device sends a registration response message to the NG-RAN device, so that the NG-RAN device receives the registration response message from the convergent network device. The registration response message carries a newly allocated 5G-GUTI. The newly allocated 5G-GUTI may be uniquely associated with a context of a terminal that performs access from the 5G network.

S1520. The NG-RAN device sends a registration response message to the terminal, so that the terminal receives the registration response message from the NG-RAN device.

According to the access method provided in an embodiment of this application, signaling interaction in an access process of a terminal can be reduced, thereby simplifying an access procedure of the terminal. For analysis of a related technical effect, refer to related descriptions of the access system. Details are not described herein again.

The actions of the convergent network device in operations S1501 to S1520 may be performed by the processor 301 in the communications device 300 shown in FIG. 3 by invoking the application program code stored in the memory 303. This is not limited in this embodiment of this application.

Figure 16:
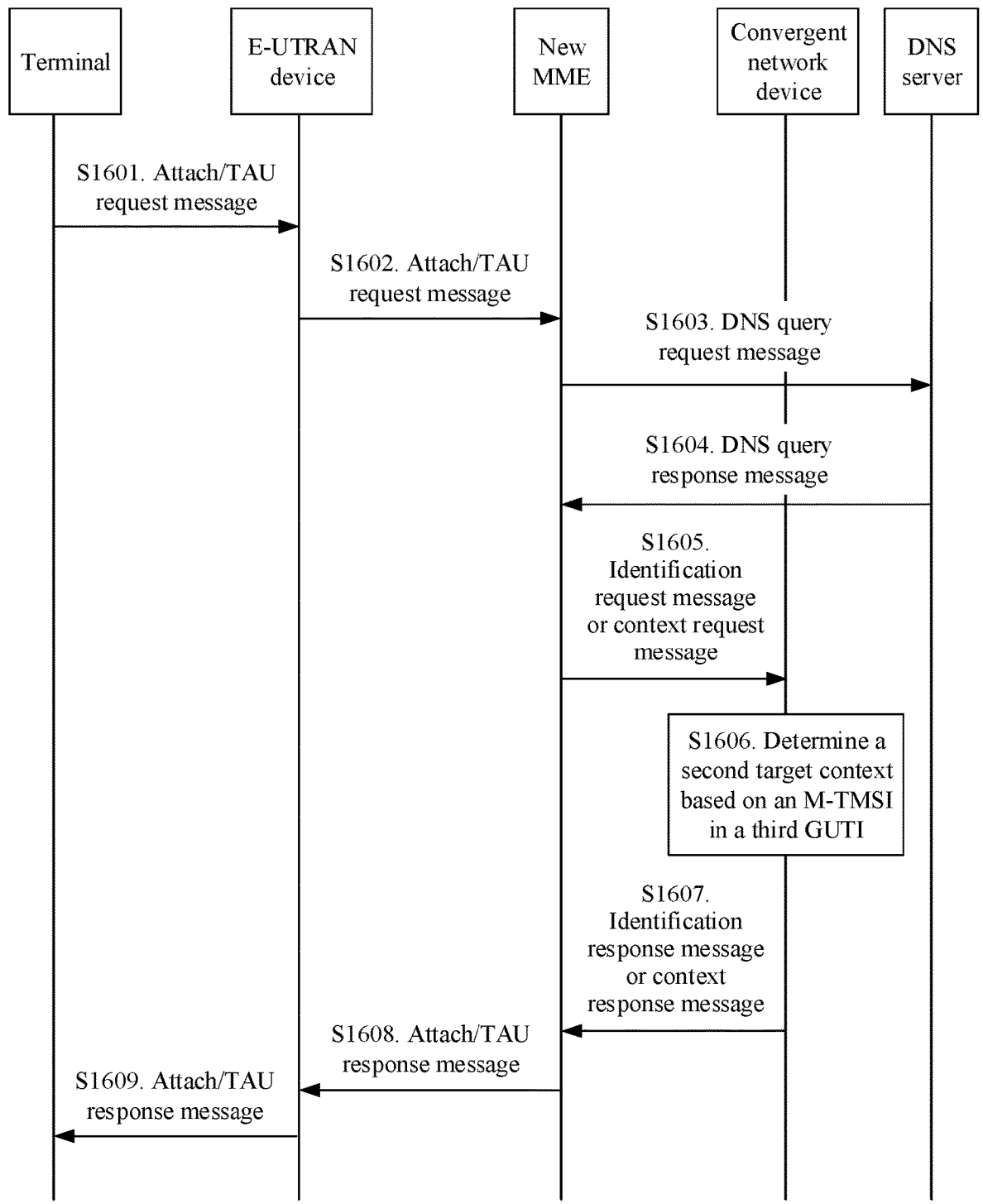
FIG. 16 is a schematic flowchart 4 of an access method according to an embodiment of this application.

In an embodiment, based on the access methods shown in FIG. 13 to FIG. 15A, FIG. 15B and FIG. 15C, it is assumed that a terminal accesses a new MME from a convergent network device by using a network reselection procedure. In this case, the new MME does not distinguish whether an old GUTI of the terminal is allocated by an AMF network element or an MME. Specifically, the access method is shown in FIG. 16, and includes the following operations.

S1601. A terminal sends an attach/TAU request message to an E-UTRAN device, so that the E-UTRAN device receives the attach/TAU request message from the terminal.

This embodiment of this application is described merely by using an example in which the terminal accesses a new MME from a convergent network device by using a network reselection procedure. Therefore, the access method provided in this embodiment of this application further includes the following operations.

S1602. The E-UTRAN device sends an attach/TAU request message to the new MME, so that the new MME receives the attach/TAU request message from the E-UTRAN device.

S1603 and S1604 are similar to operations S1307 and S1308. For example, a difference lies in that, in this scenario, although the new MME requests address information of an old MME or an old AMF network element from a DNS server, the address information of the old MME or the old AMF network element that is fed back by the DNS server is the same, and is a local address, configured for the convergent network devices, of a unified peer network element interface. For other related descriptions, refer to the embodiment shown in FIG. 13. Details are not described herein again.

S1605. The new MME sends an identification request message or a context request message to the convergent network device based on the address information fed back in operation S1604, so that the convergent network device receives the identification request message or the context request message from the new MME. The identification request message or the context request message carries a third GUTI, and is used to request a context of the terminal.

In an embodiment, the third GUTI may be an old GUTI on a 4G network, or may be a mapped GUTI obtained by mapping an old GUTI on a 5G network. This is not specifically limited in this embodiment of this application.

S1606. The convergent network device determines a second target context of the terminal on the 4G network based on the third GUTI.

In an embodiment, when the convergent network device finds a 4G context of the terminal based on an M-TMSI in the third GUTI, the convergent network device determines the 4G context of the terminal as the second target context; or when the convergent network device finds a 5G context of the terminal based on an M-TMSI in the third GUTI, the convergent network device determines, a 4G context obtained by converting the 5G context of the terminal as the second target context. This is not specifically limited in this embodiment of this application.

S1607. The convergent network device sends an identification response message or a context response message to the new MME, so that the new MME receives the identification response message or the context response message from the convergent network device. The identification response message or the context response message carries the second target context of the terminal.

S1608. The new MME sends an attach/TAU response message to the E-UTRAN device, so that the E-UTRAN device receives the attach/TAU response message from the new MME. The attach/TAU response message carries a newly allocated 4G-GUTI. The newly allocated 4G-GUTI may be uniquely associated with a context of a terminal that performs access from the 4G network.

S1609. The E-UTRAN device sends an attach/TAU response message to the terminal, so that the terminal receives the attach/TAU response message from the E-UTRAN device.

According to the access method provided in an embodiment of this application, signaling interaction in an access process of a terminal can be reduced, thereby simplifying an access procedure of the terminal. For analysis of a related technical effect, refer to related descriptions of the access system. Details are not described herein again.

The actions of the convergent network device in operations S1601 to S1609 may be performed by the processor 301 in the communications device 300 shown in FIG. 3 by invoking the application program code stored in the memory 303. This is not limited in this embodiment of this application.

Figure 17A:
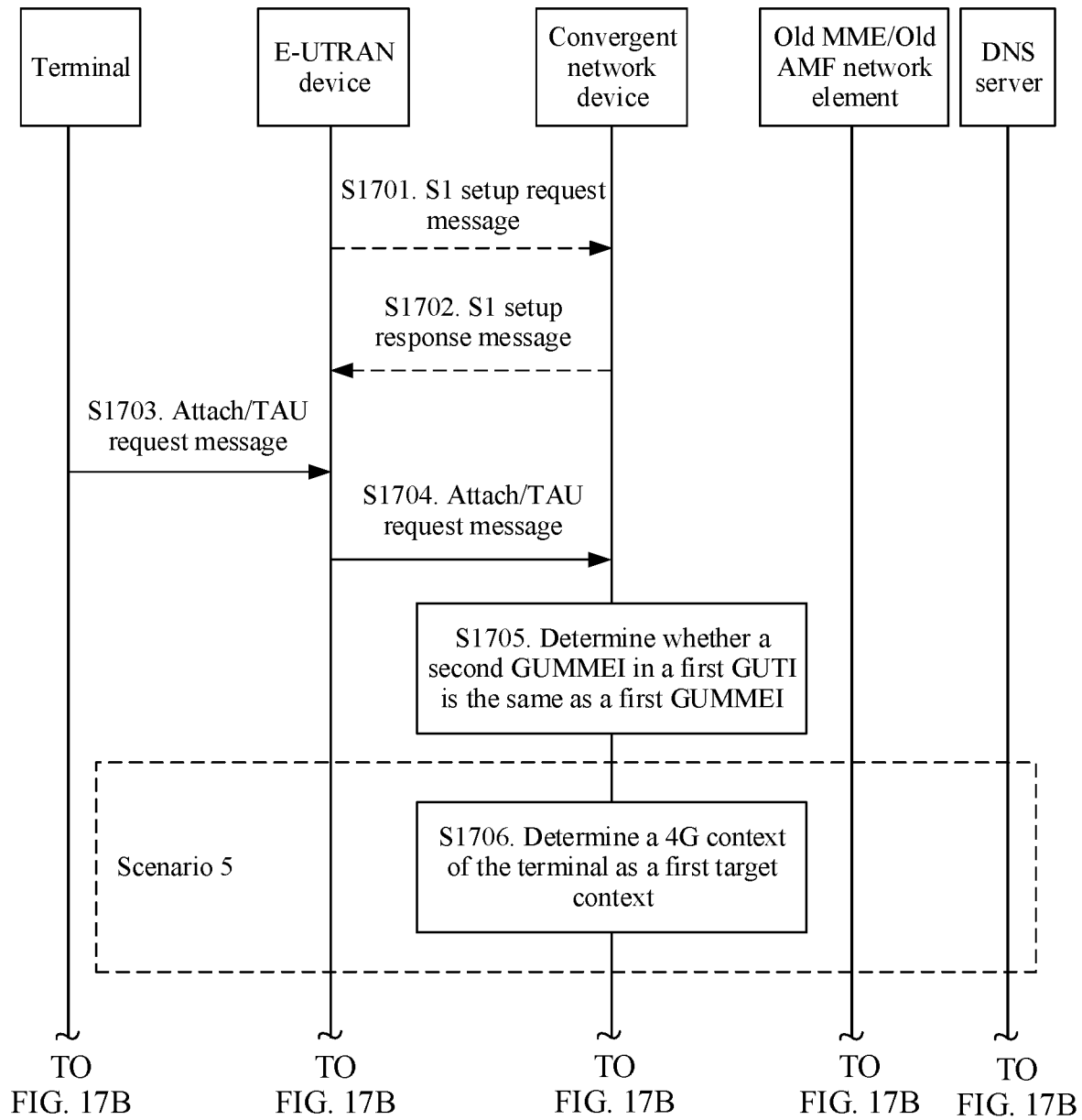
FIG. 17A and FIG. 17B are schematic flowchart 5 of an access method according to an embodiment of this application.
Figure 17B:
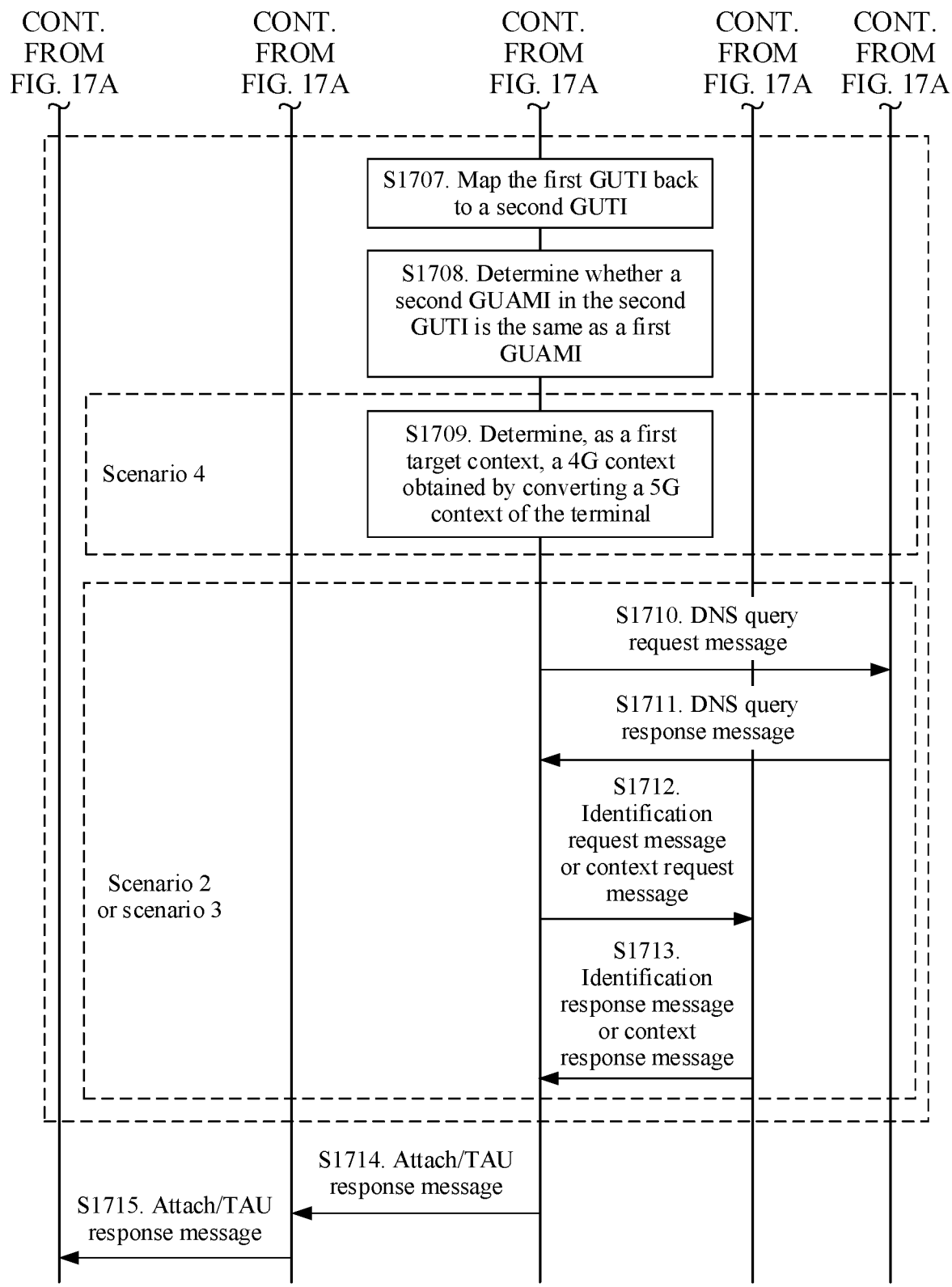

In an embodiment, in an example in which the first network in the access system shown in FIG. 1 is a 4G network and the second network in the access system is a 5G network, FIG. 17A and FIG. 17B show an access method according to an embodiment of this application. The access method includes the following operations.

S1701. An E-UTRAN device sends an S1 setup request message to a convergent network device, so that the convergent network device receives the S1 setup request message from the E-UTRAN device.

The S1 setup request message is used to request to register with the convergent network device.

S1702. The convergent network device sends an S1 setup response message to the E-UTRAN device, so that the E-UTRAN device receives the S1 setup response message from the convergent network device.

The S1 setup response message carries two groups of GUMMEIs.

One group of GUMMEIs are GUMMEIs corresponding to the convergent network device when the convergent network device serves as an MME, and are denoted as native (native) GUMMEIs, and represent 4G network devices. The other group of GUMMEIs are GUMMEIs obtained by mapping native (native) GUAMIs corresponding to the convergent network device when the convergent network device serves as an AMF network element, and are denoted as mapped (mapped) GUMMEIs, and represent 5G network devices.

Optionally, in an embodiment of this application, an AMF pool and an MME pool on a network are separately planned. For example, a native GUAMI and a native GUMMEI to which the convergent network device belongs are separately configured on the convergent network device. A mapped GUMMEI obtained by mapping a native GUAMI according to the current technology is different from a GUMMEI of any MME on the network, and is also different from a GUMMEI obtained by mapping a native GUAMI of another AMF network element on the network according to the current technology.

Optionally, in another embodiment, a native GUMMEI and a native GUANI may be separately obtained by mapping different globally unique identifiers of the convergent network device according to the manner in FIG. 11. For related descriptions, refer to the descriptions of FIG. 11. Details are not described herein again.

Optionally, in an embodiment of this application, different GUMMEIs in a group of GUMMEIs may belong to one MME pool, that is, MCCs, MNCs, and MME group identifiers are all the same; or may belong to a plurality of MME pools, that is, one or more of MCCs, MNCs, or MME group IDs are different. This is not specifically limited in this embodiment of this application.

Optionally, the S1 setup response message in an embodiment of this application may further carry weight information corresponding to the convergent network device when the convergent network device serves as an MME. For related descriptions, refer to operation S1303. Details are not described herein again.

It should be noted that operations S1701 and S1702 are optional operations, and are described merely by using an example in which the E-UTRAN device interacts with one of convergent network devices connected to the E-UTRAN device to obtain a native GUMMEI and a mapped GUMMEI that correspond to the convergent network device. Certainly, the E-UTRAN device may be further connected to another convergent network device or an MME. For a manner of interacting with the another convergent network device to obtain a native GUMMEI and a mapped GUMMEI that correspond to the convergent network device, refer to operations S1701 and S1702. For a manner of interacting with the MME to obtain a native GUMMEI corresponding to the MME, refer to the current technology. Details are not described herein. Further, after the E-UTRAN device obtains a native GUMMEI fed back by one or more convergent network devices or MMEs connected to the E-UTRAN device, the E-UTRAN device may determine the following network topology relationship based on the native GUMMEI fed back by the one or more convergent network devices or MMEs connected to the E-UTRAN device:

1. A quantity of MME pools to which the E-UTRAN device is connected, and an MCC, an MNC, and an MME group ID that correspond to each MME pool; and 2. A quantity of MMEs in each MME pool, and an MME code and a communication address of each MME.

S1703 is the same as operation S1304. For related descriptions, refer to the embodiment shown in FIG. 13. Details are not described herein again.

In an embodiment of this application, after receiving the attach/TAU request message from the terminal, the E-UTRAN device may compare information in a message header of the attach/TAU request message with a previously stored native GUMMEI and mapped GUMMEI of each MME connected to the E-UTRAN device, and determine whether an old MME or an old AMF network element corresponding to the terminal is connected to the E-UTRAN device.

When the E-UTRAN device determines that the old MME or the old AMF network element corresponding to the terminal is connected to the E-UTRAN device, and a function of the old MME or the old AMF network element is performed by the convergent network device in FIG. 17A and FIG. 17B (for example, in the scenario 4 or the scenario 5); or when the E-UTRAN device determines that the old MME or the old AMF network element corresponding to the terminal is not connected to the E-UTRAN device (for example, in the scenario 1 to the scenario 3), but the E-UTRAN device selects the convergent network device in FIG. 17A and FIG. 17B to serve the terminal, the access method provided in this embodiment of this application may further include operation S1704.

S1704. The E-UTRAN device sends an attach/TAU request message to the convergent network device, so that the convergent network device receives the attach/TAU request message from the E-UTRAN device.

It is assumed that a device identifier corresponding to the convergent network device when the convergent network device serves as an MME is a first GUMMEI, a device identifier corresponding to the convergent network device when the convergent network device serves as an AMF network element is a first GUAMI, an old GUTI carried in a message body of the attach/TAU request message is denoted as a first GUTI, and a message header carries a second GUMMEI in the first GUTI. In this case, after the convergent network device receives the attach/TAU request message from the E-UTRAN device, the convergent network device performs the following operations based on content in the message header of the attach/TAU request message.

S1705. The convergent network device determines whether a second GUMMEI in the first GUTI is the same as the first GUMMEI.

When the second GUMMEI in the first GUTI is the same as the first GUMMEI, this may correspond to the scenario 5. In this case, operation S1706 may be performed.

When the second GUMMEI in the first GUTI is the same as the first GUMMEI, this may correspond to the scenario 2, the scenario 3, or the scenario 4. In this case, operations S1707 to S1713 may be performed.

S1706. The convergent network device searches for a 4G context of the terminal based on an M-TMSI in the first GUTI, and determines the 4G context of the terminal as a first target context of the terminal on the 4G network.

S1707. The convergent network device maps the first GUTI back to a second GUTI.

The second GUTI is an old GUTI on the 5G network.

S1708. The convergent network device determines whether a second GUAMI in the second GUTI is the same as the first GUAMI.

When the second GUAMI in the second GUTI is the same as the first GUAMI, this may correspond to the scenario 4. In this case, operation S1709 may be performed.

When the second GUAMI in the second GUTI is different from the first GUAMI, this may correspond to the scenario 2 or 3. In this case, operations S1710 to S1713 may be performed.

S1709. The convergent network device searches for a 5G context of the terminal based on a 5G-TMSI in the second GUTI, and determines, a 4G context obtained by converting the 5G context of the terminal as a first target context.

S1710 to S1713 are the same as operations S1307 to S1310. For related descriptions, refer to the embodiment shown in FIG. 13. Details are not described herein again.

Further, in the scenario 1, after operation S1704; or in the scenario 2 or the scenario 3, after operation S1713; or in the scenario 4, after operation S1418; or in the scenario 4, after operation S1709; or in the scenario 5, after operation S1706, the access method provided in this embodiment of this application may further include operations S1714 and S1715.

S1714 and S1715 are the same as operations S1311 and S1312. For related descriptions, refer to the embodiment shown in FIG. 13. Details are not described herein again.

According to the access method provided in this embodiment of this application, signaling interaction in an access process of a terminal can be reduced, thereby simplifying an access procedure of the terminal. For analysis of a related technical effect, refer to related descriptions of the access system. Details are not described herein again.

The actions of the convergent network device in operations S1701 to S1715 may be performed by the processor 301 in the communications device 300 shown in FIG. 3 by invoking the application program code stored in the memory 303. This is not limited in this embodiment of this application.

Figure 18A:
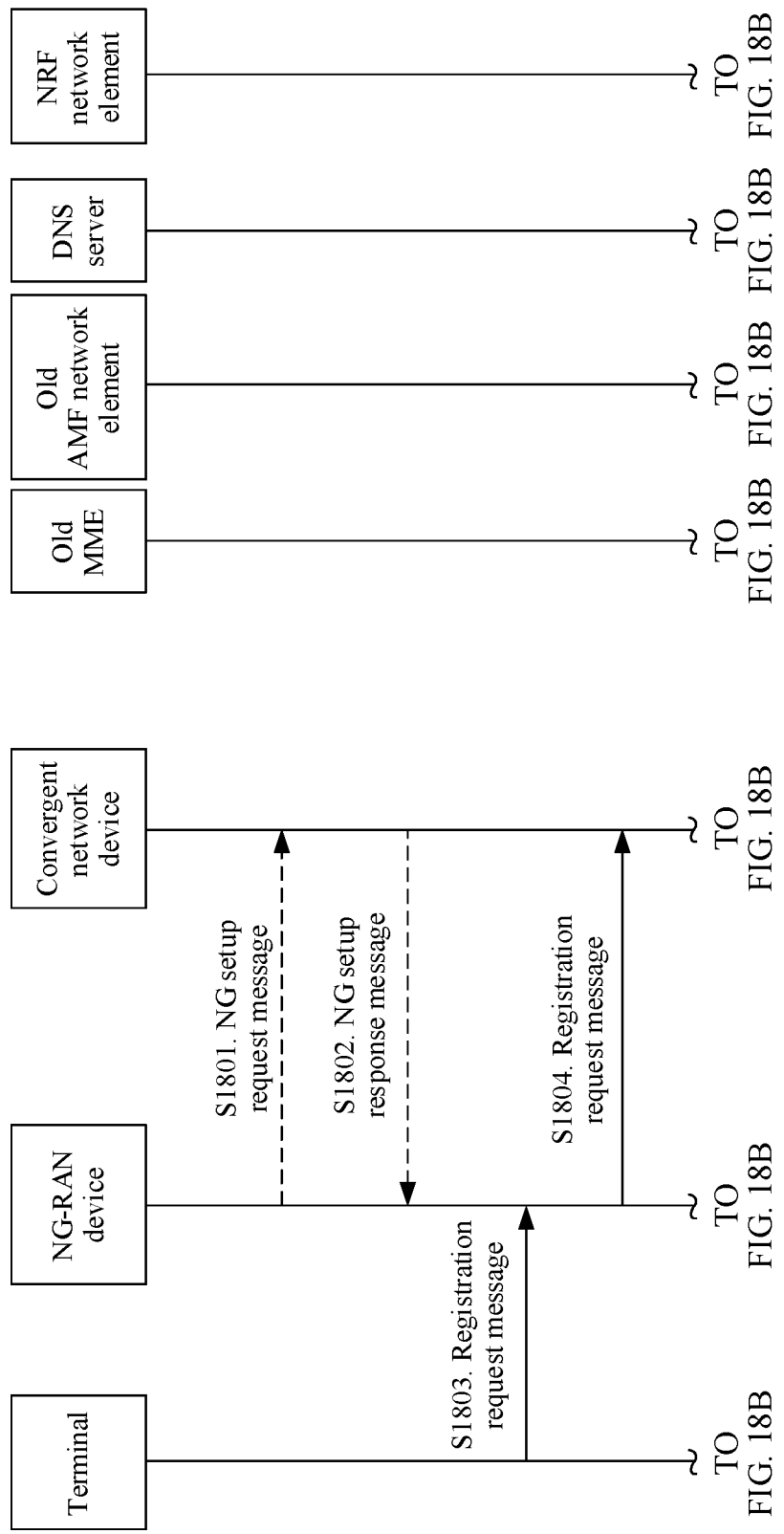
Figure 18C:
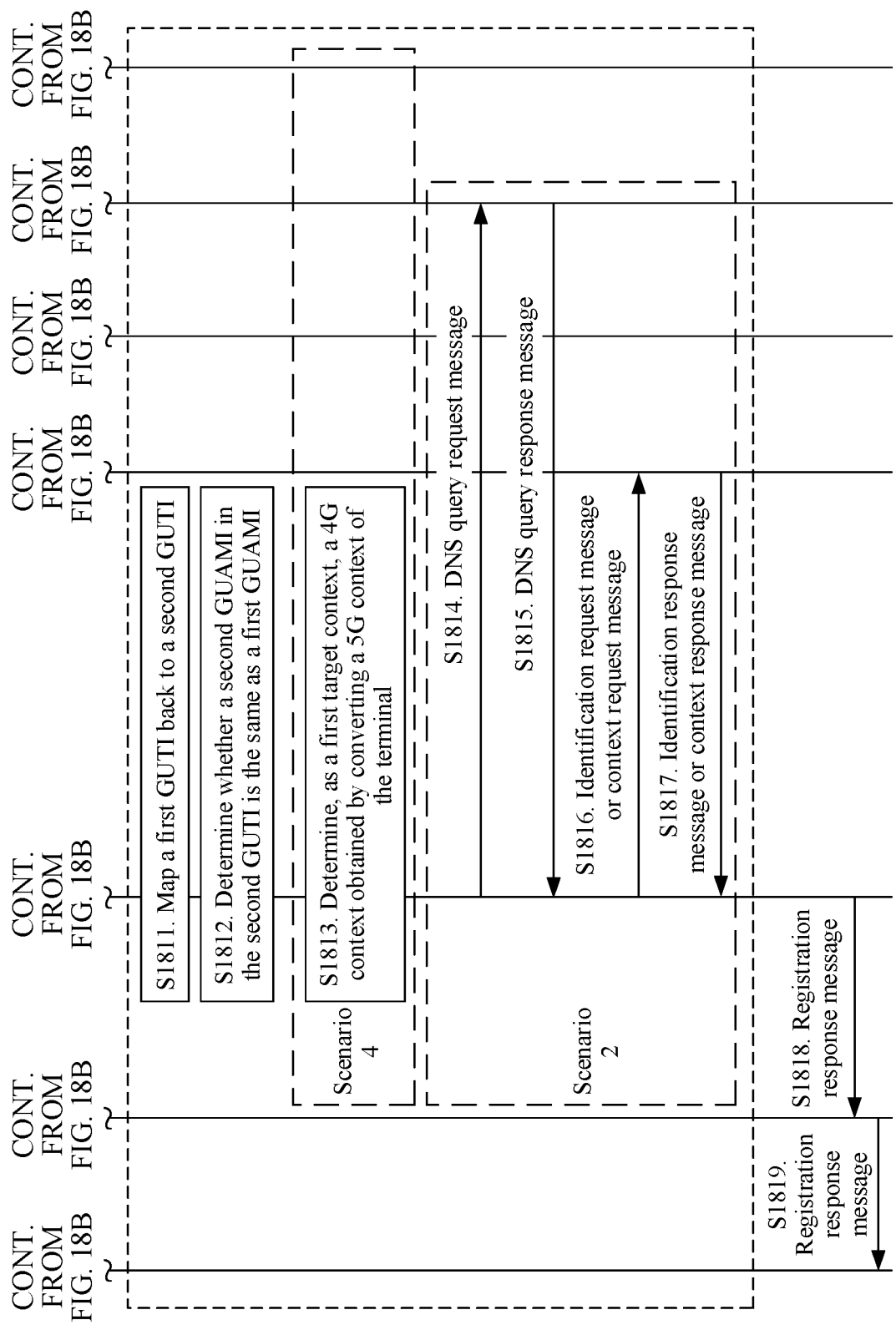

In an embodiment, in an example in which the first network in the access system shown in FIG. 1 is a 5G network and the second network in the access system is a 4G network, FIG. 18A, FIG. 18B and FIG. 18C show another access method according to an embodiment of this application. The access method includes the following operations.

S1801. An NG-RAN device sends an NG setup request message to a convergent network device, so that the convergent network device receives the NG setup request message from the NG-RAN device.

The NG setup request message is used to request to register with the convergent network device.

S1802. The convergent network device sends an NG setup response message to the NG-RAN device, so that the NG-RAN device receives the NG setup response message from the convergent network device.

The NG setup response message carries two groups of GUAMIs.

One group of GUAMIs are GUAMIs corresponding to the convergent network device when the convergent network device serves as an AMF network element, and are denoted as native (native) GUAMIs, and represent 5G network devices. The other group of GUAMIs are GUAMIs obtained by mapping native (native) GUMMEIs corresponding to the convergent network device when the convergent network device serves as an MME, and are denoted as mapped (mapped) GUAMIs, and represent 4G network devices.

Optionally, in an embodiment of this application, an AMF pool and an MME pool on a network are separately planned. For example, a native GUAMI and a native GUMMEI to which the convergent network device belongs are separately configured on the convergent network device. A mapped GUMMEI obtained by mapping a native GUAMI according to the current technology is different from a GUMMEI of any MME on the network, and is also different from a GUMMEI obtained by mapping a native GUAMI of another AMF network element on the network according to the current technology.

Optionally, in another embodiment, a native GUMMEI and a native GUANI may be separately obtained by mapping different globally unique identifiers of the convergent network device according to the manner in FIG. 11. For related descriptions, refer to the descriptions of FIG. 11. Details are not described herein again.

Optionally, in an embodiment of this application, different GUAMIs in a group of GUAMIs may belong to one AMF pool, that is, MCCs, MNCs, AMF region IDs, and AMF set IDs are all the same; or may belong to a plurality of AMF pools, that is, one or more of MCCs, MNCs, AMF region IDs, and AMF set IDs are different. This is not specifically limited in this embodiment of this application.

Optionally, the NG setup response message in an embodiment of this application may further carry weight information corresponding to the convergent network device when the convergent network device serves as an AMF network element. For related descriptions, refer to operation S1503. Details are not described herein again.

It should be noted that operations S1801 and S1802 are optional operations, and are described merely by using an example in which the NG-RAN device interacts with one of convergent network devices connected to the NG-RAN device to obtain a native GUAMI and a mapped GUAMI that correspond to the convergent network device. Certainly, the NG-RAN device may be further connected to another convergent network device or an AMF network element. For a manner of interacting with the another convergent network device to obtain a native GUAMI and a mapped GUAMI that correspond to the convergent network device, refer to operations S1801 and S1802. For a manner of interacting with the AMF network element to obtain a native GUAMI corresponding to the AMG network element, refer to the current technology. Details are not described herein. Further, after the NG-RAN device obtains a native GUAMI fed back by one or more convergent network devices or AMF network elements connected to the NG-RAN device, the NG-RAN device may determine the following network topology relationship based on the native GUAMI fed back by the one or more convergent network devices or AMF network elements connected to the NG-RAN device:

1. A quantity of AMF pools to which the NG-RAN device is connected, and an MCC, an MNC, an AMF region ID, and an AMF set ID that correspond to each AMF pool; and 2. A quantity of AMF network elements in each AMF pool, and an AMF pointer and a communication address of each AMF network element.

S1803 is the same as operation S1504. For related descriptions, refer to the embodiment shown in FIG. 15A, FIG. 15B and FIG. 15C. Details are not described herein again.

In an embodiment of this application, after receiving the registration request message from the terminal, the NG-RAN device may compare information in a message header of the registration request message with a previously stored native GUAMI and mapped GUAMI of each AMF network element connected to the NG-RAN device, and determine whether an old MME or an old AMF network element corresponding to the terminal is connected to the NG-RAN device.

When the NG-RAN device determines that the old MME or the old AMF network element corresponding to the terminal is connected to the NG-RAN device, and a function of the old MME or the old AMF network element is performed by the convergent network device in FIG. 15A, FIG. 15B and FIG. 15C (for example, in the scenario 4 or the scenario 5); or when the NG-RAN device determines that the old MME or the old AMF network element corresponding to the terminal is not connected to the NG-RAN device (for example, in the scenario 1 to the scenario 3), but the NG-RAN device selects the convergent network device in FIG. 15A, FIG. 15B and FIG. 15C to serve the terminal, the access method provided in this embodiment of this application may further include operations S1804 to S1819.

S1804 to S1819 are the same as operations S1505 to S1520. For related descriptions, refer to the embodiment shown in FIG. 15A, FIG. 15B and FIG. 15C. Details are not described herein again.

According to the access method provided in an embodiment of this application, signaling interaction in an access process of a terminal can be reduced, thereby simplifying an access procedure of the terminal. For analysis of a related technical effect, refer to related descriptions of the access system. Details are not described herein again.

The actions of the convergent network device in operations S1801 to S1819 may be performed by the processor 301 in the communications device 300 shown in FIG. 3 by invoking the application program code stored in the memory 303. This is not limited in this embodiment of this application.

In an embodiment, based on the access method shown in FIG. 17A and FIG. 17B or FIG. 18A, FIG. 18B and FIG. 18C, assuming that a terminal accesses a new MME from a convergent network device by using a network reselection procedure, the access method shown in FIG. 16 may also be used. For related descriptions, refer to the embodiment shown in FIG. 16. Details are not described herein again.

Figure 19:
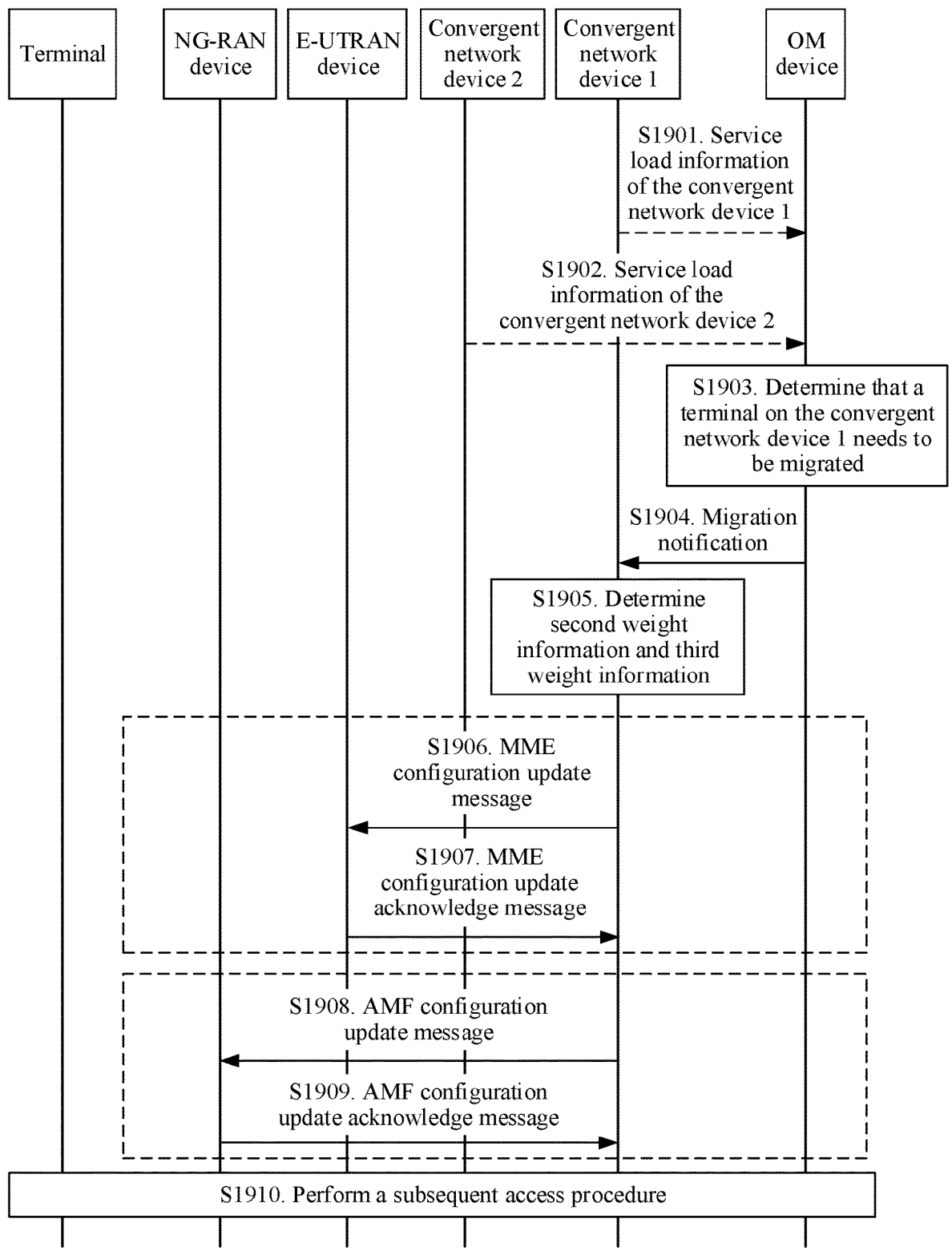
FIG. 19 is a schematic flowchart 7 of an access method according to an embodiment of this application.

In an embodiment, a convergent network device may initiate terminal migration when a convergent network device in a convergent network device pool needs to be upgraded or load of convergent network devices in a convergent network device pool is unbalanced. In this case, FIG. 19 shows an access method according to an embodiment of this application. The access method includes the following operations.

S1901. In an embodiment, a convergent network device 1 sends service load information of the convergent network device 1 to an operations management (operations management, OM) device, so that the OM device receives the service load information of the convergent network device 1 from the convergent network device 1.

Optionally, in an embodiment of this application, the service load information of the convergent network device 1 includes but is not limited to an absolute load and a capacity capability of resources such as a computing resource, a storage resource, a user context resource, a bandwidth resource, and a network interface resource of the convergent network device 1; or the service load information of the convergent network device 1 includes but is not limited to a relative load of resources such as a computing resource, a storage resource, a user context resource, a bandwidth resource, and a network interface resource of the convergent network device 1. The relative load is a ratio of the absolute load to the capacity capability.

S1902. In an embodiment, a convergent network device 2 sends service load information of the convergent network device 2 to the OM device, so that the OM device receives the service load information of the convergent network device 2 from the convergent network device 2.

For related descriptions of the service load information of the convergent network device 2, refer to the descriptions of the service load information of the convergent network device 1 in operation S1901. Details are not described herein again.

It should be noted that this embodiment of this application is described merely by using an example in which the convergent network device 1 reports the service load information of the convergent network device 1 to the OM device, and the convergent network device 2 reports the service load information of the convergent network device 2 to the OM device. When there are more than two convergent network devices on a network, other convergent network devices may also report their own service load information according to the manner in operation S1901 or operation S1902. Details are not described herein again.

S1903. The OM device determines that a terminal on the convergent network device 1 in the convergent network device pool needs to be migrated.

Optionally, in an embodiment of this application, if operation S1901 is performed, the OM device may determine, based on the service load information of the convergent network device 1, that the terminal on the convergent network device 1 needs to be migrated. For example, when determining that service load of the convergent network device 1 is excessively high or excessively low, the OM device may determine that the terminal on the convergent network device 1 needs to be migrated.

Alternatively, optionally, in an embodiment of this application, the OM device may determine, because of an operation such as an upgrade, that the terminal on the convergent network device 1 in the convergent network device pool needs to be migrated. This is not specifically limited in this embodiment of this application.

S1904. The OM device sends a migration notification to the convergent network device 1, so that the convergent network device 1 receives the migration notification from the OM device. The migration notification is used to indicate that the terminal on the convergent network device 1 needs to be migrated.

In an embodiment, the migration notification may further carry first weight information of a convergent network device. This is not specifically limited in this embodiment of this application.

S1905. The convergent network device determines, based on the first weight information of the convergent network device, second weight information corresponding to the convergent network device when the convergent network device serves as an MME on a 4G network and third weight information corresponding to the convergent network device when the convergent network device serves as an AMF network element on a 5G network.

In an embodiment, the first weight information of the convergent network device may be carried in the migration notification in operation S1904, or may be determined by the convergent network device 1 based on the migration notification. This is not specifically limited in this embodiment of this application.

S1906. The convergent network device 1 sends an MME configuration update (MME configuration update) message to an E-UTRAN device to which the convergent network device 1 is connected, so that the E-UTRAN device receives the MME configuration update message from the convergent network device 1. The MME configuration update message carries the second weight information.

The E-UTRAN device may store the second weight information after receiving the MME configuration update message from the convergent network device 1. The second weight information is used by the E-UTRAN device to select an MME subsequently.

S1907. The E-UTRAN device sends an MME configuration update acknowledge (MME configuration update acknowledge) message to the convergent network device 1, so that the convergent network device 1 receives the MME configuration update acknowledge message from the E-UTRAN device. The MME configuration update acknowledge message is used to confirm that the convergent network device 1 has received the MME configuration update message.

S1908. The convergent network device 1 sends an AMF configuration update (AMF configuration update) message to an NG-RAN device to which the convergent network device 1 is connected, so that the NG-RAN device receives the AMF configuration update message from the convergent network device 1. The AMF configuration update message carries the third weight information.

The NG-RAN device may store the third weight information after receiving the AMF configuration update message from the convergent network device 1. The third weight information is used by the NG-RAN device to select an AMF network element subsequently.

S1909. The NG-RAN device sends an AMF configuration update acknowledge message to the convergent network device 1, so that the convergent network device 1 receives the AMF configuration update acknowledge message from the NG-RAN device. The AMF configuration update acknowledge message is used to confirm that the convergent network device 1 has received the AMF configuration update message.

S1910. Perform a subsequent access procedure.

For subsequent processing performed by the convergent network device 1 and the E-UTRAN device to which the convergent network device 1 is connected on a terminal that accesses the 4G network, and processing performed by the convergent network device 1 and the NG-RAN device to which the convergent network device 1 is connected on a terminal that accesses the 5G network, refer to an implementation in the current technology. Details are not described herein.

It should be noted that this embodiment of this application is described by using the 4G network and the 5G network as examples. Certainly, the access method may be alternatively applied to another network. This is not specifically limited in this embodiment of this application.

It should be noted that this embodiment of this application is described merely by using an example in which the terminal on the convergent network device 1 needs to be migrated. If the OM device determines that a terminal on another convergent network device needs to be migrated, refer to the foregoing manner for execution. Details are not described herein again.

According to the access method provided in an embodiment of this application, terminal access may be implemented when a convergent network device in a convergent network device pool needs to be upgraded or load of convergent network devices in a convergent network device pool is unbalanced.

The actions of the convergent network device 1 or the convergent network device 2 in operations S1901 to S1910 may be performed by the processor 301 in the communications device 300 shown in FIG. 3 by invoking the application program code stored in the memory 303. This is not limited in this embodiment of this application.

Figure 20:
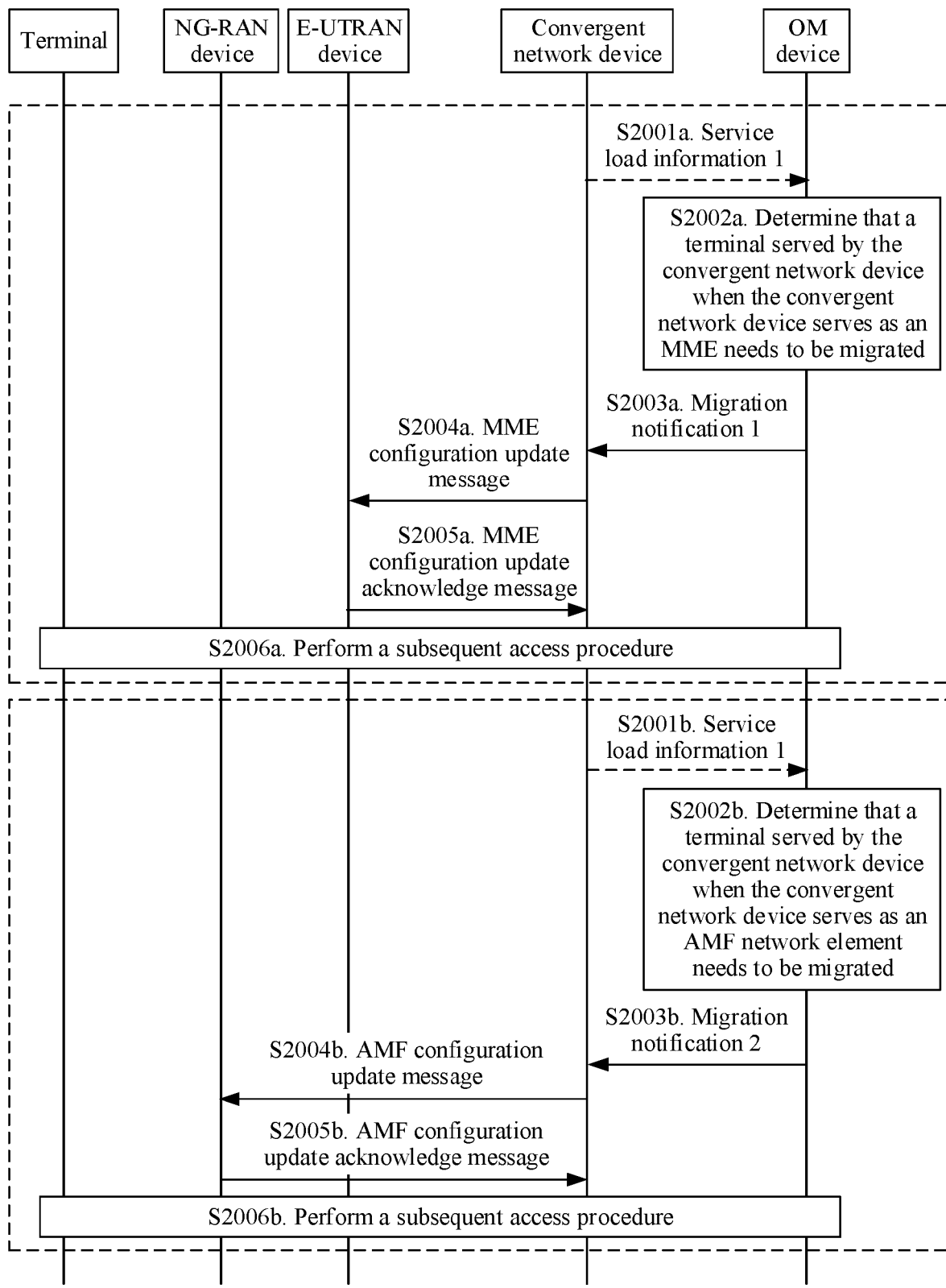
FIG. 20 is a schematic flowchart 8 of an access method according to an embodiment of this application.

Alternatively, in an embodiment, a convergent network device may initiate terminal migration when a convergent network device in a convergent network device pool needs to be upgraded or load of convergent network devices in a convergent network device pool is unbalanced. In this case, FIG. 20 shows an access method according to an embodiment of this application. The access method includes operations S2001a to S2006a or operations S2001b to 2006b.

S2001a. In an embodiment, a convergent network device sends, to an OM device, service load information 1 corresponding to the convergent network device when the convergent network device serves as an MME on a 4G network, so that the OM device receives, from the convergent network device, the service load information 1 corresponding to the convergent network device when the convergent network device serves as the MME on the 4G network.

For related descriptions of the service load information 1, refer to related descriptions of the service load information in operation S1901. Details are not described herein again.

S2002a. The OM device determines that a terminal served by the convergent network device when the convergent network device serves as the MME needs to be migrated.

For a specific implementation of operation S2002a, refer to operation S1903. Details are not described herein again.

S2003a. The OM device sends a migration notification 1 to the convergent network device, so that the convergent network device receives the migration notification 1 from the OM device. The migration notification 1 is used to indicate that the terminal served by the convergent network device when the convergent network device serves as the MME needs to be migrated.

In an embodiment, the migration notification 1 may further carry second weight information corresponding to the convergent network device when the convergent network device serves as an MME on a 5G network. This is not specifically limited in this embodiment of this application.

S2004a and S2005a are the same as operations S1906 and S1907. For related descriptions, refer to the embodiment shown in FIG. 19. Details are not described herein again.

Optionally, in an embodiment of this application, if the migration notification 1 does not carry the second weight information corresponding to the convergent network device when the convergent network device serves as the MME on the 5G network, the convergent network device may determine the second weight information after receiving the migration notification 1 from the OM device. This is not specifically limited in this embodiment of this application.

S2006a. Perform a subsequent access procedure.

S2001b. In an embodiment, a convergent network device sends, to an OM device, service load information 2 corresponding to the convergent network device when the convergent network device serves as an AMF network element on a 5G network, so that the OM device receives, from the convergent network device, the service load information 2 corresponding to the convergent network device when the convergent network device serves as the AMF network element on the 5G network.

For related descriptions of the service load information 2, refer to related descriptions of the service load information in operation S1901. Details are not described herein again.

S2002b. The OM device determines that a terminal served by the convergent network device when the convergent network device serves as the AMF network element needs to be migrated.

For a specific embodiment of operation S2002a, refer to operation S1903. Details are not described herein again.

S2003a. The OM device sends a migration notification 2 to the convergent network device, so that the convergent network device receives the migration notification 2 from the OM device. The migration notification 2 is used to indicate that the terminal served by the convergent network device when the convergent network device serves as the AMF network element needs to be migrated.

In an embodiment, the migration notification 2 may further carry third weight information corresponding to the convergent network device when the convergent network device serves as the AMF network element. This is not specifically limited in this embodiment of this application.

S2004b and S2005b are the same as operations S1908 and S1909. For related descriptions, refer to the embodiment shown in FIG. 19. Details are not described herein again.

S2006b. Perform a subsequent access procedure.

It should be noted that this embodiment of this application is described by using the 4G network and the 5G network as examples. Certainly, the access method may be alternatively applied to another network. This is not specifically limited in this embodiment of this application.

According to the access method provided in this embodiment of this application, terminal access may be implemented when a convergent network device in a convergent network device pool needs to be upgraded or load of convergent network devices in a convergent network device pool is unbalanced.

The actions of the convergent network device in operations S2001a to S2006a or S2001b to S2006b may be performed by the processor 301 in the communications device 300 shown in FIG. 3 by invoking the application program code stored in the memory 303. This is not limited in this embodiment of this application.

The foregoing describes the solutions provided in the embodiments of this application mainly from a perspective of interaction between network elements. It can be understood that, to implement the foregoing functions, the anchor user plane network element or the session management network element includes corresponding hardware structures and/or software modules for performing the functions.

A person skilled in the art should easily be aware that, in combination with units and algorithm operations of the examples described in the embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, functional modules of the convergent network device may be divided based on the foregoing method examples. For example, the functional modules may be divided based on the functions, or at least two functions may be integrated in one processing module. The integrated module may be implemented in a form of hardware, or may be implemented in a form of a software functional module. It should be noted that, in this embodiment of this application, module division is exemplary, and is merely a logical function division. In actual implementation, another division manner may be used.

Figure 21:
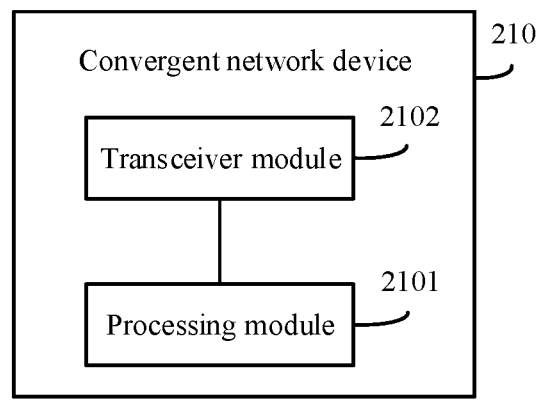
FIG. 21 is a schematic structural diagram 1 of a convergent network device according to an embodiment of this application.

For example, when the functional modules are divided through integration, FIG. 21 shows a schematic structural diagram of a convergent network device 210. The convergent network device 210 includes a processing module 2101 and a transceiver module 2102. Based on the convergent network device 210, the following two solutions may be provided.

Solution 1:

The transceiver module 2102 is configured to receive an access request message from a first access device on a first network. The access request message carries a first GUTI of a terminal. The first GUTI is an old GUTI on the first network or a GUTI that is on the first network and that is obtained by mapping a second GUTI. The second GUTI is an old GUTI on a second network. The processing module 2101 is configured to determine a first target context of the terminal on the first network based on the first GUTI and a device identifier corresponding to the convergent network device 210 when the convergent network device 210 serves as a mobility management device. The transceiver module 2102 is further configured to send an access response message to the first access device. The access response message is used to indicate that the terminal has successfully accessed the first network.

In an embodiment, the device identifier corresponding to the convergent network device 210 when the convergent network device 210 serves as the mobility management device is specifically a first identifier corresponding to the convergent network device 210 when the convergent network device 210 serves as a first mobility management device on the first network.

In an embodiment, the first network is a 4G network, and the first identifier is a first GUMMEI. Correspondingly, the processing module 2101 is specifically configured to: when a second GUMMEI in the first GUTI is the same as the first GUMMEI, determine a first target context based on an M-TMSI in the first GUTI.

In an embodiment, that the processing module 2101 is configured to determine a first target context based on an M-TMSI in the first GUTI is performed as follows. The processing module 2101 is configured to: when the convergent network device 210 finds a 4G context of the terminal based on the M-TMSI in the first GUTI, determine the 4G context of the terminal as the first target context; or the processing module 2101 is configured to: when the convergent network device 210 finds a 5G context of the terminal based on the M-TMSI in the first GUTI, determine, a 4G context obtained by converting the 5G context of the terminal as the first target context.

In a possible embodiment, the first network is a 4G network, the first identifier is a first GUMMEI, the access request message further carries a type indication of the first GUTI, and the type indication is used to indicate that the first GUTI is an old GUTI on the first network. Correspondingly, the processing module 2101 is specifically configured to: when a second GUMMEI in the first GUTI is the same as the first GUMMEI, search for a 4G context of the terminal based on an M-TMSI in the first GUTI, and determine the 4G context of the terminal as the first target context.

In a possible embodiment, the first network is a 5G network, the first identifier is a first GUAMI, the access request message further carries a type indication of the first GUTI, and the type indication is used to indicate that the first GUTI is an old GUTI on the first network. Correspondingly, the processing module 2101 is specifically configured to: when a second GUAMI in the first GUTI is the same as the first GUAMI, search for a 5G context of the terminal based on a 5G-TMSI in the first GUTI, and determine the 5G context of the terminal as the first target context.

In an embodiment, the device identifier corresponding to the convergent network device 210 when the convergent network device 210 serves as the mobility management device is specifically a second identifier corresponding to the convergent network device 210 when the convergent network device 210 serves as a second mobility management device on the second network.

In an embodiment, the second network is a 5G network, the second identifier is a first GUAMI, the access request message further carries a type indication of the first GUTI, and the type indication is used to indicate that the first GUTI is a GUTI that is on the first network and that is obtained by mapping the second GUTI. Correspondingly, the processing module 2101 is specifically configured to: map the first GUTI back to the second GUTI based on the type indication; and when a second GUAMI in the second GUTI is the same as the first GUAMI, search for a 5G context of the terminal based on a 5G-TMSI in the second GUTI, and determine, a 4G context obtained by converting the 5G context of the terminal as the first target context.

In another embodiment, the second network is a 4G network, the second identifier is a first GUMMEI, the access request message further carries a type indication of the first GUTI, and the type indication is used to indicate that the first GUTI is a GUTI that is on the first network and that is obtained by mapping the second GUTI. Correspondingly, the processing module 2101 is specifically configured to: map the first GUTI back to the second GUTI based on the type indication; and when a second GUMMEI in the second GUTI is the same as the first GUMMEI, search for a 4G context of the terminal based on an M-TMSI in the second GUTI, and determine, a 5G context obtained by converting the 4G context of the terminal as the first target context.

In an embodiment, the device identifier corresponding to the convergent network device 210 when the convergent network device 210 serves as the mobility management device is specifically a first identifier corresponding to the convergent network device 210 when the convergent network device 210 serves as a first mobility management device on the first network, and a second identifier corresponding to the convergent network device 210 when the convergent network device 210 serves as a second mobility management device on the second network.

In an embodiment, the first network is a 4G network, the second network is a 5G network, the first identifier is a first GUMMEI, and the second identifier is a first GUAMI. Correspondingly, the processing module 2101 is specifically configured to: when a second GUMMEI in the first GUTI is the same as the first GUMMEI, search for a 4G context of the terminal based on an M-TMSI in the first GUTI, and determine the 4G context of the terminal as the first target context; or when a second GUMMEI in the first GUTI is different from the first GUMMEI, map the first GUTI back to the second GUTI; and when a second GUAMI in the second GUTI is the same as the first GUAMI, search for a 5G context of the terminal based on a 5G-TMSI in the second GUTI, and determine, a 4G context obtained by converting the 5G context of the terminal as the first target context.

In an embodiment, the processing module 2101 is further configured to separately map a first globally unique identifier of the convergent network device 210 to one or more of a first GUMMEI and a first GUAMI according to a mapping rule. The first globally unique identifier of the convergent network device 210 includes, from a most significant bit to a least significant bit, a mobile country code MCC and a mobile network code MNC that correspond to the convergent network device 210, a 16-bit identifier of a convergent network device 210 pool to which the convergent network device 210 belongs, two idle bits, and a 6-bit first identifier of the convergent network device 210 in the convergent network device 210 pool.

In an embodiment, the transceiver module 2102 is further configured to receive a context request message from a fourth mobility management entity on the 4G network. The context request message carries a third GUTI of the terminal, and is used to request a second target context of the terminal on the 4G network. The processing module 2101 is further configured to: when the convergent network device 210 finds a 4G context of the terminal based on an M-TMSI in the third GUTI, determine the 4G context of the terminal as the second target context; or the processing module 2101 is further configured to: when the convergent network device 210 finds a 5G context of the terminal based on an M-TMSI in the third GUTI, determine, a 4G context obtained by converting the 5G context of the terminal as the second target context. The transceiver module 2102 is further configured to send a context response message to the fourth mobility management entity. The context response message carries the second target context.

In an embodiment, the transceiver module 2102 is further configured to send a first message to the first access device. The first message carries the first GUMMEI and a third GUMMEI that is on the first network and that is obtained by mapping the first GUAMI. The transceiver module 2102 is further configured to send a second message to a second access device on the second network. The second message carries the first GUAMI and a third GUAMI that is on the second network and that is obtained by mapping the first GUMMEI. The first network is a 4G network, and the second network is a 5G network.

Alternatively, the transceiver module 2102 is further configured to send a second message to the first access device. The second message carries the first GUAMI and a third GUAMI that is on the second network and that is obtained by mapping the first GUMMEI. The transceiver module 2102 is further configured to send a first message to a second access device on the second network. The first message carries the first GUMMEI and a third GUMMEI that is on the first network and that is obtained by mapping the first GUAMI. The first network is a 5G network, and the second network is a 4G network.

In an embodiment, the processing module 2101 is further configured to map a first globally unique identifier of the convergent network device 210 to a first GUMMEI according to a first mapping rule, and the processing module 2101 is further configured to map a second globally unique identifier of the convergent network device 210 to a first GUAMI according to a second mapping rule. The first globally unique identifier of the convergent network device 210 includes, from a most significant bit to a least significant bit, an MCC and an MNC that correspond to the convergent network device 210, a 16-bit identifier of a convergent network device 210 pool to which the convergent network device 210 belongs, two idle bits, and a 6-bit first identifier of the convergent network device 210 in the convergent network device 210 pool. The second globally unique identifier of the convergent network device 210 includes, from a most significant bit to a least significant bit, the MCC and the MNC that correspond to the convergent network device 210, the 16-bit identifier of the convergent network device 210 pool to which the convergent network device 210 belongs, two idle bits, and a 6-bit second identifier of the convergent network device 210 in the convergent network device 210 pool.

In an embodiment, the transceiver module 2102 is further configured to receive a context request message from a fourth mobility management entity on the 4G network. The context request message carries a third GUTI of the terminal, and is used to request a second target context of the terminal on the 4G network. The processing module 2101 is further configured to: when a fourth GUMMEI in the third GUTI is the same as the first GUMMEI, search for a 4G context of the terminal based on an M-TMSI in the third GUTI, and determine the 4G context of the terminal as the second target context; or the processing module 2101 is further configured to: when a fourth GUAMI in the third GUTI is the same as the first GUAMI, search for a 5G context of the terminal based on an M-TMSI in the third GUTI, and determine, a 4G context obtained by converting the 5G context of the terminal as the second target context. The transceiver module 2102 is further configured to send a context response message to the fourth mobility management entity. The context response message carries the second target context.

Solution 2:

The transceiver module 2012 is configured to receive a migration notification from an operations management device. The migration notification is used to indicate that a terminal on the convergent network device 210 needs to be migrated. The processing module 2101 is configured to determine, based on first weight information of the convergent network device 210, second weight information corresponding to the convergent network device 210 when the convergent network device 210 serves as a first mobility management device on a first network and third weight information corresponding to the convergent network device 210 when the convergent network device 210 serves as a second mobility management device on a second network. The transceiver module 2102 is further configured to send the second weight information to a first access device on the first network, so that the first access device updates fourth weight information that is stored on the first access device and that corresponds to the convergent network device 210 when the convergent network device 210 serves as the first mobility management device on the first network. The transceiver module 2102 is further configured to send the third weight information to a second access device on the second network, so that the second access device updates fifth weight information that is stored on the second access device and that corresponds to the convergent network device 210 when the convergent network device 210 serves as the second mobility management device on the second network.

In an embodiment, the migration notification carries the first weight information of the convergent network device; or the processing module 2101 is further configured to determine the first weight information of the convergent network device 210 based on the migration notification.

In an embodiment, the transceiver module 2102 is further configured to send service load information of the convergent network device 210 to the operations management device. The service load information is used to determine that the terminal on the convergent network device 210 needs to be migrated.

For function descriptions of corresponding functional modules, refer to all related content of the operations in the foregoing method embodiments. Details are not described herein again.

In an embodiment, the convergent network device 210 is presented by dividing the functional modules through integration. Herein, the "module" may be a specific ASIC, a circuit, a processor that executes one or more software or firmware programs, a memory, an integrated logic circuit, and/or another device that can provide the foregoing functions. In a simple embodiment, a person skilled in the art may figure out that the convergent network device 210 may be in the form shown in FIG. 3.

For example, the processor 301 in FIG. 3 may invoke the computer-executable instruction stored in the memory 303, so that the convergent network device 210 performs the access method in the foregoing method embodiments.

In an embodiment, functions and implementation processes of the processing module 2101 and the transceiver module 2102 in FIG. 21 may be implemented by the processor 301 in FIG. 3 by invoking the computer-executable instruction stored in the memory 303. Alternatively, a function and an implementation process of the processing module 2101 in FIG. 21 may be implemented by the processor 301 in FIG. 3 by invoking the computer-executable instruction stored in the memory 303; and a function and an implementation process of the transceiver module 2102 in FIG. 21 may be implemented by the communications interface 304 in FIG. 3.

The convergent network device 210 provided in an embodiment may perform the foregoing access method. Therefore, for a technical effect that can be achieved by the convergent network device 210, refer to the foregoing method embodiments. Details are not described herein again.

Optionally, an embodiment of this application further provides a chip system. The chip system includes a processor, configured to support the convergent network device 210 in implementing the foregoing access method, for example, determining a first target context of a terminal on a first network based on a first GUTI and a device identifier corresponding to the convergent network device when the convergent network device serves as a mobility management device. In a possible design, the chip system further includes a memory. The memory is configured to store a program instruction and data that are necessary for the convergent network device 210. Certainly, the memory may be alternatively not in the chip system. The chip system may include a chip, or may include a chip and another discrete device. This is not specifically limited in this embodiment of this application.

Figure 22:
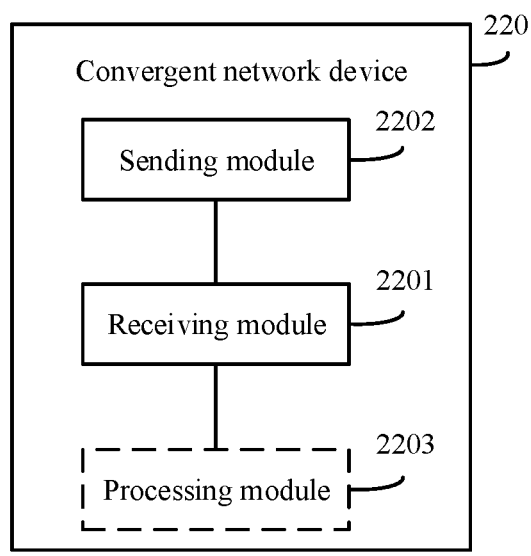
FIG. 22 is a schematic structural diagram 2 of a convergent network device according to an embodiment of this application.

Alternatively, for example, when the functional modules are divided through integration, FIG. 22 shows a schematic structural diagram of a convergent network device 220. The convergent network device 220 includes a receiving module 2201 and a sending module 2202. The receiving module 2201 is configured to receive a migration notification from an operations management device. The migration notification is used to indicate that a terminal served by the convergent network device 220 when the convergent network device 220 serves as a mobility management device on a target network needs to be migrated. The sending module 2202 is configured to send, to an access device on the target network, first weight information corresponding to the convergent network device 220 when the convergent network device 220 serves as the mobility management device on the target network. The access device updates second weight information that is stored on the access device and that corresponds to the convergent network device 220 when the convergent network device 220 serves as the mobility management device on the target network.

In an embodiment, the migration notification carries the first weight information; or as shown in FIG. 22, the convergent network device 220 further includes a processing module 2203. The processing module 2203 is configured to determine the first weight information based on the migration notification.

In an embodiment, the sending module 2202 is further configured to send, to the operations management device, service load information corresponding to the convergent network device 220 when the convergent network device 220 serves as the mobility management device on the target network. The service load information is used to determine that the terminal served by the convergent network device 220 when the convergent network device 220 serves as the mobility management device on the target network needs to be migrated.

For function descriptions of corresponding functional modules, refer to all related content of the operations in the foregoing method embodiments. Details are not described herein again.

In this embodiment, the convergent network device 220 is presented by dividing the functional modules through integration. Herein, the "module" may be a specific ASIC, a circuit, a processor that executes one or more software or firmware programs, a memory, an integrated logic circuit, and/or another device that can provide the foregoing functions. In a simple embodiment, a person skilled in the art may figure out that the convergent network device 220 may be in the form shown in FIG. 3.

For example, the processor 301 in FIG. 3 may invoke the computer-executable instruction stored in the memory 303, so that the convergent network device 220 performs the access method in the foregoing method embodiments.

In an embodiment, functions and implementation processes of the receiving module 2201, the sending module 2202, and the processing module 2203 in FIG. 22 may be implemented by the processor 301 in FIG. 3 by invoking the computer-executable instruction stored in the memory 303. Alternatively, a function and an implementation process of the processing module 2203 in FIG. 22 may be implemented by the processor 301 in FIG. 3 by invoking the computer-executable instruction stored in the memory 303; and a function and an implementation process of the receiving module 2201 and the sending module 2202 in FIG. 22 may be implemented by the communications interface 304 in FIG. 3.

The convergent network device 220 provided in this embodiment may perform the foregoing access method. Therefore, for a technical effect that can be achieved by the convergent network device 220, refer to the foregoing method embodiments. Details are not described herein again.

Optionally, an embodiment of this application further provides a chip system. The chip system includes a processor, configured to support the convergent network device 220 in implementing the foregoing access method, for example, determining first weight information based on a migration notification. In a possible design, the chip system further includes a memory. The memory is configured to store a program instruction and data that are necessary for the convergent network device 220. Certainly, the memory may be alternatively not in the chip system. The chip system may include a chip, or may include a chip and another discrete device. This is not specifically limited in this embodiment of this application.

All or some of the foregoing embodiments may be implemented by using software, hardware, firmware, or any combination thereof. When a software program is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

Although this application is described with reference to the embodiments, in a process of implementing this application that claims protection, persons skilled in the art may understand and implement another variation of the disclosed embodiments by viewing the accompanying drawings, disclosed content, and the accompanying claims. In the claims, "comprising" does not exclude another component or another operation, and "a" or "one" does not exclude a meaning of plurality. A single processor or another unit may implement several functions enumerated in the claims. Some measures are recorded in dependent claims that are different from each other, but this does not mean that these measures cannot be combined to produce a better effect.

Although this application is described with reference to specific features and the embodiments thereof, obviously, various modifications and combinations may be made to them without departing from the spirit and scope of this application. Correspondingly, the specification and accompanying drawings are merely example description of this application defined by the accompanying claims, and is considered as any of or all modifications, variations, combinations or equivalents that cover the scope of this application. Obviously, a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. An access method by a network device for providing an access to a terminal and reducing signaling interaction about the access, the method comprising:
   receiving, by the network device, an access request message from a first access network device on a first network, wherein the access request message includes a first globally unique temporary identity (GUTI) of the terminal, the first GUTI is an original GUTI on the first network or a mapped GUTI on the first network obtained by mapping a second GUTI, and the second GUTI is an original GUTI on a second network having provided access to the terminal;
   directly determining, by the network device, a first target context of the terminal on the first network based on the first GUTI and a device identifier corresponding to the network device when the network device serves as a mobility management device to the terminal by integrating a function of the first network and a function of the second network, wherein the function is a mobility management function;
   sending, by the network device, an access response message to the first access network deviceto indicate that the terminal has successfully accessed the first network using the first target context determined by the network device.

2. The access method according to claim 1, wherein the device identifier corresponding to the network device is a first identifier corresponding to the network device when the network device serves as a first mobility management device on the first network.

3. The access method according to claim 2, wherein the first network is a $4^{th}$ generation (4G) network, the first identifier is a first globally unique mobility management entity identifier (GUMMEI), and determining a first target context of the terminal on the first network comprises:
   when a second GUMMEI in the first GUTI is the same as the first GUMMEI, determining, by the network device, the first target context based on a mobility management entity temporary mobile subscriber identity (M-TMSI) in the first GUTI.

4. The access method according to claim 2, wherein the first network is a 4G network, the first identifier is a first GUMMEI, the access request message further includes a type indication of the first GUTI used to indicate that the first GUTI is an original GUTI on the first network; and
   wherein determining a first target context of the terminal comprises:
      when a second GUMMEI in the first GUTI is the same as the first GUMMEI, searching for, by the network device, a 4G context of the terminal based on an M-TMSI in the first GUTI, and
      determining the 4G context of the terminal as the first target context.

5. The access method according to claim 2, wherein the first network is a $5^{th}$ generation (5G) network, the first identifier is a first globally unique access and mobility management function identifier (GUAMI), the access request message further includes a type indication of the first GUTI used to indicate that the first GUTI is an original GUTI on the first network; and
   wherein determining a first target context of the terminal comprises:
      when a second GUAMI in the first GUTI is the same as the first GUAMI, searching for, by the network device, a 5G context of the terminal based on a 5G temporary mobile subscriber identity (5G-TMSI) in the first GUTI, and
      determining the 5G context of the terminal as the first target context.

6. The access method according to claim 1, wherein the device identifier corresponding to the network device is a second identifier corresponding to the network device when the network device serves as a second mobility management device on the second network.

7. The access method according to claim 6, wherein the second network is a $5^{th}$ generation (5G) network, the second identifier is a first globally unique access and mobility management function identifier (GUAMI), the access request message further includes a type indication of the first GUTI used to indicate that the first GUTI is a GUTI that is on the first network and obtained by mapping the second GUTI; and
   wherein determining a first target context of the terminal comprises:
      mapping, by the network device, the first GUTI back to the second GUTI based on the type indication; and
      when a second GUAMI in the second GUTI is the same as the first GUAMI, searching for, by the network device, a 5G context of the terminal based on a 5G temporary mobile subscriber identity (5G-TMSI) in the second GUTI, and determining a 4G context obtained by converting the 5G context of the terminal as the first target context.

8. The access method according to claim 6, wherein the second network is a 4G network, the second identifier is a first GUMMEI, the access request message further includes a type indication of the first GUTI used to indicate that the first GUTI is a GUTI that is on the first network and obtained by mapping the second GUTI; and
   wherein determining a first target context of the terminal comprises:
      mapping, by the network device, the first GUTI back to the second GUTI based on the type indication; and
      when a second GUMMEI in the second GUTI is the same as the first GUMMEI, searching for, by the network device, a 4G context of the terminal based on an M-TMSI in the second GUTI, and determining a 5G context obtained by converting the 4G context of the terminal as the first target context.

9. The access method according to claim 1, wherein the first network is a 4G network, the network device serves as a mobility management device on the first network, the device identifier of the network device is a first GUMMEI, and wherein determining a first target context of the terminal comprises:
   when a second GUMMEI in the first GUTI is the same as the first GUMMEI, searching for, by the network device, a 4G context of the terminal based on an M-TMSI in the first GUTI, and determining the 4G context of the terminal as the first target context.

10. The access method according to claim 1, wherein the first network is a 4G network, the network device serves as a mobility management device on the 4G network, the device identifier of the network device is a first globally unique access and mobility management function identifier (GUAMI), and wherein determining a first target context of the terminal comprises:
when a second GUMMEI in the first GUTI is different from the first GUMMEI, mapping, by the network device, the first GUTI back to the second GUTI; and
when a second GUAMI in the second GUTI is the same as the first GUAMI, searching for, by the network device, a 5G context of the terminal based on a 5G temporary mobile subscriber identity (5G-TMSI) in the second GUTI, and determining a 4G context obtained by converting the 5G context of the terminal as the first target context.

11. The access method according to claim 5, further comprising:
sending, by the network device, a first message to the first access network device, wherein the first message includes the first GUMMEI and a third GUMMEI that is on the first network obtained by mapping the first GUAMI; and sending, by the network device, a second message to a second access device on the second network, wherein the second message includes the first GUAMI and a third GUAMI that is on the second network and obtained by mapping the first GUMMEI, the first network is a 4G network, and the second network is a 5G network; or
sending, by the network device, a second message to the first access network device, wherein the second message includes the first GUAMI and a third GUAMI that is on the second network and obtained by mapping the first GUMMEI; and sending, by the network device, a first message to a second access device on the second network, wherein the first message includes the first GUMMEI and a third GUMMEI that is on the first network and obtained by mapping the first GUAMI, the first network is a 5G network, and the second network is a 4G network.

12. The access method according to claim 11, wherein the first message further includes a type of the first GUMMEI and a type of the third GUMMEI;
the second message further includes a type of the first GUAMI and a type of the third GUAMI; and
the type of the first GUMMEI is a native GUMMEI, the type of the third GUMMEI is a mapped GUMMEI, the type of the first GUAMI is a native GUAMI, and the type of the third GUAMI is a mapped GUAMI.

13. A network device for providing an access to a terminal and reducing signaling interaction about the access, the network device comprising:
a processor; and
a memory storing executable instructions, which when executed by the processor, cause the processor to:
receive an access request message from a first access network device on a first network, wherein the access request message includes a first globally unique temporary identity (GUTI) of a terminal, the first GUTI is an original GUTI on the first network or a mapped GUTI on the first network obtained by mapping a second GUTI, and the second GUTI is an original GUTI on a second network having provided access to the terminal;
directly determine a first target context of the terminal on the first network based on the first GUTI and a device identifier corresponding to the network device when the network device serves as a mobility management device to the terminal by integrating a function of the first network and a function of the second network, wherein the function is a mobility management function;
send an access response message to the first access network device to indicate that the terminal has successfully accessed the first network using the first target context determined by the network device.

14. The network device of claim 13, wherein the device identifier corresponding to the network device is a first identifier corresponding to the network device when the network device serves as a first mobility management device on the first network.

15. The network device according to claim 14, wherein the first network is a $5^{th}$ generation (5G) network, the first identifier is a first globally unique access and mobility management function identifier (GUAMI), the access request message further includes a type indication of the first GUTI used to indicate that the first GUTI is an original GUTI on the first network; and
wherein determining a first target context of the terminal comprises:
when a second GUAMI in the first GUTI is the same as the first GUAMI, searching for, by the network device, a 5G context of the terminal based on a 5G temporary mobile subscriber identity (5G-TMSI) in the first GUTI, and
determining the 5G context of the terminal as the first target context.

16. The network device according to claim 13, wherein the first network is a 4G network, the network device serves as a mobility management device on the first network, the device identifier of the network device is a first GUMMEI, and wherein determining a first target context of the terminal comprises:
when a second GUMMEI in the first GUTI is the same as the first GUMMEI, searching for, by the network device, a 4G context of the terminal based on an M-TMSI in the first GUTI, and determining the 4G context of the terminal as the first target context.

17. The network device according to claim 13, wherein the first network is a 4G network, the network device serves as a mobility management device on the 4G network, the device identifier of the network device is a first globally unique access and mobility management function identifier (GUAMI), and wherein determining a first target context of the terminal comprises:
when a second GUMMEI in the first GUTI is different from the first GUMMEI, mapping, by the network device, the first GUTI back to the second GUTI; and
when a second GUAMI in the second GUTI is the same as the first GUAMI, searching for, by the network device, a 5G context of the terminal based on a 5G temporary mobile subscriber identity (5G-TMSI) in the second GUTI, and determining a 4G context obtained by converting the 5G context of the terminal as the first target context.

* * * * *